US008606684B2

(12) United States Patent
Bi et al.

(10) Patent No.: US 8,606,684 B2
(45) Date of Patent: Dec. 10, 2013

(54) DIGITAL CONTENT DISTRIBUTION AND SUBSCRIPTION SYSTEM

(75) Inventors: Depeng Bi, Algonquin, IL (US); Stephen Christopher Gladwin, Chicago, IL (US); Troy Steven Denkinger, Chicago, IL (US); Timothy Scott Franklin, Lake Villa, IL (US); Bart Richard Cilfone, Chicago, IL (US); Anne Marie Walsh, Chicago, IL (US); Jeffrey Jonathan Spurgat, Madison, WI (US)

(73) Assignee: AOL Inc., Dulles, VA (US)

( * ) Notice: Subject to any disclaimer, the term of this patent is extended or adjusted under 35 U.S.C. 154(b) by 1490 days.

(21) Appl. No.: 10/416,321

(22) PCT Filed: Nov. 6, 2001

(86) PCT No.: PCT/US01/44146
§ 371 (c)(1),
(2), (4) Date: May 6, 2003

(87) PCT Pub. No.: WO02/45316
PCT Pub. Date: Jun. 6, 2002

(65) Prior Publication Data
US 2004/0024688 A1 Feb. 5, 2004

Related U.S. Application Data

(60) Provisional application No. 60/247,492, filed on Nov. 10, 2000.

(51) Int. Cl.
*G06Q 40/00* (2006.01)

(52) U.S. Cl.
USPC .............................................. 705/37; 705/30

(58) Field of Classification Search
USPC .................. 705/10–44; 707/9, 10, 1, 100; 713/168–170
See application file for complete search history.

(56) References Cited

U.S. PATENT DOCUMENTS 5,579,430 A 11/1996 Grill et al.
(Continued)

FOREIGN PATENT DOCUMENTS

EP 0 715 247 6/1996
(Continued)

OTHER PUBLICATIONS

European Search Report (EP 01999066).
(Continued)

*Primary Examiner* — Frantzy Poinvil
(74) *Attorney, Agent, or Firm* — Finnegan, Henderson, Farabow, Garrett & Dunner, LLP

(57) ABSTRACT

A digital content distribution and subscription system for digital data files provides subscribers with music or video from streaming digital data or locally-stored digital files on demand for a fee. After registration onto the system, a subscriber may select from a relatively wide variety of available digital content from the streaming digital data or the locally-stored digital files. The subscriber may then select songs from various playlists which causes encrypted digital audio files for the selected music to be downloaded to the subscriber's personal computer (pc). A license key is downloaded to the subscriber's pc to unlock the selected songs to enable them to be decoded and played on the subscriber's pc or remote audio equipment for a predetermined period of time. At the expiration of the predetermined time period, the license key expires, thereby preventing further playback of the encrypted audio data files. The selections of each subscriber are tabulated for the purpose of royalty tracking and payment of an appropriate license fee to the holders of copyright rights for the selections. The digital content distribution and subscription system includes a digital content management system, a system for taken-based authentication allowing secure data retrieval and a royalty administration system.

23 Claims, 61 Drawing Sheets

(56) References Cited

U.S. PATENT DOCUMENTS

| | | | |
|---|---|---|---|
| 5,649,013 A | | 7/1997 | Stuckey et al. |
| 5,852,812 A | | 12/1998 | Reeder |
| 6,006,332 A | | 12/1999 | Rabne et al. |
| 6,047,268 A | | 4/2000 | Bartoli et al. |
| 6,282,653 B1 | | 8/2001 | Berstis et al. |
| 6,502,137 B1 | * | 12/2002 | Peterson et al. ............ 709/229 |
| 6,681,227 B1 | * | 1/2004 | Kojima et al. ................... 1/1 |
| 6,731,393 B1 | * | 5/2004 | Currans et al. ............ 358/1.12 |
| 6,826,534 B1 | * | 11/2004 | Gupta et al. ..................... 705/1 |
| 6,873,975 B1 | | 3/2005 | Hatakeyama et al. |
| 6,925,469 B2 | * | 8/2005 | Headings et al. ............ 707/102 |
| 7,047,241 B1 | * | 5/2006 | Erickson ......................... 707/9 |
| 7,051,212 B2 | * | 5/2006 | Ginter et al. ................. 713/193 |
| 2001/0036271 A1 | | 11/2001 | Javed |
| 2001/0051996 A1 | | 12/2001 | Cooper et al. |
| 2002/0049717 A1 | | 4/2002 | Routtenberg et al. |

FOREIGN PATENT DOCUMENTS

| | | |
|---|---|---|
| JP | 2000-293439 | 10/2000 |
| WO | WO 99/00960 | 1/1999 |
| WO | WO 00/30323 | 5/2000 |
| WO | WO 00/58811 | 10/2000 |
| WO | WO 00/62265 | 10/2000 |
| WO | WO 02/03179 A2 | 1/2002 |

OTHER PUBLICATIONS

Abadi et al., "Secure Web Tunneling" Computer Networks and ISDN Systems, North Holland Publishing.. Amsterdam, NL, vol. 30, No. 1-7., Apr. 1, 2998, pp. 531-539.

International Business Macines Corporation: "Servlet/AppletJHTML Authentication Process with Single Sing-On", Research Disclosure, Mason Publications, Hampshire, GB, vol. 429, No. 128. Jan. 1, 2000.

Official Action from the European Patent Office dated Dec. 16, 2010, in corresponding European Patent Application No. 01999066.2 (3 pages).

European Search Report for EP 10014306.4, dated Nov. 25, 2011 (7 pages).

European Search Report (EP 01999066) date Dec. 16, 2010.

* cited by examiner

DIGITAL CONTENT DISTRIBUTION AND SUBSCRIPTION SYSTEM

CROSS-REFERENCE TO RELATED APPLICATIONS

This application was filed under 35 U.S.C. 371 based on International Patent Application No. PCT/US01/44146, filed on Nov. 6, 2001, and claims priority to U.S. Provisional Patent Application No. 60/247,492, filed on Nov. 10, 2000, hereby incorporated by reference.

BACKGROUND OF THE INVENTION

1. Field of the Invention

The present invention relates to a digital content distribution and subscription system for digital data files, such as digital, audio or video files, which provides users or subscribers, with, for example, music or video, either streaming data files or locally stored digital files, for a fee.

2. Description of the Prior Art

There is an ever-increasing amount of audio and video content, available as digital computer files, for example, in MP3 format, like those found at www.mp3.com or as streaming digital audio content, for example, as disclosed in U.S. Pat. No. 5,579,430. These new types of audio content can be played on a personal computer with a sound card, but cannot be played on a radio or stereo that is designed to receive and amplify analog audio signals. Although there are several techniques for converting digital audio content to an analog signal so that it can be used by an analog amplifier, these techniques are known to interfere with the operation of the host PC and require the host PC for the selection and control of the audio files.

Digital audio content is currently available from a number of sources on the Internet. Both streaming audio data as well as stored digital audio files in various formats, such as MP3, are available. In particular, various Internet radio stations are known to provide streaming audio data that is amenable to being played on various streaming audio players. Some streaming audio players are normally under the control of the host PC and thus tie up the host PC while music is being played. Moreover, the song quality of such streaming audio players is relatively low. As such, attempts have been made to provide an interface between the host PC and a conventional stereo. One such interface is available from AudioRequests.com. Although such an interface improves the broadcast sound quality of the music, the system only enables users to play streaming audio files that are broadcast on the Internet.

In order to provide users more capability to select music over the Internet, a number of websites have been developed which provide users the capability to select among various stored digital music files. One example of such a website is the Napster website. The Napster website allowed users to download digital music files from other users that were logged onto the Napster website at the time the request is made. The Napster website did not locally store digital audio files, but merely allowed searches of other user's computers logged onto Napster which matched the requested song. Unfortunately, the quality of the digital audio files varied. Also, digital audio files were only available when other users are logged onto the Napster website. In addition, the Napster model was adjudged to involve illegal copying of copyrighted music works. Thus, there is a need to provide a system for providing digital audio files with a consistent quality without violating copyright laws.

SUMMARY OF THE INVENTION

The present invention relates to a digital content distribution and subscription system for digital data files, such as digital audio and video data files, which provides subscribers, for example, with music or video from locally-stored digital files or on demand for a fee. The system may optionally provide streaming digital data as well as locally-stored digital files. After registration onto the system, a subscriber may select from a relatively wide variety of available digital content, for example, music content ripped from a high-quality digital source to provide relatively consistent digital quality to subscribers. In one exemplary implementation, subscribers may subscribe to a predetermined number of songs slots for a period of time, for example, about 200-400 song slots per month. The subscriber may then select songs from various playlists which causes encrypted digital audio files for the selected music to be downloaded to the subscribers's PC. A license key is downloaded to the subscribers' PC to "unlock" the selected songs to enable them to be decoded and played on the subscriber's personal computer or remote audio equipment for a predetermined time period. At the expiration of the predetermined time period, the license key expires, thereby preventing further playback of the encrypted audio data files. The selections of each subscriber are tabulated for the purpose of royalty tracking and payment of an appropriate license fee to the holders of copyright rights for the selections. The system may also be used to provide additional digital information, such as special events which may be live or pre-recorded. The digital content distribution and subscription system includes a digital content management system, a system for token-based authentication allowing secure data retrieval and a royalty administration system.

The digital content management system manages the amount of digital content data delivered to a client over a predetermined period. The server manages the number client access devices, such as personal computers (PC), which can access the digital content over a predetermined time period.

The token-based authentication system The token-based authentication system provides for anonymous authentication that does not require knowledge of the individual user requesting the download of digital content data or real-time access to user account information. Instead, the token-based authentication system embeds the authentication information, or token, in the download request information itself. In this way, the download or content server authenticates the download request using the token contained in the download request information and therefore does not require any additional information to carry out this authentication, such as access to user account information.

The royalty administration system operates as part of a digital content subscription service to track usage of digital content, for example, music, by subscribers of the digital content subscription service and to calculate royalty payments to, for example, publishing and performance rights holders of the digital music. The digital content subscription service makes available to subscribers a plethora of, for example, digital music. Legally a music subscription service is required to compansate rights holders of the digital content for use of their works. In order to accurately provide compensation, the digital content subscrition service must track usage of the digital music by subscribers of the digital content subscription service. The digital content subscription service also maintans accurate information on the rights holders of the digital music in order to facilitate calculation of royalty payments. With the digital music usage information and the rights holder information, the digital content subscription service is able to effectively and accurately calculate payment to the digital music rights holders for use of their works.

The current system provides subscribers with relatively high-quality consistent digital audio files and allows subscribers to select from a relatively wide range of stored digital audio files on demand while not violating copyright laws.

BRIEF DESCRIPTION OF THE DRAWINGS

These and other advantages of the present invention will be readily understood with reference to the following specification and attached drawings wherein.

DETAILED DESCRIPTION

Figure 1:
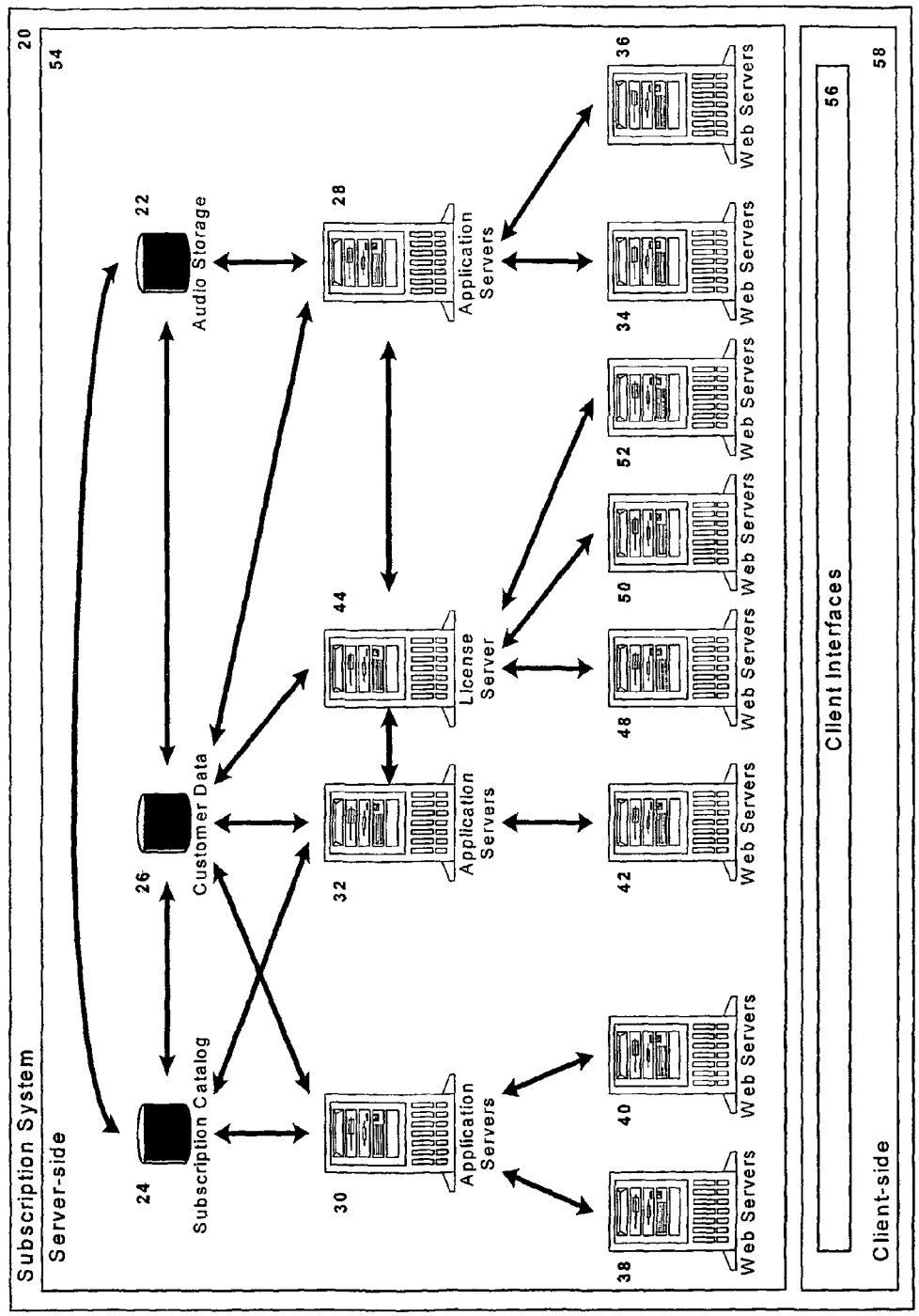
FIG. 1 is a block diagram of the server side of a digital content distribution and subscription system in accordance with the present invention.

The present invention relates to a digital content distribution and subscription system for digital data files, such as audio or video data files, which enables subscribers to subscribe to high-quality digital files for a fee. Various technical implementations of the system are contemplated. An exemplary implementation of the system is ilustrated in FIG. 1 and generally identified with the reference numeral 20. The system 20 illustrates the server side of the system. An exemplary client side of the system is described in detail in copending commonly-owned patent application, entitled "Structure and Method for Selecting, Controlling and Sending Internet-Based or Local Digital Audio to an AM/FM Radio or Analog Amplifier", Ser. No. 09/709,772, filed on Nov. 10, 2000, (now U.S. Pat. No. 7,702,403) hereby incorporated by reference.

Figure 51:
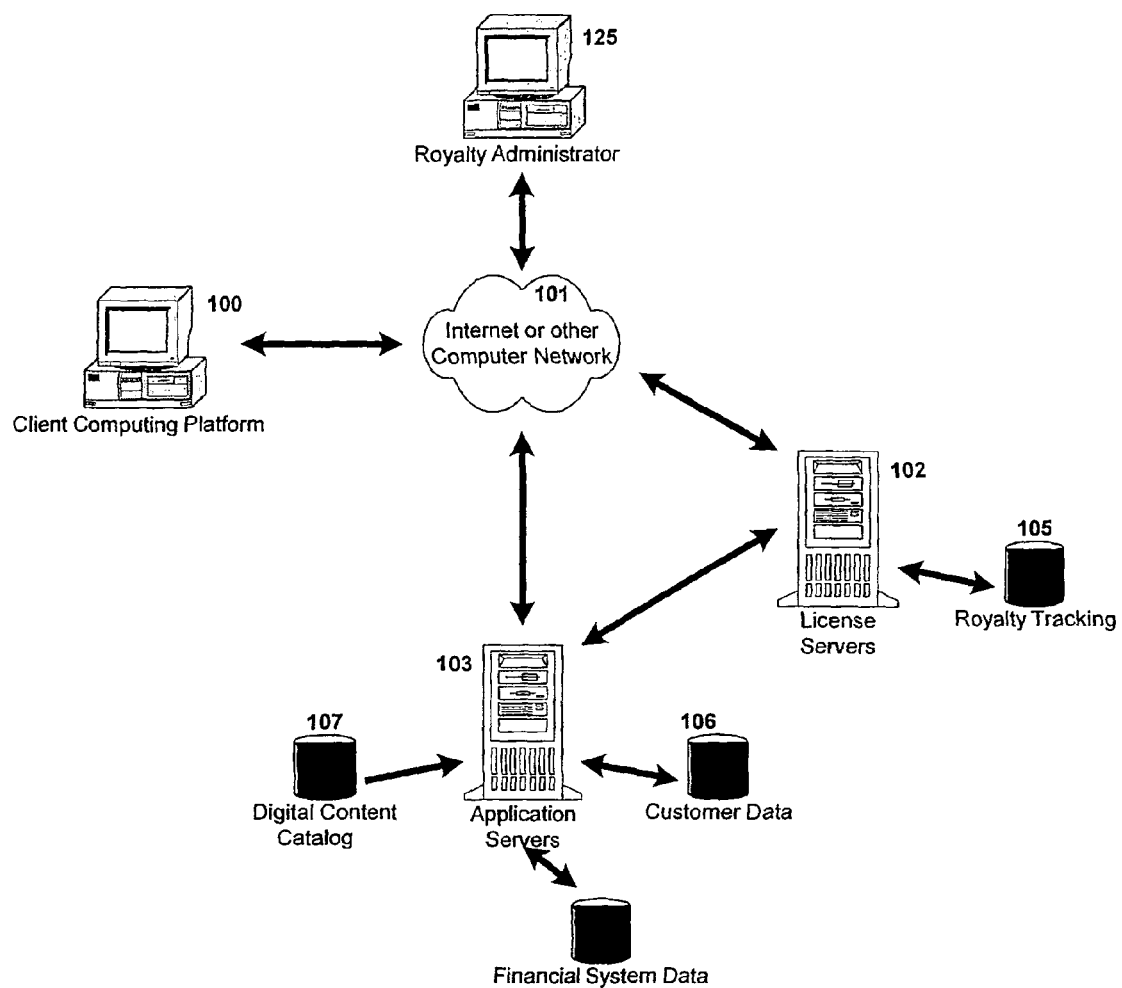
FIG. 51 is a block diagram that illustrates an overview of a royalty administration system which forms a part of the digital content distribution and subscription system.
Figure 52:
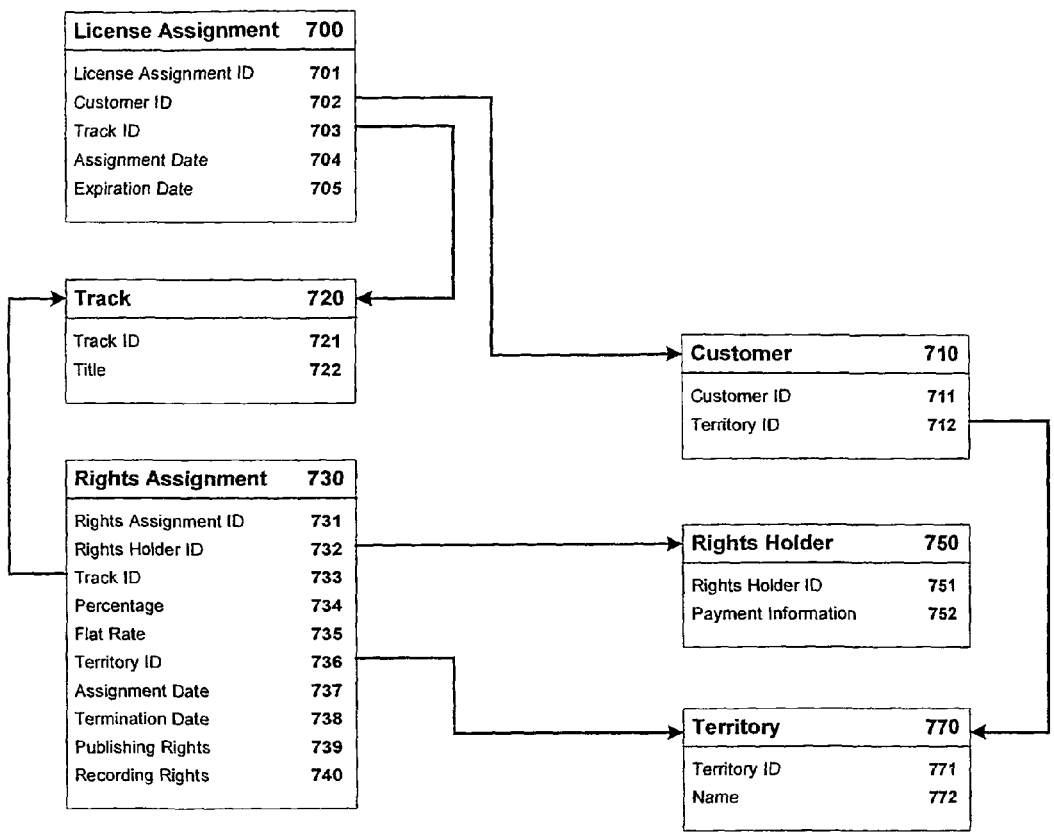
FIG. 52 is a block diagram of royalty tracking and payment data organization for a royalty administration system which forms a part of the digital content distribution and subscription system.
Figure 53:
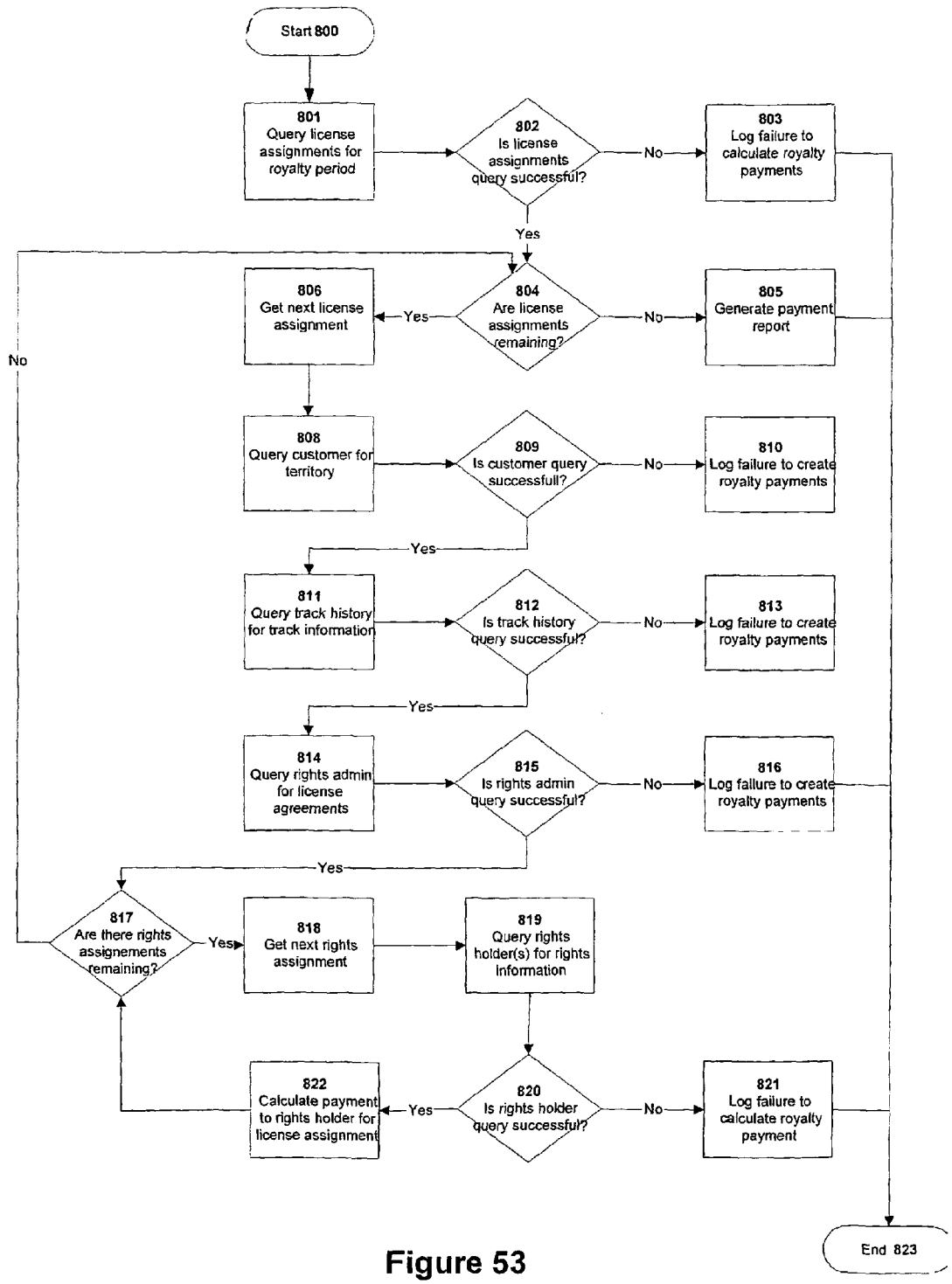
FIG. 53 is a software flow diagram on a royalty administrator of royalty payment calculation for a royalty administration system which forms a part of the digital content distribution and subscription system.

The digital content distribution and subscription system includes a digital content management system; a token-based authentication system and a royalty administration system. The digital content management system is described in connection with FIGS. 40-43. The token-based authentication system is described in connection with FIGS. 44-50. FIGS. 51-53 illustrate the royality administration system.

Figure 2:
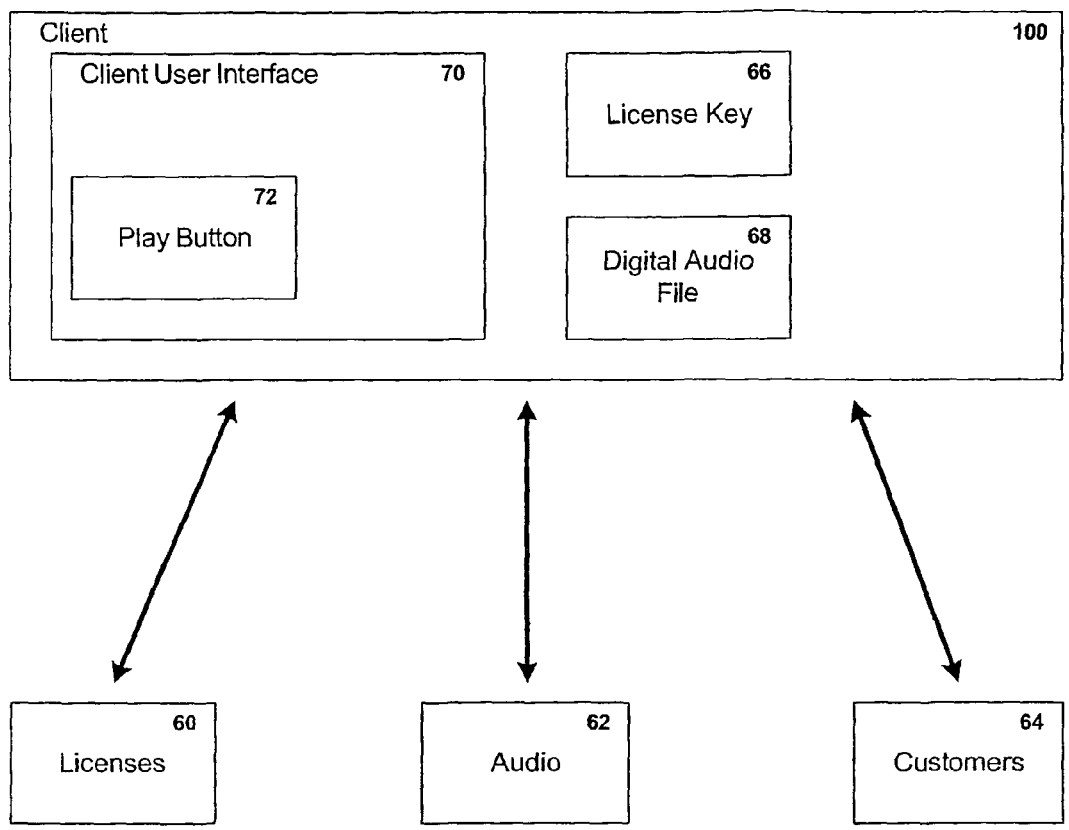
FIG. 2 is a simplified block diagram illustrating the interface between the server side and the client side of the system illustrated in FIG. 1.
Figure 3:
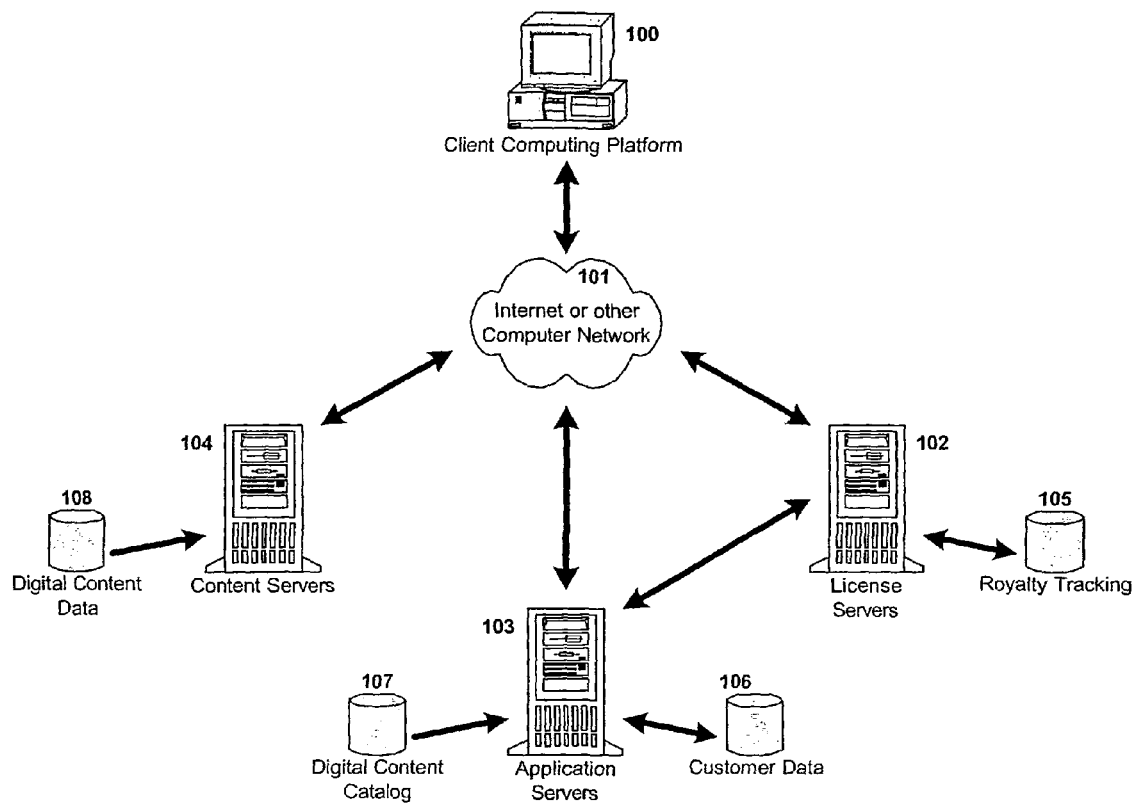
FIG. 3 is a block diagram that provides an overview of the client and server side of the digital content distribution and subscrition service illustrated in FIGS. 1 and 2.

FIGS. 1 and 2 are simplified block diagrams of the invention. FIGS. 3-60 represent more detailed diagrams of the present invention. The system is illustrated and described in terms of a distribution and subscription service or system of digital audio files, however, the principles of the present invention are equally applicable to other digital files, such as digital video files.

Referring to FIG. 1, the server side of the system is illustrated. As shown, the server side of the system 20 may include one or more data stores 22, 24 and 26, which may be implemented as databases on one or more servers in a conventional manner. The data store 26 is a Customer data store, used to store various types of customer information, such as the name of customer, the type of subscription and the subscribed digital files. The Customer data store 26 may also include royalty tracking logs. The data store 24 is a Subscription Catalog data store, which may include various subcription catalog information, such a meta information regarding the stored digital audio files such as tracks, artists, albums and playlists for stored digital files. The data store 22 is a Digital Content data store, which may include the stored digital audio files as well as digital rights management (DRM) software, for example, Microsoft DRM or Intertrust DRM software. The digital rights management software may be used to enable decrypting of digital files downloaded to a subscriber's personal computer.

The data stores 22, 24 and 26 may be interfaced to one or more subscribers or clients by one or more application servers 28, 30 and 32, as well as one or more web servers 34, 36, 38, 40 and 42. In addition, one or more license servers 44 may be connected to the Customer data store 26 and interfaced to the client side by way of one or more web servers 48, 50 and 52. As will be described in more detail below, after a registration process, a subscriber may simply log onto the digital content service provider's website, for example, as illustrated in the exemplary web pages in FIGS. 33-39.

In one embodiment of the invention, subscribers may purchase a number of time slots for a predetermined time period, for example, a month, for a fee. The time slots may include, for example, various stored digital audio or video files, which may include new releases as well as other files, such as live or pre-recorded special events, for example, concerts and other events. Alternatively, the plan may allow for providing pay-per-play digital audio or video files.

Subscribers may select music or video content from a list, such as a playlist to fill up the time slots for the predetermined period. For example, a subscriber may subscribe to, for example, 230 song slots for a one-month period for a monthly fee. In particular, the subscriber may select from various digital audio or video files by way a website, the digital files to be downloaded to the subscriber's personal computer for play anytime during the month. Optionally, a subscriber, after first selecting a number of digital audio files, may select an auto renewal feature for one or more of those files which causes the subscription of the selected audio files to be automatically renewed on a periodic basis, such as a subscription or billing period, on the subscriber's PC.

An important aspect of the invention is that the selected digital audio or video files are downloaded in an encrypted format. As will be described in more detail below, a "key" is also downloaded to the subscriber's PC which enables the downloaded digital audio or video files to be decrypted. The "key" may be valid for only a predetermined time period, for example, one month. A separate "key" may be issued for each selected digital audio or video file. Thus, at the end of the time period, the "key" expires to prevent decryption of the selected digital audio or video files beyond the subscription period.

Referring to FIG. 1, a subscriber, connected to the client side, makes selections by viewing various playlists and meta information from the subscription Catalog data store 24 by way of the web pages illustrated in FIGS. 33-39. The subscriber information is verified by the Customer data store 26. As discussed above, the Customer data store 26 is a database which contains various customer information, as well as the type of subscription and the number of tracks in the subscription. In addition, the Customer data store 26 may also maintain royalty tracking logs for the purposes of paying royalties to the appropriate parties. Once the customer information is verified, the selected digital audio files are downloaded from the Digital Content Storage data store 22 as well as a "key" is downloaded from the license server 44 to the subscriber's computing platform 100 (FIG. 6), such as a PC. As mentioned above, the license "key" is used to decode or decrypt the encrypted digital audio files.

An exemplary user interface is illustrated in FIG. 2. As shown, the exemplary user interface, generally identified with the reference numeral 70, is located on a client computing platform 100 and is described in detail in the above-mentioned co-pending application, hereby incorporated by reference and as described below in connection with FIGS. 33-39. The user interface 70 may include a play button 72. In an exemplary embodiment, a subscriber may select the play button 72 to initiate opening of a downloaded digital audio or video file 68, which, as mentioned above, is downloaded in encrypted format to the subscribers personal computer. If a license "key" 66 has also been downloaded, the system utilizes the "key" to decrypt or unlock the file 68 to enable the digital audio file 68 to be played by various players, such as Windows Media Player, or remote audio equipment, as described in detail in the above-mentioned commonly-owned co-pending patent application.

FIGS. 3-60 represent a more detailed embodiment of the invention. Referring to FIG. 3, a digital content distribution and subscription system provides access by a client computing platform 100 to digital content data 108 over the Internet or other computer network 101. An overview of a digital content distribution and subscription system, illustrated in FIG. 3, shows the relationship and interaction between the client computing platform 100, the digital content data 108, various servers 102, 103, and 104, and various data sources, identified with the reference numerals 105, 106, and 107, that may encompass the digital content distribution and subscription system.

In the digital content distribution and subscription system, the client computing platform 100 initiates requests for digital content data 108, such as digital video or music files. Before these requests can be made, the user on the client computing platform 100 may need to be authenticated through interaction with one or more of the application servers 103. The application servers 103 compare user information received from the client computing platform 100 with customer information in one or more Customer data stores 106.

User authentication, though only optionally required in a digital content distribution and subscription system, provides the capability to record user download histories for billing of the user. User authentication also provides a higher level of security for the digital content data 108, if it is required that the download of the digital content data 108 be restricted exclusively to authorized users.

Once a user is authenticated or if the user does not require authentication, a user on a client computing platform 100 may access a digital content catalog 107 through one or more of the application servers 103. The digital content catalog 107 contains information about the digital content data 108, with the primary purposes of the digital content catalog 107 being to simplify searches by the user of digital content data 108 and to obtain more specific information about the digital content data 108. For example, where the digital content data 108 is digital music, the digital music may be organized as individual tracks or songs and the digital content catalog 107 may contain information about each track, such as the artist, track name, album name, and musical genre, among other things. After a user on a client computing platform 100 has determined what digital content data 108 to download, the client computing platform 100 accesses this digital content data 108 through one or more content servers 104. In addition, where the digital content data 108 is kept in a secure or protected format, the client computing platform 100 must also obtain access or playback licenses for the digital content data 108 in order to access or playback the digital content data 108, for example, when the digital content data 108 is digital video or music files. The client computing platform 100 accesses the license servers 102 to obtain these access or playback licenses, using, for example, Microsoft Windows Media Rights Manager, for digital rights management. In order to simplify operation of the license servers 102, the client computing platform 100 may be forced to access the license servers 102 indirectly through one or more of the application servers 103, since the application servers 103 already need to handle user authentication. This configuration may thus be used to eliminate the need for the license server 102 to also handle user authentication. The license servers. 102 may also be used to save information about licensing for royalty tracking 105, used for determining royalty payments to rights holders of the digital content data 108. Once the digital content data 108 is downloaded onto the client computing platform 100, and, if necessary, the proper access or playback licenses are obtained from the license server 102, the user may access the digital content data 108 locally on the client computing platform 100. For example, the user may playback digital music files using, for example, Microsoft Windows Media Player. The user may also download the digital content data 108 from the client computing platform 100 to another device such as a Pocket PC device for example, Compaq's iPAQ device for access or playback on the device.

It should be noted that the various servers 102, 103, and 104, shown in FIG. 3, could physically represent many different servers in geographically disparate locations and need not be limited to a single server or a group of servers in a single geographic location. It should also be noted that one or more other servers may exist in the connection between the client 100 and the various servers 102, 103, and 104 with it being understood that these other servers are collectively represented within the Internet or other computer network 101.

Subscription Service Architecture

Figure 4:
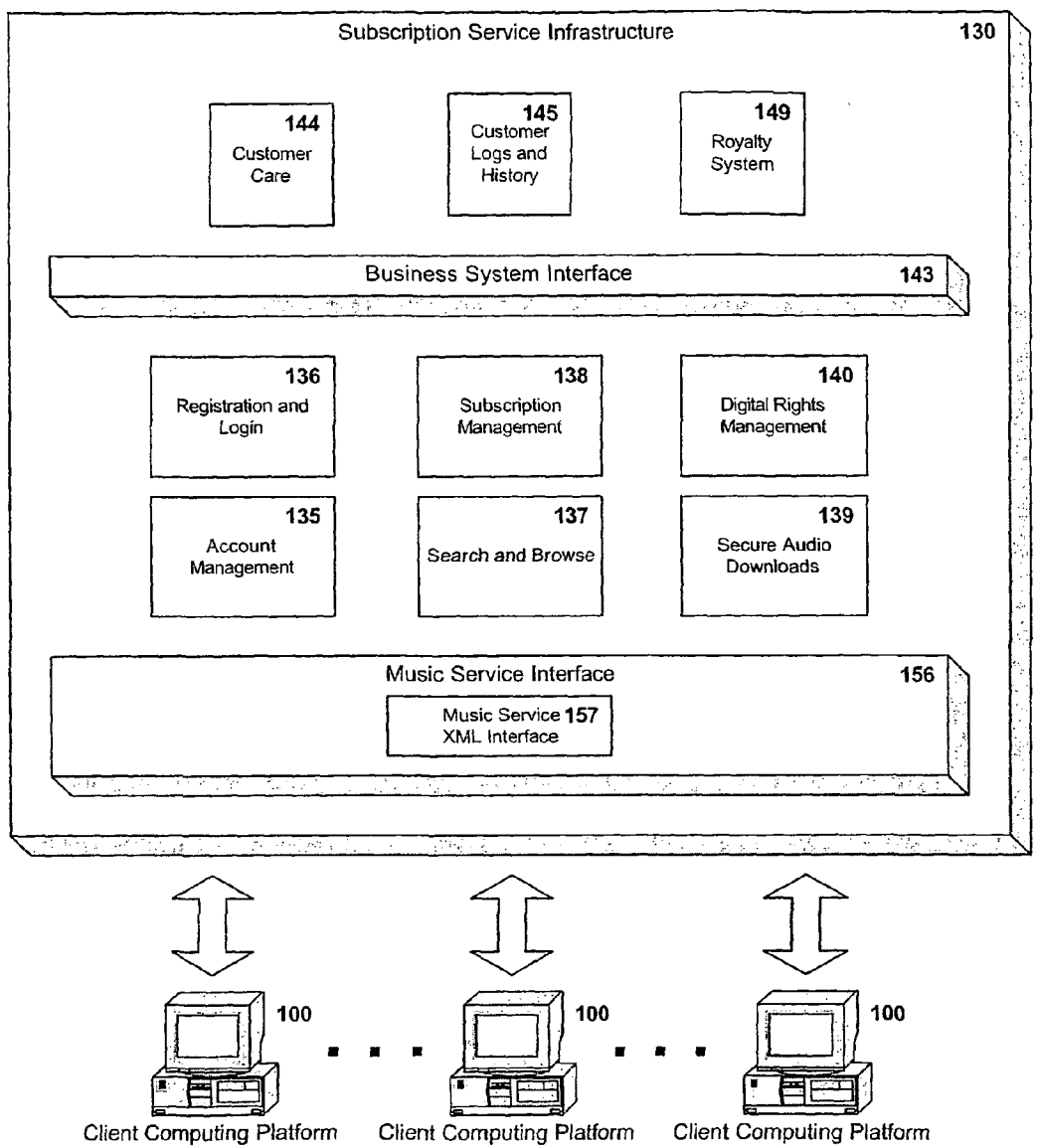
FIG. 4 is a block diagram of the organization and architecture of a digital content distribution and subscription service infrastructure illustrated in FIGS. 1-3.

The block diagram in FIG. 4 demonstrates one embodiment of the organization and architecture of a subscription service infrastructure 130 for digital music, which forms a part of the digital content distribution and subscription system. The subscription service infrastructure 130 may be implemented across the various servers 102, 103, and 104 and various data stores 105, 106, 107, and 108 (FIG. 3) in a manner that may be transparent to the one or more client computing platforms 100 that access the subscription service infrastructure 130.

In particular, one or more client computing platforms 100 may access the subscription service infrastructure 130 through a music service interface 156, which may be supported using industry standard technologies, for example, XML. The music service interface 156 includes, in this embodiment, a music service XML interface 157. The music service XML interface 157 allows the client computing platform 100 to communicate with the subscription service infrastructure 130 of the digital content distribution and subscription system using the industry standard XML protocol, for example, using the exemplary web pages illustrated in FIGS. 33-39 and discussed below. Other interfaces using industry standard technologies, such as Java, may be supported in other embodiments. The music service interface 156 acts to abstract and encapsulate the subscription service infrastructure 130 of the digital content distribution and system for the client computing platform 100. This allows the client computing platform 100 to be able to access service features and capabilities without requiring a detailed understanding of the internal workings of the subscription service infrastructure 130.

There are many features and capabilities of the subscription service infrastructure 130, collectively referred to as the digital content management system. For example, before a subscriber on a client computing platform 100 can access the various features and capabilities in the subscription service infrastructure 130 of the digital music subscription service, the subscriber may optionally require registration and login 136. Registration allows the subscriber to submit billing and profile information, for example, music preferences, and also to provide a login name and password. The billing, profile, and login information is stored as part of customer data 106. Login may be required whenever the subscriber accesses the features and capabilities in the subscription service infrastructure 130 of the digital content distribution and subscription system. This allows the subscription service infrastructure 130 to authenticate and authorize subscribers in order to prevent unauthorized access to the digital music subscription service, as discussed in more detail below.

An Account Management software system 135 may also be provided to allow a subscriber of the digital music subscription service using a client computing platform 100 to make changes to their profile, for example, their address, phone number, and music preferences. The Account Management software system 135 may also be configured to enable the subscriber to make changes to their subscription plan, for example, the number of songs per month to be included in the subscription.

A Search and Browse software system 137 may also be provided to allow a subscriber to search the digital content catalog 107 to determine what digital content data 108 the subscriber may wish to download as discussed in detail below. Once a subscriber has selected digital content data 108 to download, the secure downloads software system 139 in the subscription service infrastructure 130 ensures that downloads of the digital content data 108 are only made by authenticated and authorized subscribers. Authentication for secure audio downloads may not only be done using the subscriber login but also by identifying the digital content data 108 to download in a dynamic manner, for example, by way of unique identifiers or tokens, described below in connection with FIG. 44, so that a download address is only valid for download by a specific subscriber during a specific time period.

A Digital Rights Management software system 140 may also be provided and functions as an additional level of protection for the digital content data 108 to prevent access to or playback of the digital content data 108 through encryption of the digital content data 108 and the use of access or playback licenses. Decryption of the digital content data 108 for access to or playback of the digital content data 108 requires the subscriber on the client computing platform 100 to have specific access or playback licenses for the digital content data 108. The access or playback licenses are obtained from license servers 102 and are handled in a manner corresponding to the specific requirements of the digital rights management 140 implementation used, for example, Microsoft Windows Media Rights Manager. These access or playback licenses may have an expiration or lifetime associated with them so that a subscriber must renew licenses periodically in order to continue to access or playback the digital content data 108. The renewal process is handled by a Subscription Management software system 138, which works in conjunction with the Digital Rights Management software component 140 to provide updated or new access or playback licenses as existing licenses expire and when the subscriber requests continued access to or playback of the digital content data 108.

Just as the music service interface 156 simplifies access to the music services 135-140 of the subscription service infrastructure 130 from client computing platforms 100, a Business System Interface software system 143 simplifies access to the music services 135-140 by one or more of a plurality of business software systems 144, 145, and 149. For example, a Customer Care software system 144 may be provided to enable subscription service support personnel to provide technical and system support for subscribers. This may include handling questions and issues related to account management 135 and registration and login 136. A Customer Logs and History software system 145 may be provided to track customer or subscriber access to the digital music subscription service and subscriber activity, such as account management 135 to record subscriber plan and profile changes. This information can be used as part of the Customer Care software system 144 to facilitate support for subscribers. The Customer Logs and History software system 145 may also be used to track subscriber secure audio downloads, used for royalty tracking 105. Royalty tracking 105 information may be used by a Royalty System software system 149 as described in detail in connection with FIG. 51, which is responsible for determining royalty payments to rights holders of the digital content data 108 that are assigned licenses and downloaded.

Music Service Interface

The Music Service Interface 156 acts to abstract and encapsulate the subscription service infrastructure 130, described previously in connection with FIG. 4, of the digital music subscription service for access by a client computing platform 100. This allows a client computing platform 100 to be able to access service features and capabilities without requiring a detailed understanding of the internal workings of the subscription service infrastructure 130. The music service interface 156 includes, in this embodiment, a music service XML interface 157. The music service XML interface 157 allows the client computing platform 100 to communicate with the subscription service infrastructure 130 of the digital music subscription service using the industry standard XML protocol. Other interfaces using industry standard technologies, such as Java, can be supported in other embodiments.

Figure 5:
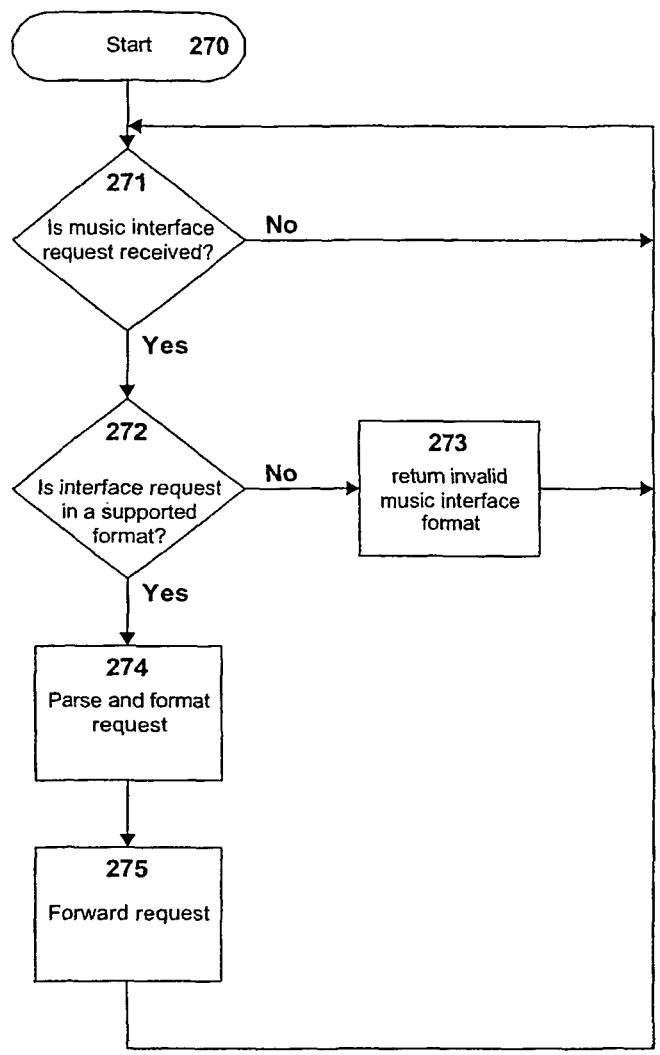
FIG. 5 is a software flow diagram on an application server for a music service interface which forms a part of the distribution and subscription service infrastructure.

FIG. 5 provides the software flow diagram for the Music Service Interface 156 running on an application server 103, called the music service interface handler. In this example, the music service interface handler is a continuously running process on the application server 103. "Start" in step 270 represents the beginning of the music service interface handler routine. If a music service interface request is received from a client computing platform 100 in step 271, the music service interface handler checks if the music service interface request is in a supported format in step 272. Supported formats may include XML protocol, a computing industry standard. If the format of the music service interface request is not supported in step 272, the music service interface handler returns that the music interface format is invalid to the calling client computing platform 100 in step 273 and the music service interface handler checks for music service interface requests in step 271 again. If the music service interface request is in a supported format in step 272, the music service interface handler parses and formats the interface request in step 274, as necessary. Then the music service interface handler forwards in step 275 the request to the appropriate handler, discussed below in connection with FIGS. 11, 14, 17, 21, 22, 27, 31, and 32). Finally, the music service interface handler checks for music service interface requests in step 271 again. In this way, the music service interface handler operates in a manner transparent to the client computing platform 100 and to other handlers on the application server 103.

Client Computing Platform

Figure 6:
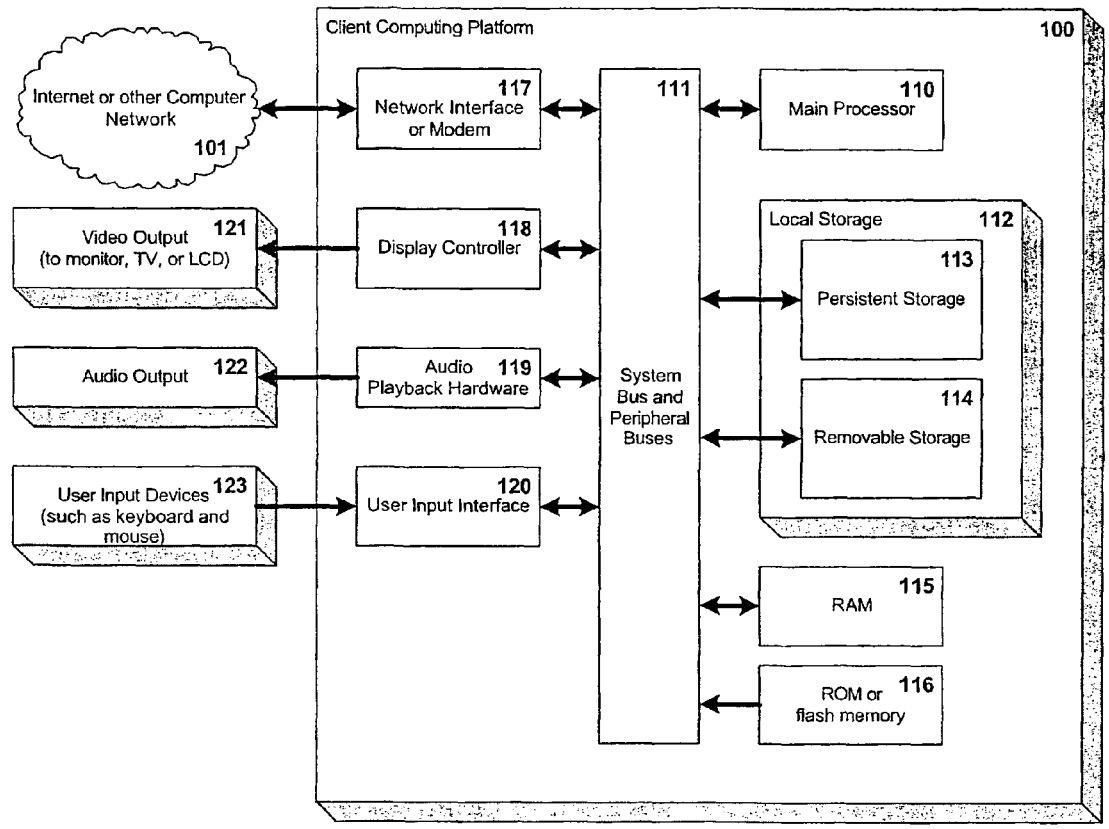
FIG. 6 is a block diagram of a client computing platform for use with the digital content distribution and subscription system.

FIG. 6 illustrates an exemplary architecture for a client computing platform 100, which can encompass anything from general-purpose devices, such as a personal computer, to open fixed function devices, such as a set-top box that connects to a television set. However, a client computing platform 100 is not restricted to these examples. In general, the client computing platform 100 includes a main processor 110, for example, an Intel Pentium III, for executing various software components. The various software components are typically stored in read only memory, or ROM, or flash memory 116, or local storage devices 112. The local storage devices 112 can consist of persistent storage 113, such as hard drives or flash memory, or removable storage devices 114, such as floppy drives, CD-ROM drives, or DVD drives. The software components may be executed by the main processor 110 directly from their storage location or are loaded into random access memory (RAM) 115 to be executed from the RAM 115 by the main processor 110. The local storage 112 can also be used to cache digital content data 108, such as digital music files, and other information.

The client computing platform 100 also includes a network interface or modem 117 to access various servers 102, 103, and 104 on the Internet or other computer network 101 in order to download digital audio content data 108 and other information. The network interface or modem 117 may be connected internally or externally to the client computing platform 100 using a system bus or peripheral bus 111. The system bus and peripheral buses 111 are provided for connecting internal and external devices to the client computing platform 100 in a conventional manner. Typical system and peripheral buses 111 that may be used include a Universal Serial Bus, commonly referred to as USB, an IEEE 1394 bus, commonly referred to as FireWire, and a Peripheral Connect Interface bus, commonly referred to as a PCI bus. The client computing platform 100 may also support connection through a user input interface 120 to external or integrated user input devices 123, such as a keyboard and mouse. For output to the user, the client computing platform 100 may contain a display controller 118, for example, an NVIDIA model GeForce2, which stores graphical data, such as windows, bitmaps and text. The display controller 118 outputs the graphical data in a video output 121 format that is typically displayed to the user on a video monitor, television, or LCD panel. The client computing platform 100 may also be configured to provide audio output 122 either in addition to or in lieu of the video output 121. The audio output is handled by the audio playback hardware 119.

It should be noted that a client computing platform 100 is not limited to the capabilities and features listed in this description, but may contain a subset of the described features or may contain additional capabilities or features not listed. It should also be noted that the client computing platform 100 may also be referred to as a client 100 in the various diagrams and descriptions provided here.

Client Software Architecture

Figure 7:
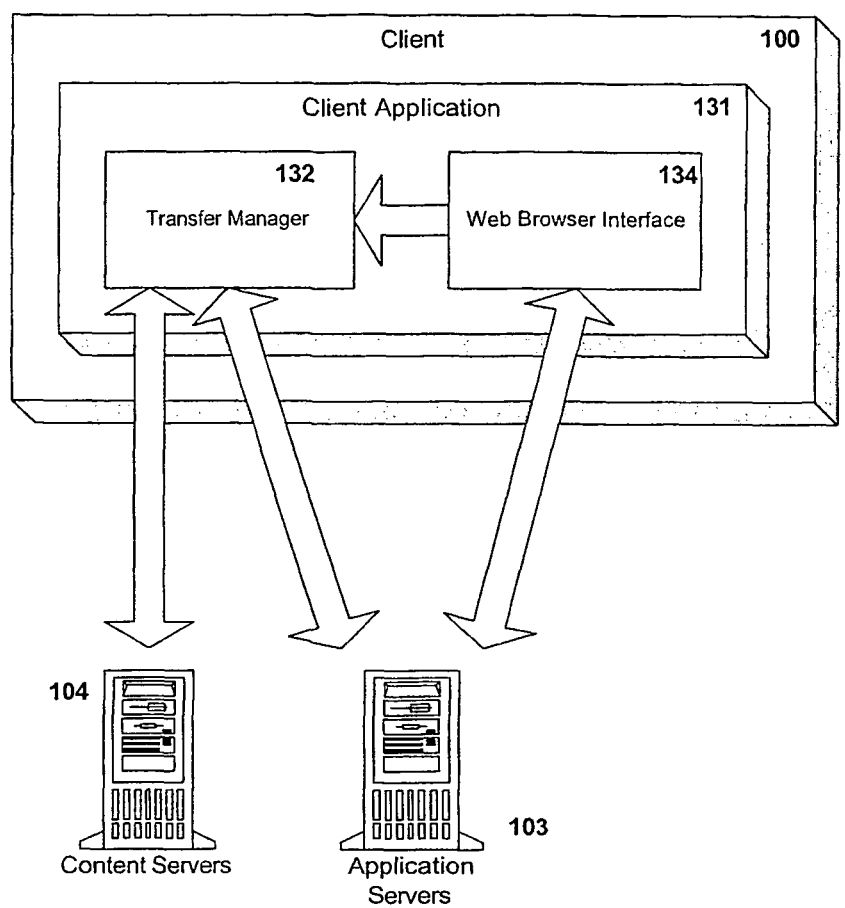
FIG. 7 is a block diagram for a client application on the client computing platform which forms a part of the digital content distribution and subscription system.

FIG. 7 illustrates an exemplary embodiment of the architecture for a client application software component 131 running on the client 100 as part of a digital content distribution and subscription system. This particular embodiment takes advantage of commonly available software, for example, on a personal computer by integrating the functionality of the client application component 131 with an existing web browser interface 134, for example, Microsoft Internet Explorer. The web browser interface 134 provides a graphical user interface to enable a user to directly interact with the application servers 103 to access some features and capabilities of the digital content distribution and subscription service using standard Internet and World Wide Web communication protocols, such as HTTP. The Web Browser Interface software system 134 can be configured to pass other information received from the application servers 103 to a Transfer Manager software module 132, the other main component of the client application 131.

The Transfer Manager software system 132 provides an additional graphical user interface that allows the user to interact with and access the various features and capabilities of the digital content distribution and subscription service on the application servers 103 as well as the content servers 104. In addition, the Transfer Manager software system 132 can provide automated access to the digital content distribution and subscription service and automated notifications to the user. The details of the operation of the components of the client application 131 within the digital content distribution and subscription system are discussed below.

Software Diagrams

FIGS. 8-32 provide system level and device specific block diagrams and software flow diagrams of the features and capabilities of a digital content distribution and subscription system. Some of these features and capabilities may be unique to a secure distribution and subscription service where access to and playback of the digital content data 108 is restricted to authenticated clients 100 and authorized users. The features and capabilities demonstrated in these diagrams include logging into the service, searching the digital content catalog 107, downloading digital content data 108, and renewing playback licenses. It should be noted that these software flow diagrams represent only one of a plethora of possible embodiments for a digital content distribution and subscription system.

Client Transfer Manager

Figure 8:
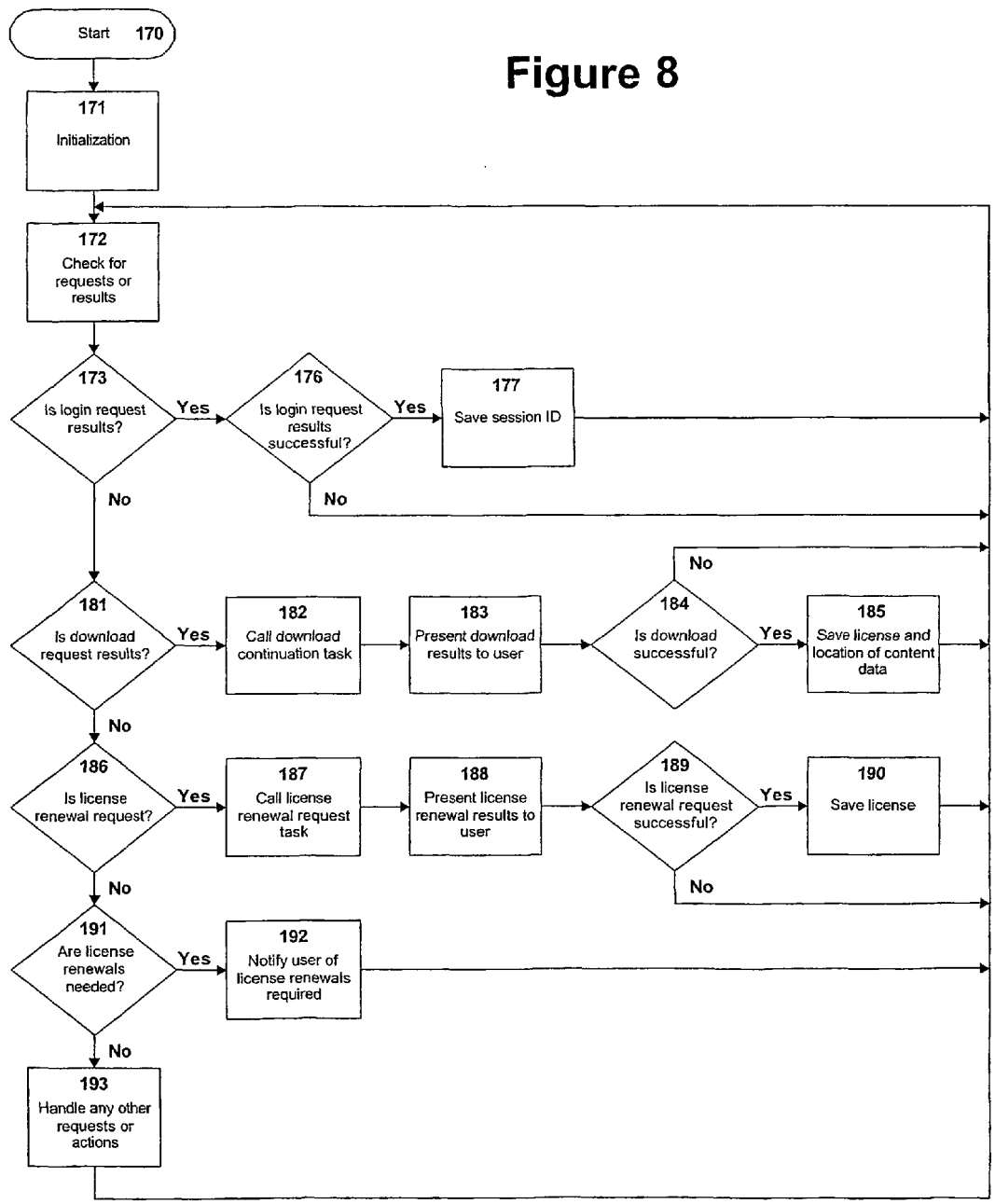
FIG. 8 is a software flow diagram for a Transfer Manager software system of the client application which forms a part of the digital content distribution and subscription system.

A client application 131 (FIG. 7) is used as an interface running on the client 100 to allow a user to interact with the digital content distribution and subscription system running on various servers 102-104 (FIGS. 3 and 7). In this embodiment, the client application 131 leverages an existing web browser interface 134 (FIG. 7), for example, Microsoft Internet Explorer. In addition, the client application 131 also includes the Transfer Manager software system 132 as illustrated in FIG. 8. As a part of the interface to the user, the Transfer Manager software system 132 in the client application 131 handles user inputs and requests. The Transfer Manager software system 132 then converts these inputs and requests into interactions with the digital content distribution and subscription system. Finally, the Transfer Manager software system 132 presents the results of these inputs and requests back to the user on the client 100. In this example, the Transfer Manager software system 132 in the client application 131 is a continuously running process on the client computing platform 100.

"Start" in step 170 (FIG. 8) represents the beginning of the Transfer Manager software system 132. Next, the Transfer Manager software system 132 goes through a initialization in step 171, which may include, for example, verifying a connection on the client computing platform 100 to the Internet or other computer network 101 in order to be able to access various servers 102-104. Then the Transfer Manager software system 132 checks for requests by the user or results to the user in step 172. These requests may include, for example, license renewals. Other requests, such as login, search, and download are typically initiated by the user from the Web Browser Interface software module 134 (FIG. 7) with the results of, for example, the login and download requests then being handled by the Transfer Manager software system 132. If there are login request results in step 173, (FIG. 8) and if the login request results are successful in step 176, then a session identifier is saved in step 177. As described in connection with FIG. 12, the application server 103 returns the session identifier to the client application 131 for use by the client 100 in future requests. After the session identifier is saved in step 177 or the login request results were not successful in step 176, the Transfer Manager software system 132 checks for requests by the user or results to the user in step 172 again. If there were no login request results in step 173 and if there are download request results in step 181, the Transfer Manager software system 132 calls a download continuation task handler, described below in connection with FIG. 20, in step 182. The results of the download are presented to the user in step 183. If the download is successful in step 184, then an access or playback license for the digital content data 108 and the location of the downloaded digital content data 108 are saved in step 185. After the access or playback license and digital content data location are saved in step 185 or the download was not successful in step 184, the Transfer Manager software system 132 checks for requests by the user or results to the user in step 172 again. If there were no download request results in step 181 and if there is a license renewal request in step 186, then the Transfer Manager software system 132 calls a license renewal request task handler, described below in connection with FIG. 26, in step 187. The results of the license renewal request are presented to the user in step 188. If the license renewal request is successful in step 189, then the access or playback license for the digital content data is saved in step 190. After the access or playback license is saved in step 190 or the license renewal request was not successful in step 189, the Transfer Manager software system 132 checks for requests by the user or results to the user in step 172 again. If there was no license renewal request in step 186 and if there is a license renewal needed in step 191, that is to say some of the licenses have expired for any of the digital content data 108 stored on the client 100, then the Transfer Manager software system 132 notifies the user that license renewals are required in step 192. Then the Transfer Manager software system 132 checks for requests by the user or results to the user in step 172 again. If there were no license renewals needed in step 191, then the Transfer Manager software system 132 handles any other requests or actions in step 193. Then the Transfer Manager software system 132 checks for requests by the user or results to the user in step 172 again.

Registration Request

Figure 9:
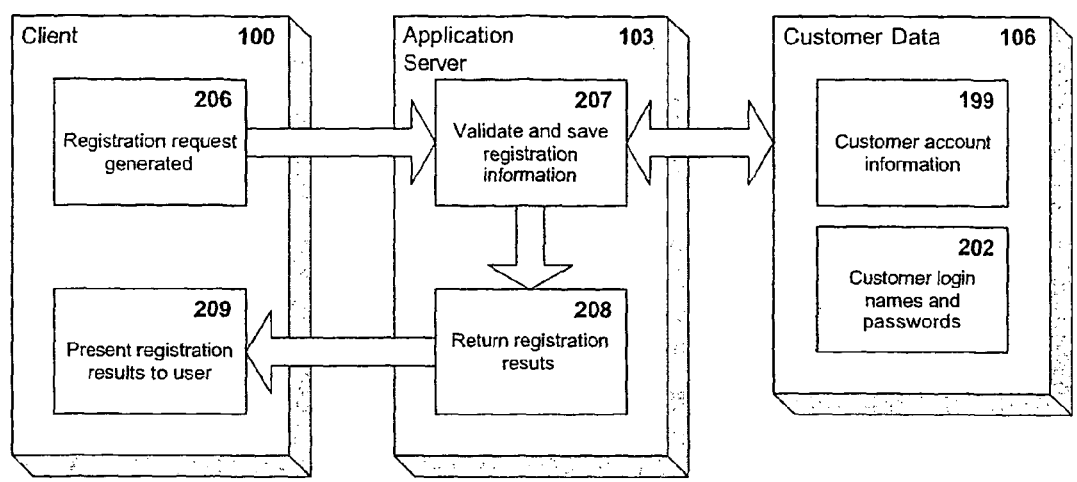
FIG. 9 is a system level software flow diagram for a client registration request which forms a part of the digital content distribution and subscription system.

Registration and user login, allows registered subscribers to access the digital content distribution and subscription system. FIG. 9 provides a block diagram or system level software flow diagram for a registration request, while FIGS. 10 and 11 provide specific software flow diagrams for a registration -request on the client 100 and on the application server 103, respectively.

Registration, shown in FIG. 9, begins with the generation of a registration request in step 206 by the client 100. The registration request in step 206 is sent to an application server 103, which then validates and saves the passed registration information in step 207. The saved registration information in step 207 is customer account information 199, which includes customer name, geographic location for royalty tracking, and billing information, and customer login names and passwords 202, all of which are part of customer data 106. The application server 103 then returns the registration results in step 208 to the client 100 and the client 100 presents the registration results to the user in step 209.

Figure 10:
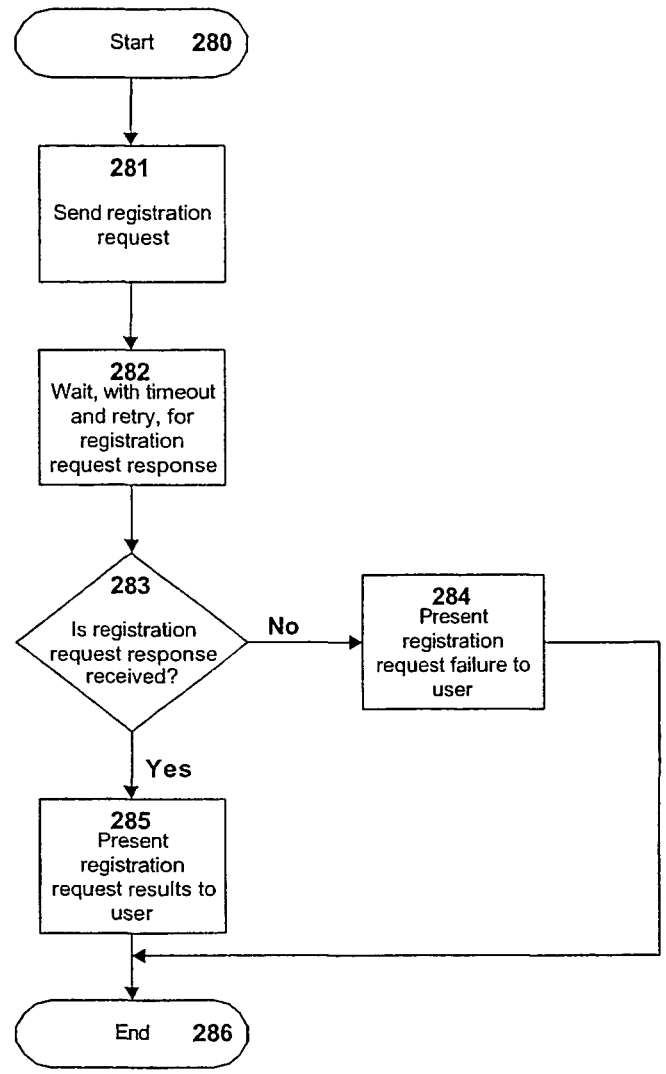
FIG. 10 is a software flow diagram of an interface browser component of the client application for the client registration request which forms a part of the digital content distribution and subscription system.

FIG. 10 is a client specific software flow diagram for a registration request, called the registration request task. In this embodiment, the registration request task is handled within the web browser interface 134, a component of the client application 131, described previously in connection with FIG. 7. A user on a client 100 initiates a registration request task through, for example, a manual registration attempt. "Start" in step 280 represents the beginning of the registration request task on the client 100. Next, a registration request is generated and sent in step 281 to the application server 103. The registration request may include the user's name, geographic location, and billing information. The registration request task then waits with some timeout, for example, 2 seconds, and possibly with multiple retries for a registration request response in step 282 from the application server 103. If a registration request response is not received in step 283, then the registration request task presents the registration request failure to the user in step 284 and the task ends in step 286. If a registration request response is received in step 283, then the registration request task presents the registration request results to the user in step 285 that were received from the application server 103 and the task ends in step 286.

Figure 11:
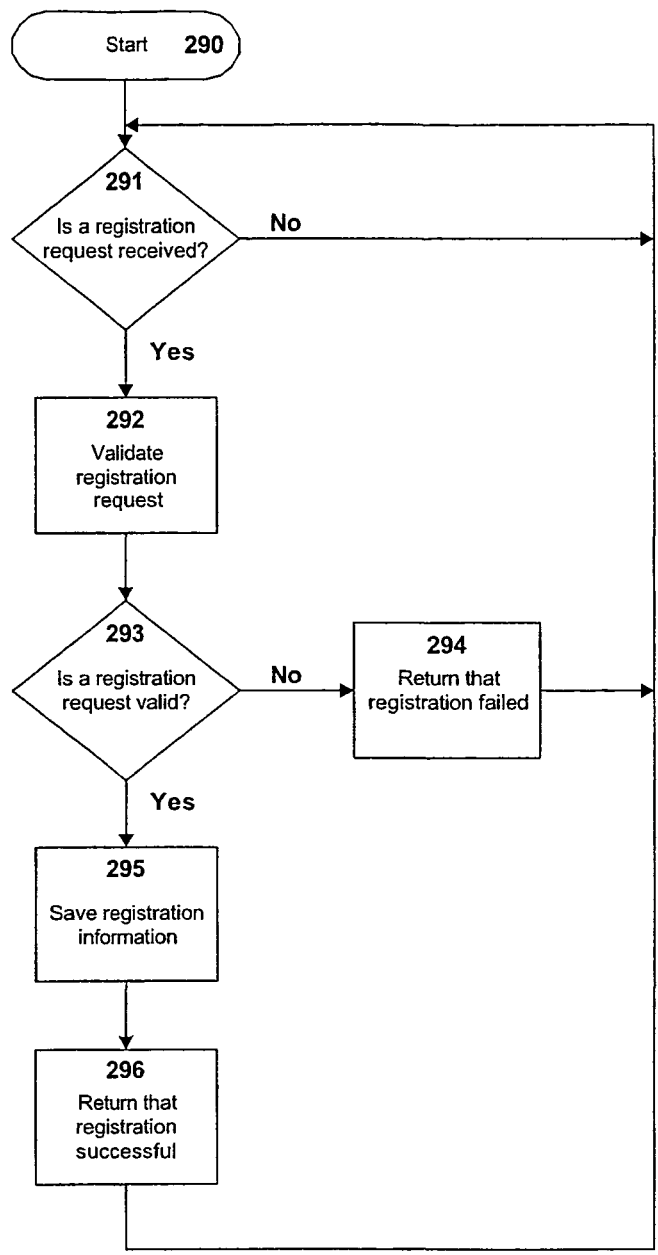
FIG. 11 is a software flow diagram on an application server for a client registration request which forms a part of the digital content distribution and subscription system.

FIG. 11 is an application server specific software flow diagram for a registration request, called the registration handler. The registration handler is a continuously running process on the application server 103. "Start" in step 290 represents the beginning of the registration handler which enters a state waiting for registration requests. If a registration request is received in step 291 from a client 100, the registration request is validated in step 292. If the registration request is not valid in step 293, the registration handler returns that the registration failed in step 294 to the calling client 100. The registration handler then checks for any registration requests received in step 291 again. If the registration request is valid in step 293, the registration handler saves the registration information in step 295 to customer data 106. Finally, the registration handler returns that the registration was successful in step 296 to the calling client 100 and checks for any registration requests received in step 291 again.

Login Request

Figure 12:
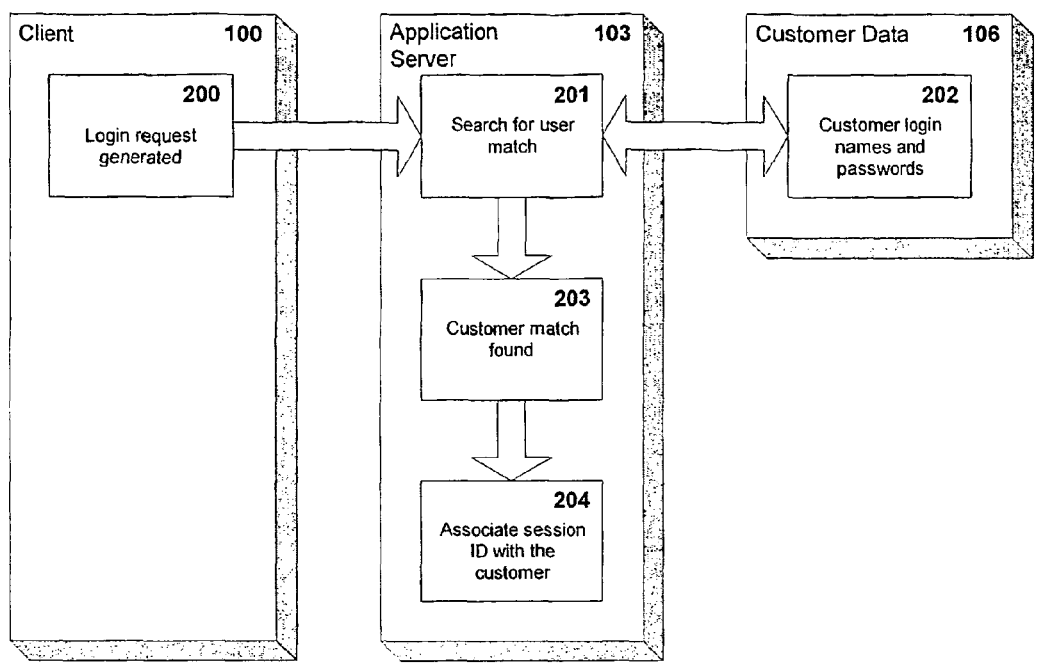
FIG. 12 is a system level software flow diagram for a client login request which forms a part of the digital content distribution and subscription system.
Figure 13:
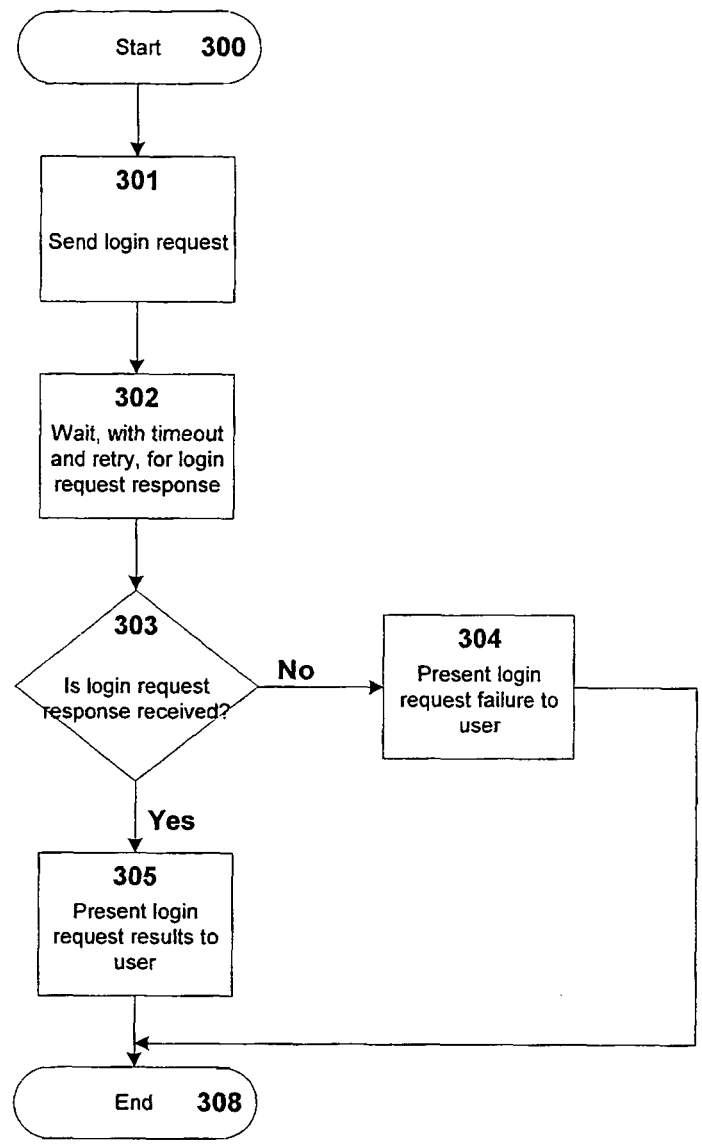
FIG. 13 is a software flow diagram of an interface browser component of the client application for a client login request which forms a part of the digital content distribution and subscription system.
Figure 14:
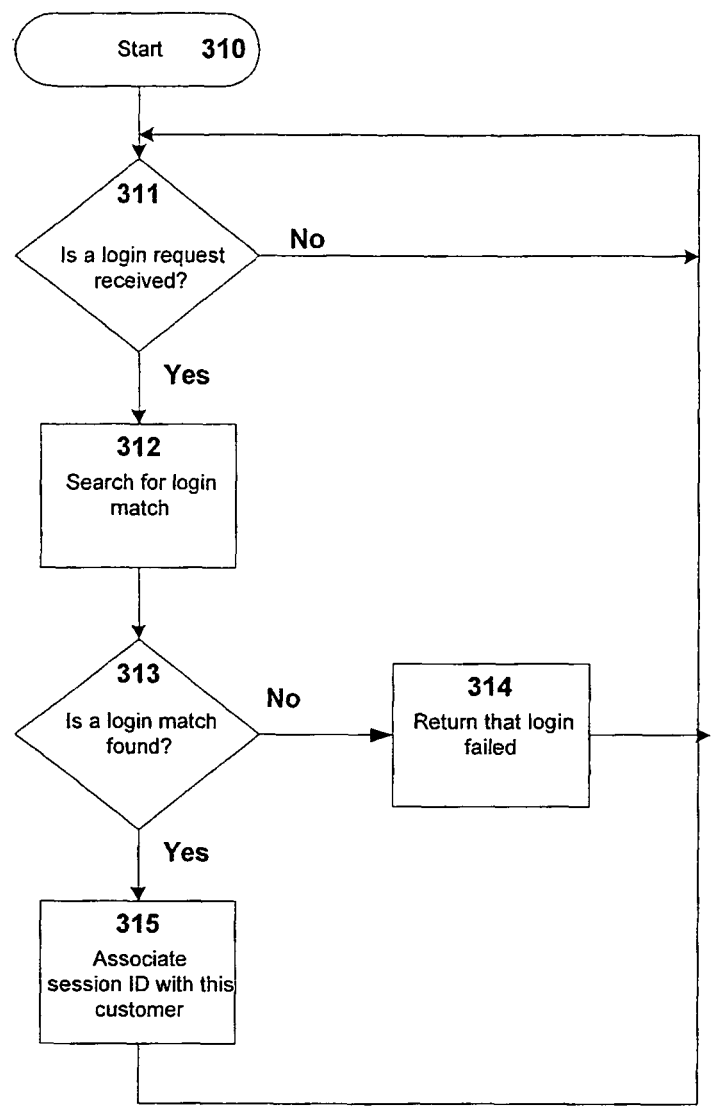
FIG. 14 is a software flow diagram on an application server for a client login request which forms a part of the digital content distribution and subscription system.

FIG. 12 is a system level software flow diagram for a login request, while FIGS. 13 and 14 provide specific software flow diagrams for a login request on the client 100 and on the application server 103, respectively. Logging in is an important capability in a digital content distribution and subscription service, especially for ensuring the security of the digital content data 108. Forcing the user of a digital content distribution and subscription service to log into the service before allowing access to the digital content data 108 provides authentication of the user and supports tracking of use of the service for billing and royalty payments. Among other things, user login also allows for recommendations to be made based on a specific user's data access habits, for example, music recommendations based on a user's digital music download history.

The system level software flow diagram for a login request, shown in FIG. 12, begins with the generation of a login request in step 200 either by the client 100, or by the application server authentication process. In the latter case, the application server tries to verify the user by redirecting the user to the login process before preceding with other user requests. The login request in step 200 may involve the passing of a unique user name and/or an identifier unique to the client machine, such as the unique identifier available in an Intel Pentium III processor or the serial number of a hard drive in the client 100 or a unique identifier assigned by the application server. A password may also be required in order to provide a greater level of certainty for the authenticity of the user or client 100 making the login request as well as to reduce the risk of fraud to a particular user or on a particular client 100. The login request in step 200 is sent to an application server 103, which initiates a search for a user match in step 201 of the passed user or client identifier and password. The search for a user match in step 201 is done of customer login names and passwords 202, which are part of the Customer data store 106. The Customer data store 106 may include, in addition to that information required for login, detailed information about the customer, such as name and address as well as possibly geographic location for royalty tracking, and account information for billing purposes. When the client 100 connects to the application server 103, a session is created and a session identifier is generated for future client request. The session identifier may represent, for example, an arbitrary sequence of letters and numbers, an encryption and decryption key, or a unique identifier for a session or process started on the application server by the calling client 100. If a customer match is found with the login information, then the session identifier is associated with the matching customer, so that the client 100 can access the customer's data, such as music collection and account status, with future requests. To provide a higher level of security, the application server 103 can assign to the session identifier an expiration time or lifetime, for example, one hour, within which the session identifier is valid. This expiration time on session identifiers reduces the likelihood of random matches of active session identifiers by someone seeking to circumvent user authentication, since the set of active session identifiers is limited to the number of active users rather than the total number of users. The expiration time on session identifiers also reduces the value of the session identifier if an unauthorized person is able to obtain a particular session identifier.

FIG. 13 is a client specific software flow diagram for a login request, called the login request task. In this embodiment, the login request task is handled within the web browser interface 134, a component of the client application 131 described above in connection with FIG. 7. A user on a client 100 may explicitly initiate a login request task through, for example, a manual login attempt, or implicitly through, for example, an attempt to search the digital content catalog 107, described in connection with FIG. 15, or download digital content data 108, described in connection with FIG. 18.

"Start" in step 300 represents the beginning of the login request task on the client 100. Next, a login request is generated and sent in step 301 to the application server 103. The login request may consist of a unique user name or an identifier unique to the client 100 as well as a password. The login request task waits for a predetermined timeout, for example, 2 seconds, and optionally with multiple retries for a login request response in step 302 from the application server 103. If a login request response is not received in step 303, then the login request task presents a login request failure message to the user in step 304 and the task ends in step 308. If a login request response is received in step 303, then the login request task presents the login request results to the user in step 305 that were received from the application server 103. The client user interface then presents the user with the results of login request, for example, a message of user login invalid, or in the case of a successful login, a proper web page on the application server depending on the previous state before the login request.

FIG. 14 is an application server specific software flow diagram for servicing a login request, called the login handler. In this example, the login handler is a continuously running process on the application server 103.

"Start" in step 310 represents the beginning of the login handler. If a login request is received in step 311 from a client 100, a search is done for a login match in step 312 from the customer login names and passwords 202 in the Customer data store 106. If a login match is found as determined in step 313, then the session identifier of the connection between the client and the application server is associated with the customer being matched in step 315. Any future request with the session identifier is considered as a request made by the particular customer for many purposes, for example, tracking the use of service. If a login match is not found, then the login handler returns that the login failed to the client in step 314, but allows the user to try to login again.

Search Request

Figure 15:
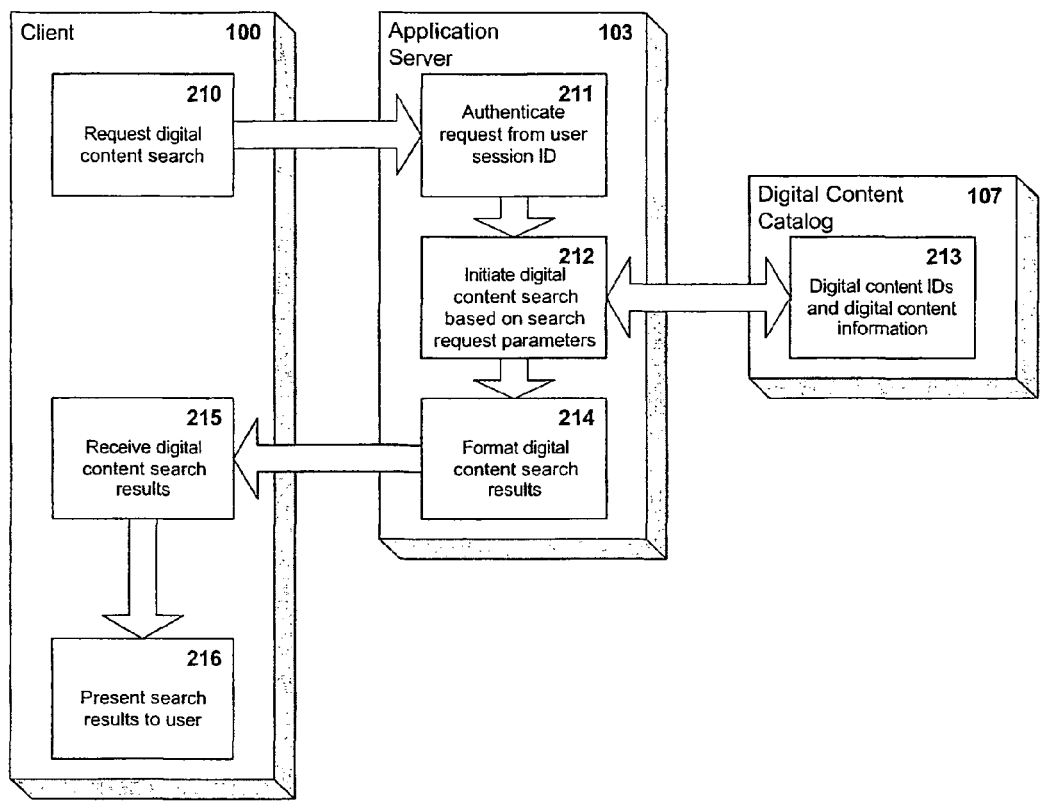
FIG. 15 is a system level software flow diagram for a digital content search request which forms a part of the digital content distribution and subscription system.
Figure 16:
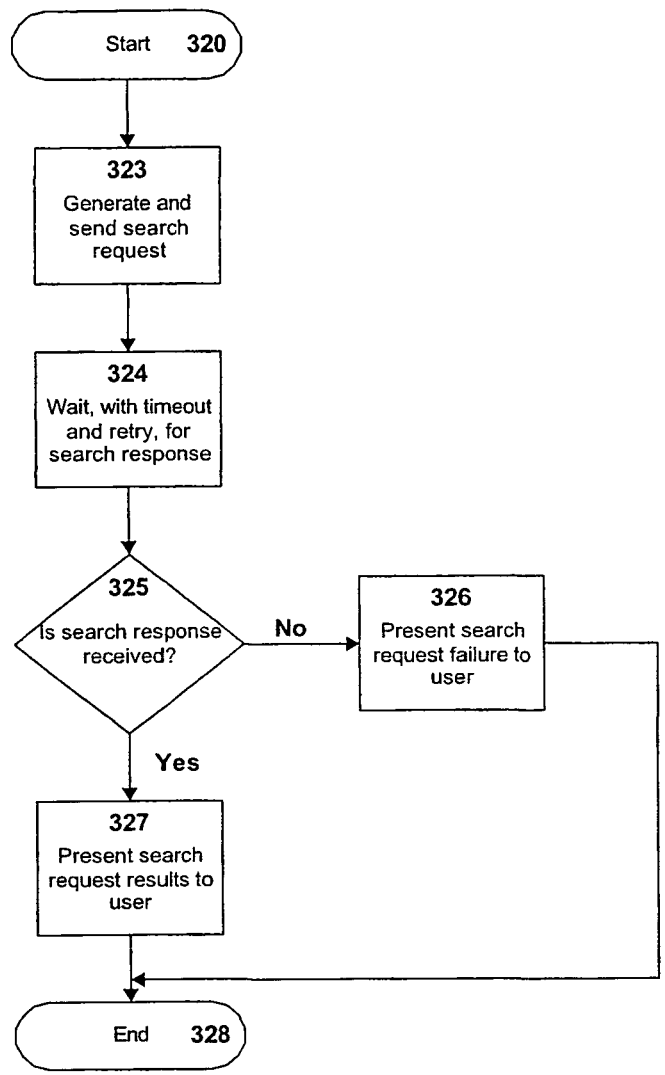
FIG. 16 is a software flow diagram of the interface browser component of a client application for a digital content search request which forms a part of the digital content distribution and subscription system.
Figure 17:
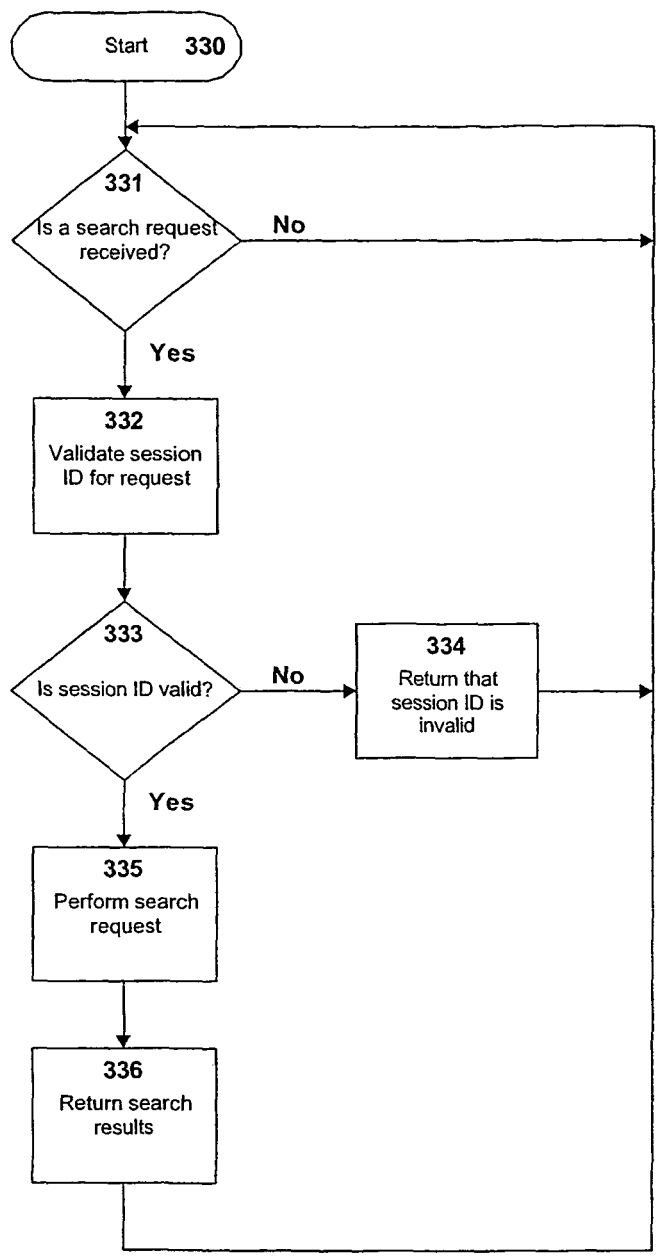
FIG. 17 is a software flow diagram on the application server of a digital content search request which forms a part of the digital content distribution and subscription system.

FIG. 15 is system level software flow diagram for a search request, while FIGS. 16 and 17 are specific software flow diagrams for a search request on the client 100 and on the application server 103, respectively. Searching is an important capability in a digital content distribution and subscription service, especially since there may be thousands or even millions of unique instances of digital content data 108, for example, digital music. Searching through a digital content catalog 107, such as a catalog of digital music, may include the capability to search by artist, album name, track name, and musical genre, among others.

The system level software flow diagram for a search request, shown in FIG. 15, begins with a digital content search request in step 210 by the client 100. The search request involves passing of various search parameters and, for example, may require a valid session identifier obtained from a previously successful login request, described above in connection with FIG. 12. The search request in step 210 is sent to an application server 103, which, may first authenticate the request in step 211 using the passed session identifier.

If the session identifier is valid, the application server 103 initiates a digital content search in step 212 based on the search parameters passed by the client 100. The search is done of the digital content catalog 107 and more specifically of the digital content identifiers and digital content information 213, such as artist, album name, and track name for the example of digital music. When the digital content search is completed in step 212, the application server 103 formats the results of the digital content search in step 214 and passes the formatted results back to the calling client 100. The client 100 receives the digital content search results in step 215 from the application server 103 and presents these results to the user in step 216, possibly with some additional formatting of the results in order to present the results in the most useful manner.

FIG. 16 is a client specific software flow diagram for a search request, called the search request task. In this embodiment, the search request task is handled within the Web Browser Interface software 134, a component of the client application 131, described above in connection with FIG. 7. A user on a client 100 may initiate a search request of the digital content catalog 107 in order to find a specific instance or group of related instances of digital content data 108. For example, with digital music, a user may search for a specific music track, music by a particular artist, or music on a particular album, among other things.

"Start" in step 320 represents the beginning of the search request task on the client 100. The search request task generates and sends a search request in step 323 to the application server 103. In addition to the session identifier, the search request includes the search parameters. For example, for digital music, the search parameters may be a partial or complete track name, artist, or album name. The search request task then waits for a predetermined timeout, for example, 2 seconds, optionally with multiple retries for a search response in step 324 from the application server 103. If a search response is not received in step 325, the search request task presents the search request failure to the user in step 326 and the task ends in step 328. If a search response is received in step 325, then the search request task presents the search response results to the user in step 327 that were received from the application server 103 and the task ends in step 328.

FIG. 17 is an application server specific software flow diagram for a search request, called the search handler. In this embodiment, the search handler is a continuously running process on the application server 103. "Start" in step 330 represents the beginning of the search handler. If a search request is received in step 331 from a client 100, then the session identifier, passed as part of the search request is validated in step 332. This validation may be optional, if the search capability is available to the general public instead of restricting it to paid customers. If the session identifier is not valid in step 333, then the search handler returns that the session identifier is not valid in step 334 to the calling client 100. The search handler then checks for any search requests received in step 331 again. If the session identifier is valid in step 333, then the search handler performs the search request in step 335. The search uses the search parameters passed by the client 100 as part of the search request and is done of the digital content catalog 107 and more specifically of the digital content identifiers and digital content information 213, such as artist, album name, and track name, for the example of digital music. Finally, the search handler returns the results of the search, with some possible reformatting of the results data in step 336 and checks for any search requests received in step 331 again.

Digital Content Download Request

Downloading digital content data 108 is an essential part of a digital content distribution and subscription system. A digital content download request may involve significantly more than simply downloading the digital content data 108. The client 100 may require an access or playback license in order to use the digital content data 108. The process of downloading the digital content data 108 may involve authentication of the user or client 100 requesting the download in order to prevent unauthorized download of the digital content data 108 from the content server 104.

Figure 18:
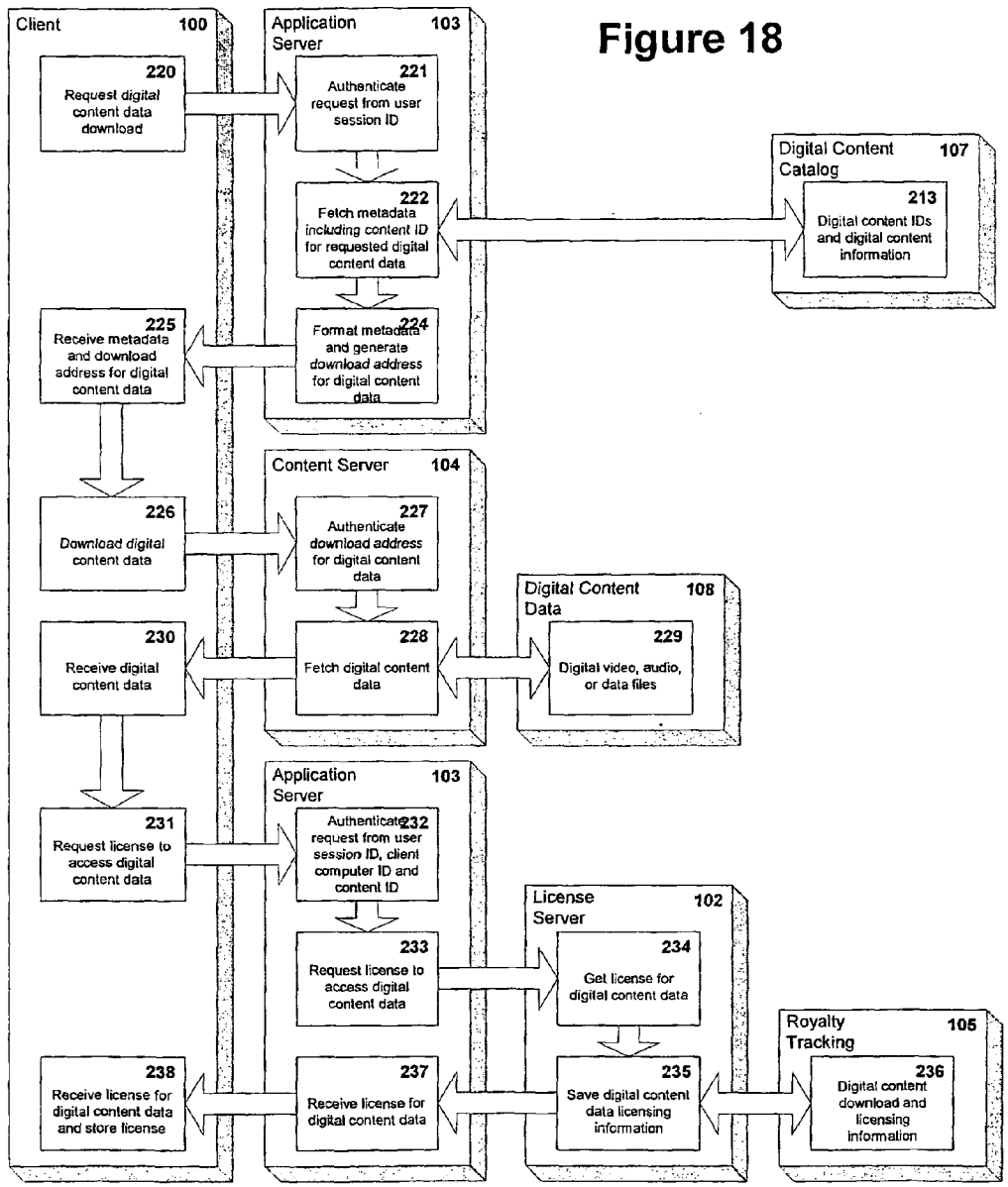
FIG. 18 is a system level software flow diagram for a digital content download request which forms a part of the digital content distribution and subscription system.
Figure 19:
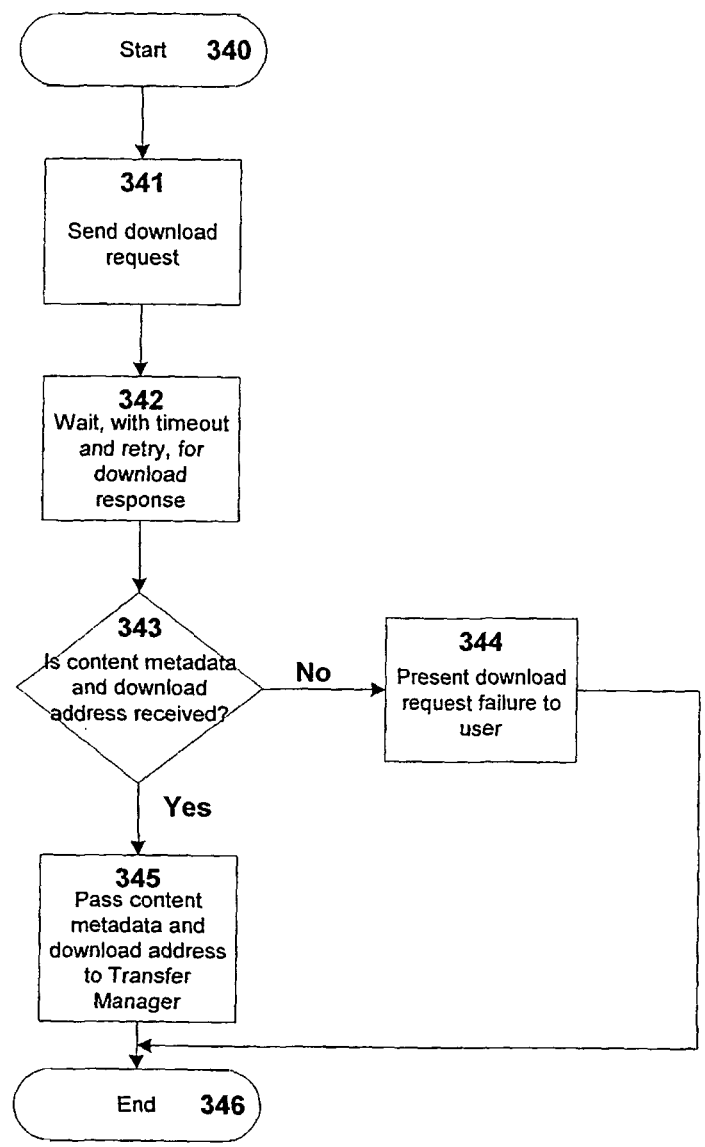
FIG. 19 is a software flow diagram of an interface browser component of a client application for a digital content download request which forms a part of the digital content distribution and subscription system.
Figure 20:
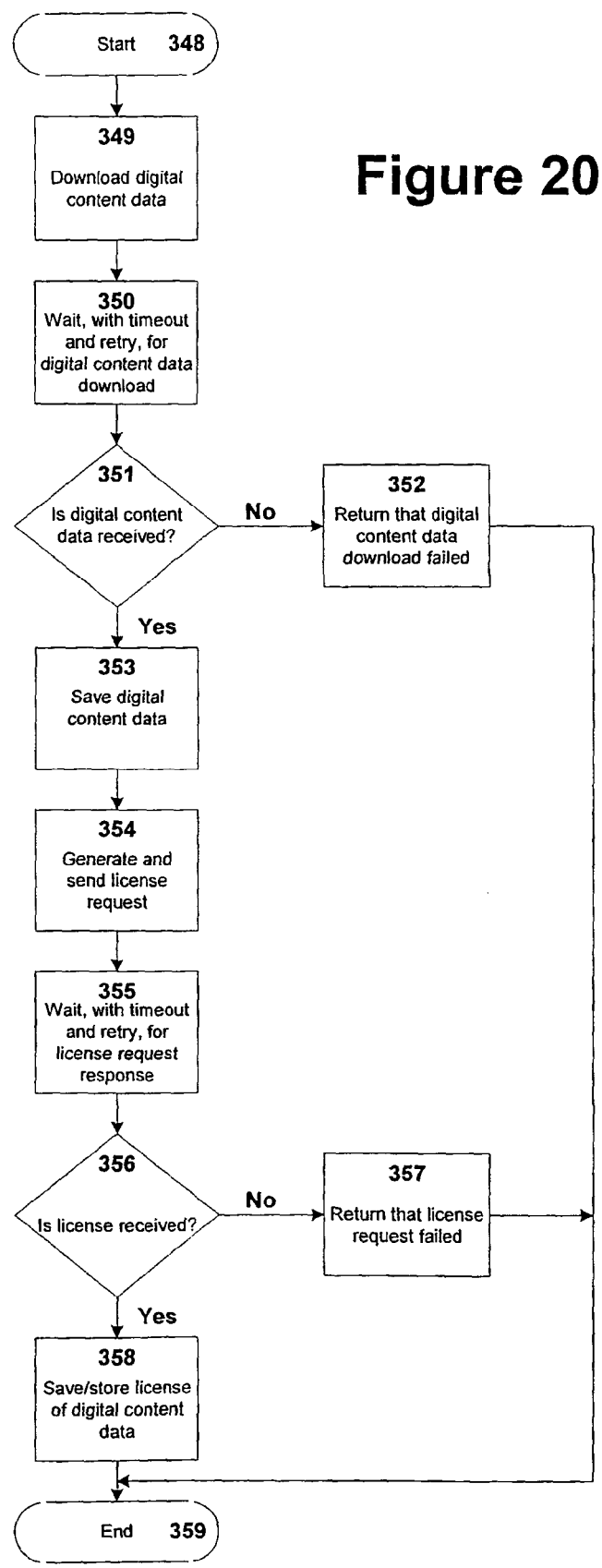
FIG. 20 is a software flow diagram of a transfer manager software component of a client application for a digital content download request which forms a part of the digital content distribution and subscription system.
Figure 21:
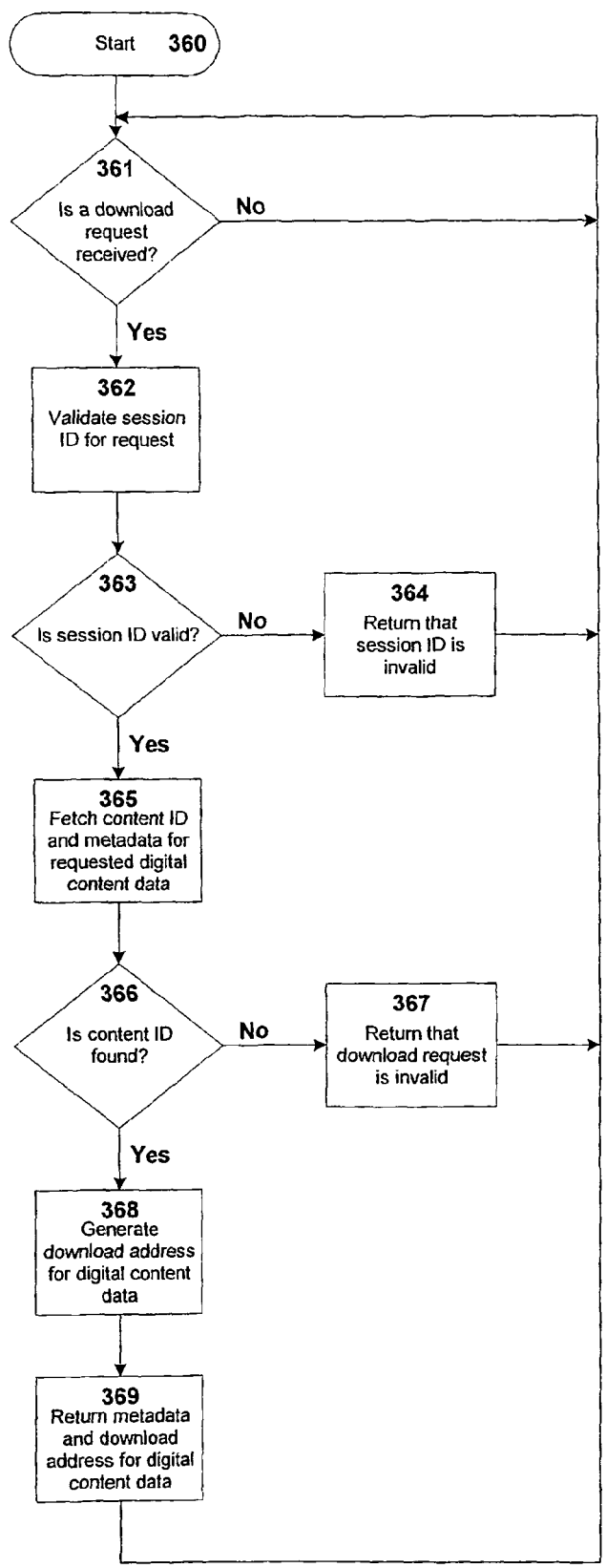
FIG. 21 is a software flow diagram on an application server for handling the downloading portion of a digital content download request which forms a part of the digital content distribution and subscription system.
Figure 22:
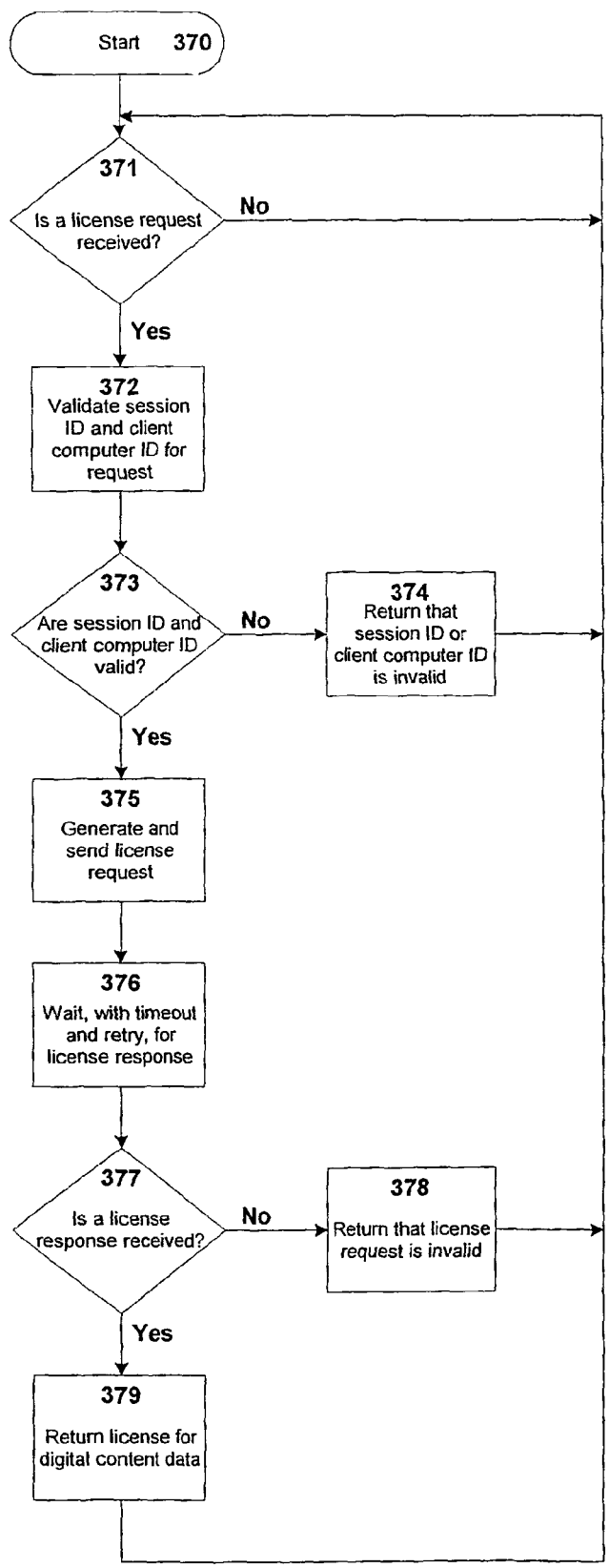
FIG. 22 is a software flow diagram on an appliation server for handling the licensing portion of a digital content download request which forms a part of the digital content distribution and subscription system.
Figure 23:
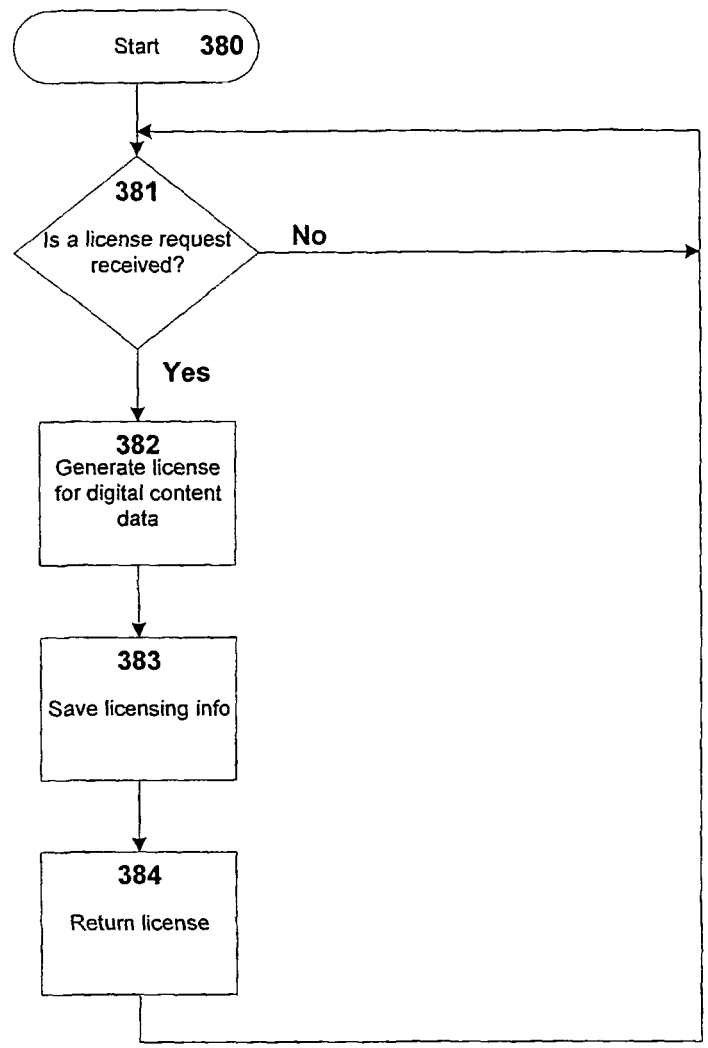
FIG. 23 is a software flow diagram on a license server for handling the licensing portion of a digital content download request which forms a part of the digital content distribution and subscription system.

FIG. 18 is a system level software flow diagram for a download request, while FIGS. 19-24 are device specific software flow diagrams for a download request. In particular, FIG. 19 is a software flow diagram for a download request on the client 100, FIG. 20 is a software flow diagram for download continuation on the client 100, FIG. 21 is a software flow diagram for a download request on the application server 103, FIG. 22 is a software flow diagram for a license request on the application server 103, FIG. 23 is a software flow diagram for a license request on the license server 102, and FIG. 24 is a software flow diagram for a download request on the content server 104.

The system level software flow diagram for a download request, shown in FIG. 18, begins with a download request by the client 100 for digital content data 108 in step 220. The download request involves the client 100 identifying the specific digital content data 108, such as digital video, audio, or data files 229, desired for download, and, in this example, also requires the client 100 to provide a valid session identifier obtained from a previously successful login request, described previously in connection with FIG. 12. Specifying the digital content data 108, such as a video, audio, or data file 229, can be done based on information in the results from a previously successful search request, described previously in connection with FIG. 15, and can correspond to digital content identifiers and digital content information 213 in the digital content catalog 107. The download request in step 220 is sent to an application server 103, which, in this example, first authenticates the request in step 221 using the passed session identifier. If the session identifier is valid, the application server 103 fetches the content metadata from the digital content catalog 107 in step 222 for the specific digital content data 108 that the client 100 requested. The content metadata includes a content identifier, and may also include other information about the content, such as name, size, and author name of the content. The digital content identifier 213 indicates to the content server 104 what specific digital content data 108 is desired and can be an actual file name or some unique identifier associated with the specific digital content data 108 to be downloaded, such as a video, audio, or data file 229. After the content metadata is fetched in step 222, the application server 103 generates a download address for the specific digital content data 108 to be downloaded from the content server 104 in step 224. It also formats the content metadata to be sent to the client. In the digital content distribution and subscription system that provides protection of the digital content data 108 from unauthorized access, such as the example described here, the download address may not only correspond to the specific digital video, audio or data file 229 to be downloaded. The download address may also contain some additional information, for example, a checksum or token that is used by the content server 104 to authenticate the download. The client 100 then receives the download address and content metadata in step 225 from the application server 103. The client uses the download address to request download of the specific digital content data 108 in step 226 from the content server 104. The content server 104 uses the download address from the client 100 to authenticate the download of the specific digital content data 108 in step 227. Once the download address is authenticated in step 227, the content server 104 fetches the specific digital content data 108 in step 228, such as a digital video, audio, or data file 229. The client 100 receives the specific digital content data 108 in step 230 from the content server 104. In a secure digital content distribution and subscription system, the digital content data is encrypted and is not usable without a license. Once the digital content data 108 is received in step 230, the client 100 requests a license to access or playback the specific digital content data 108 from the application server 103 in step 231. Since the license request from the client 100 to the application server 103 in step 231 is separate from the download request from the client 100 to the application server 103 in step 220, the application server 103 must again authenticate the license request from the client 100 in step 232 using the passed session identifier and a unique client machine identifier that specifies the machine on which the license for the digital content data is going to be stored. If the session identifier and the client machine identifier are valid, the application server 103 requests a license to access or playback the specific digital content data 108 in step 233 from a license server 102. The license server 102 obtains the license for the specific digital content data 108 in step 234 in a manner corresponding to the requirements of the digital rights management implementation used, for example, Microsoft Windows Media Rights Manager. Next, the license server 102 saves the digital content data download and licensing information 236 in step 235 for royalty tracking 105, which involves determining royalty payments to rights holders of the digital content data 108 that are assigned licenses and downloaded. The application server 103 then receives the license for the specific digital content data 108 in step 237 from the license server 102. The client 100 then receives the access or playback license in step 238 from the application server 103, which the client 100 then saves along with the corresponding digital content data 108.

FIG. 19 is a the client specific software flow diagram for a download request, called the download request task. In this embodiment, the download request task is handled within the web browser interface 134, a component of the client application 131, described previously in connection with FIG. 7. A user on a client 100 typically initiates a download request of specific digital content data 108 in order to access or playback the specific digital content data 108, such as video, audio, or data files 229.

"Start" in step 340 represents the beginning of the download request task on the client 100. The download request task generates and sends a download request in step 341 to the application server 103. In addition to the session identifier, required in this example, the download request also includes one or many content object names or content identifiers 213, obtained from the results of a previous search request, described previously in connection with FIG. 15. The download request task then waits with a predetermined timeout, for example, 2 seconds, and optionally with multiple retries for a download response in step 342 from the application server 103. If a digital content download address is not received as part of the download response in step 343, the download request task presents the download request failure to the user in step 344 and the task ends in step 346. If a download response, which may include multiple download addresses and metadata for multiple digital content data, for the specific digital content data 108 is received in step 343 from the application server 103, then the download request task passes the digital content download address and metadata to the Transfer Manager software system 132 of the client application 131, described previously in connection with FIG. 8, in step 345 and the task ends in step 346.

FIG. 20 is a the client specific software flow diagram for download continuation, called the download continuation task. The download continuation task is called within the Transfer Manager software system 132 (FIG. 8, step 182), a component of the client application 131, described previously in connection with FIG. 7. The Transfer Manager software system processes the results received from the download request task, described above in connection with FIG. 19. It then runs in a loop to call the download continuation task with the download address and metadata for each of the multiple digital content data it receives. The download continuation task thus continues the download process by handling the download of the digital content data 108 and the retrieval of the access or playback license for the digital content data 108.

"Start" in step 348 represents the beginning of the download continuation task on the client 100. The download continuation task downloads the digital content data 108 in step 349 from the content server 104 using the passed digital content download address. The download continuation task waits with some timeout and possibly with multiple retries for the specific digital content data to download in step 350. The timeout, in this case, can be some fixed amount, for example, 5 minutes, or can be automatically calculated based on the size of the specific digital content data 108 to be downloaded and the download data rate of the connection from the client 100 to the Internet or other computer network 101. If the specific digital content data 108 is not received in step 351, then the download continuation task returns that the download of the digital content data 108 failed in step 352 to the calling Transfer Manager software system 132 and the task ends in step 359. If the specific digital content data 108 is received in step 351 from the content server 104, then the download continuation task saves the specific digital content data 108 in step 353 on the client 100.

In another embodiment, rather than downloading the entire digital content data at once, the download continuation task divides the digital content data into smaller chunks of a fixed size, and runs in a loop to download the digital content data one chunk at a time until the entire content data is received. As soon as one chunk is received, it is saved and appended to the file for the specific content data to be downloaded. All the timeout, retry and error reporting rules described above, apply to each chunk of the data to the downloaded. Next, the download continuation task generates and sends a license request in step 354 to the application server 103. The download continuation task then waits for a predetermined timeout, for example, 2 seconds, and optionally with multiple retries for a license request response in step 355 from the application server 103. If a license request response is not received in step 356, then the download continuation task stores the license in a manner corresponding to the requirements of the digital content management implementation used, for example. Microsoft Windows Media Rights Manager, and the task ends in step 359.

FIG. 21 is an application server specific software flow diagram for a download request, called the application download handler. In this embodiment, the application download handler is a continuously running process on the application server 103.

"Start" in step 360 represents the beginning of the application download handler. If a download request is received in step 361 from a client 100, then the session identifier, passed as part of the download request, is validated in step 362. If the session identifier is not valid in step 363, the application download handler returns that the session identifier is not valid in step 364 to the calling client 100. The application download handler then checks for any download requests received in step 361 again. If the session identifier is valid in step 363, then the application download handler fetches the content metadata including content identifier in step 213 in step 365 from the digital content catalog 107 for the requested digital content data 108. The digital content identifier 213 indicates to the content server 104 what specific digital content data 108 is desired and can be an actual file name or some unique identifier associated with the specific digital content data 108 to be downloaded, such as a video, audio, or data file 229. If the content identifier 213 is not found in the digital content catalog 107 in step 366, then the application download handler returns that the download request is not valid in step 367 to the calling client 100. The application download handler then checks for any download requests received in step 361 again. If the content identifier 213 is found in step 366, then the application download handler generates the download address for the specific digital content data 108 to be downloaded using the content identifier 213. The download address may not only correspond to a specific digital video, audio or data file 229 in the digital content data 108 to be downloaded, but may also contain some additional information, for example, a checksum or token, that is used by the content server 104 to authenticate the download. Authentication of the download by the content server 104 can prevent unauthorized download of the digital content data 108. Each download request may include requests for multiple digital content data. When the application download handler finishes processing for all digital content data in one download request, it then returns the download addresses and metadata for the specific digital content data 108 to be downloaded in step 369 to the calling client 100 and checks for any download requests received in step 361 again.

FIG. 22 is an application server specific software flow diagram for a license request, called the application license handler. The license request is one part of the overall digital content download request, described previously in connection with FIG. 18. In this embodiment, the application license handler is a continuously running process on the application server 103.

"Start" in step 370 represents the beginning of the application license handler. If a license request is received in step 371 from a client 100, then the session identifier then the session identifier and client machine identifier, passed as part of the license request, are part of the license request, are validated in step 372. If the session identifier or the client machine identifier is not valid in step 373, then the application license handler returns that the session identifier is not valid in step 374 to the calling client 100. The application license handler checks for any license requests received in step 371 again. If the session identifier and the client machine identifier are both valid in step 373, the application license handler generates and sends a license request in step 375 to the license server 102 in order to obtain a license for access to or playback of the specific digital content data 108. The application license handler then waits for a predetermined timeout, for example, 2 seconds, and optionally with multiple retries for a license response in step 376. If a license response is not received in step 377, the application license handler returns that the license request failed in step 378 to the calling client 100. The application license handler then checks for any license requests received in step 371 again. If a license response is received in step 377, then the application license handler returns the access or playback license for the specific digital content data 108 in step 379 to the calling client 100 and checks for any license requests received in step 371 again.

FIG. 23 is a license server specific software flow diagram for a license request, called a license request handler. The license request is one part of the overall digital content download request, described above in connection with FIG. 18. In this embodiment, the license request handler is a continuously running process on the license server 102.

"Start" in step 380 represents the beginning of the license request handler. If a license request is received in step 381 from an application server 103, then the license request handler generates the access or playback license in step 382 for the specific digital content data 108, according to the digital rights management implementation used, for example, Microsoft Windows Media Rights Manager. The license request handler then saves information about licensing in step 383 for royalty tracking 105, which is then used for determining royalty payments to rights holders of the digital content data 108. Finally, the license request handler returns the access or playback license in step 384 to the calling application server 103 and checks for any license requests received in step 381 again.

Figure 24A:
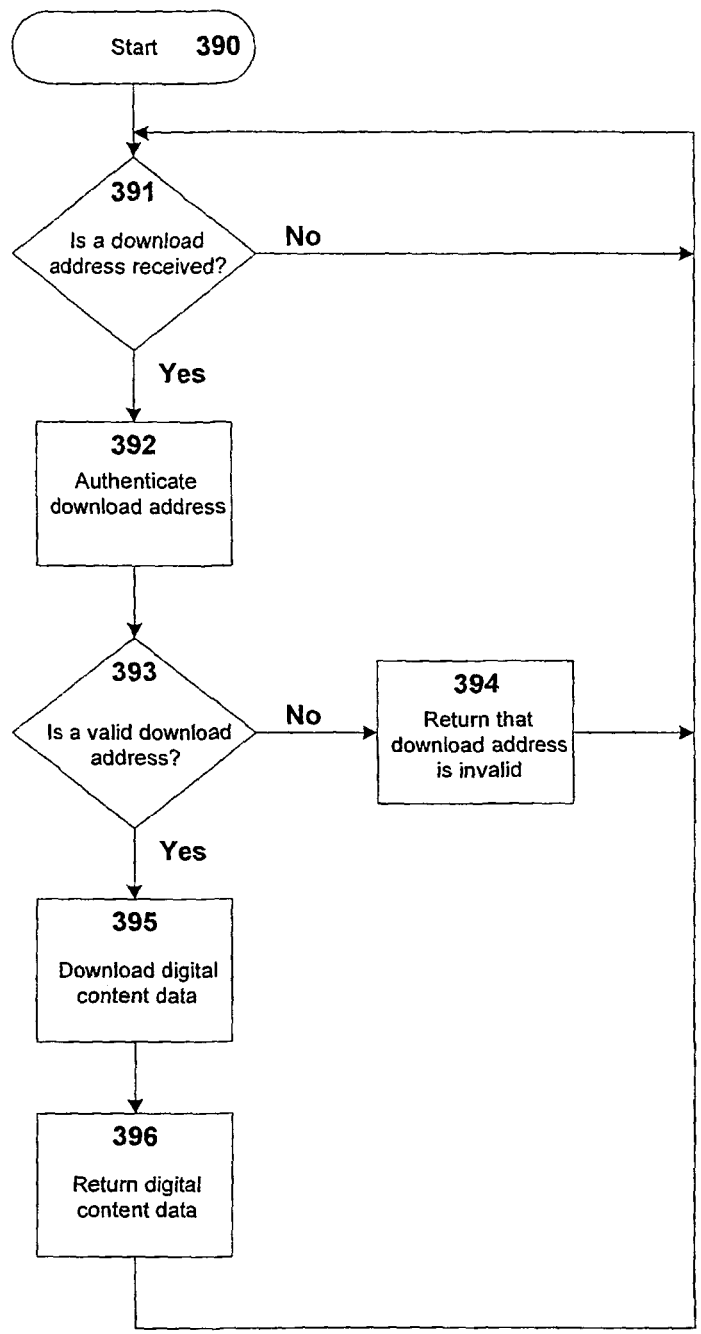
FIG. 24A-24C are software flow diagrams on a content server for a digital content download request which forms a part of the digital content distribution and subscription system.
Figure 24B:
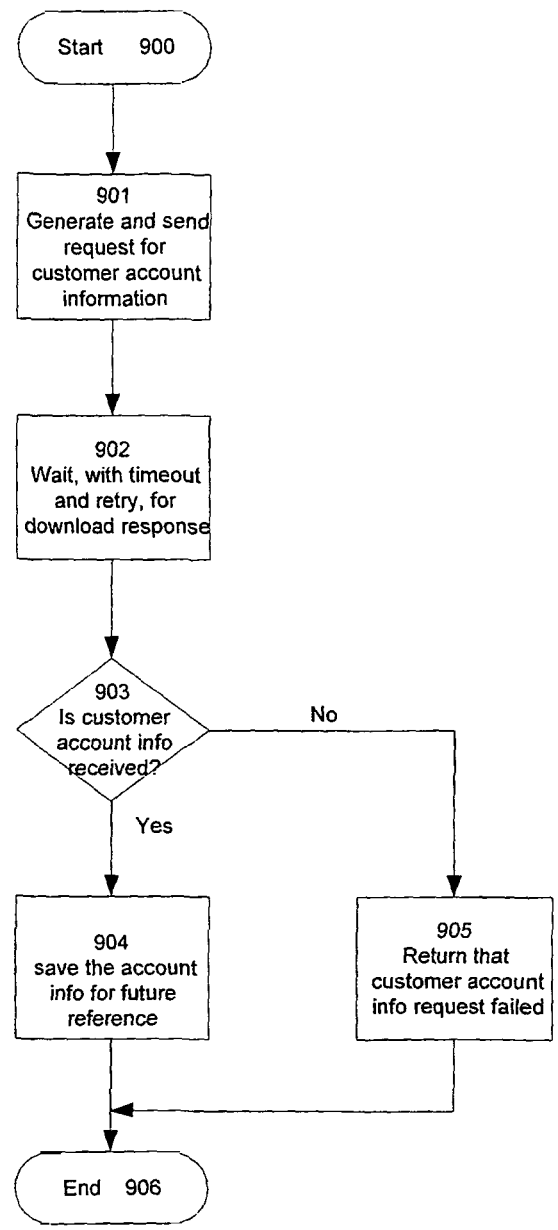
Figure 24C:
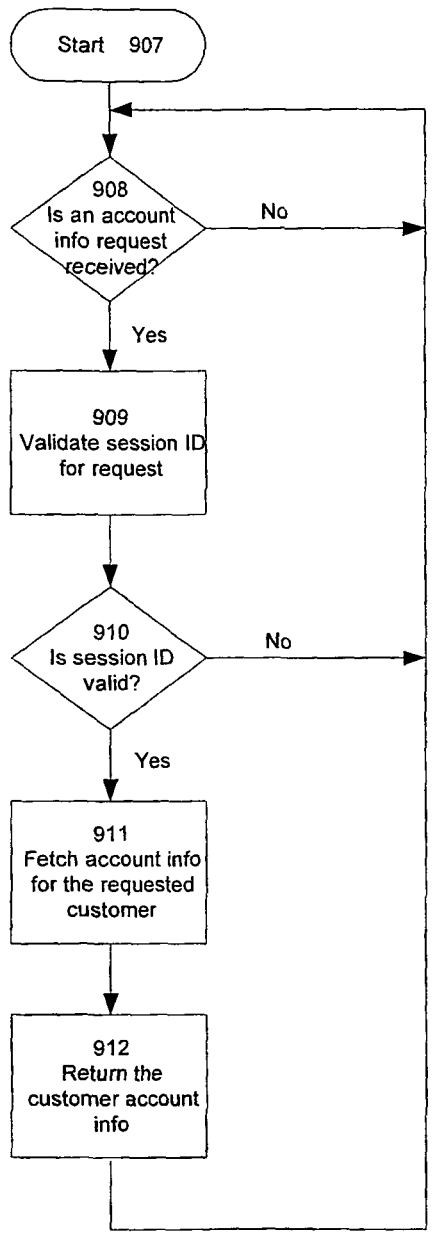

FIGS. 24A-24C are content server specific software flow diagrams for a download request, called the content download handler. In this embodiment, the content download handler is a continuously running process on the content server 104.

Referring to FIG. 24A, "Start" in step 390 represents the beginning of the content download handler. If a download address is received from a client 100 in step 391, then the content download handler authenticates the download address in step 392. In this embodiment, the download address contains is encrypted with the content identifier 213, which can be an actual file name or some unique identifier associated with the specific digital content data 108 to be downloaded, such as a video, audio, or data file 229. In addition, the download address may contain additional information, for example, a checksum or token. The content download handler uses the content identifier 213 and the additional information, such as a checksum or token, in order to authenticate the download and thus prevent unauthorized access to the digital content data 108. If the download address is not valid in step 393, then the content download handler returns that the download address is not valid in step 394 to the calling client 100. The content download handler then checks for any download addresses received in step 391 again. If the download address is valid in step 393, which means that the content identifier 213 found in the download address represents specific digital content data 108 and the download address is authenticated, then the content download handler downloads the specific digital content data 108 in step 395 and returns this digital content data 108 in step 396 to the calling client 100. The content download handler then checks for any download addresses received in step 391 again.

The Transfer Manager may make additional requests to the application server automatically when a user makes a download request as illustrated in FIGS. 24B and 24C. In this embodiment, if it is the first time the user is making a download request as illustrated in FIG. 24B, the Transfer Manager may send a request for customer account information as indicated by steps 900-906 of FIG. 24B. As indicated in steps 907-912 of FIG. 24C, the application server validates the session identifier sent with the request. If the session identifier is valid with a previously successful login request, the application server looks up the customer associated with the session identifier from the customer database, and retrieves certain customer information, for example, a unique customer identifier assigned by the server, then sends the customer information back to the Transfer Manager. When the Transfer Manager receives the customer information, it stores the customer information for future reference. If the session identifier is not valid, the application server responses with error message to the Transfer Manager.

License Renewal Request

Renewing licenses for digital content data 108 is necessary in a digital content distribution and subscription system when access or playback licenses are required on the client 100 for the digital content data 108 and these access or playback licenses have an expiration time or lifetime. Having an expiration time or lifetime associated with access or playback licenses for digital content data 108 not only prevents unauthorized access to or playback of the digital content data 108, but also provides time restrictions on access to or playback of the digital content data 108 by authorized users. These time restrictions are essential in any subscription service, since they ensure that a user may not continue to access or playback the digital content data 108 after their subscription has expired. A user can set up the automatic license renewal process to ensure uninterrupted access or playback rights to the digital content data. In this embodiment, a user may mark the digital content data that has been downloaded, to be renewed when the current licenses expire, through the client web interface. The application server maintains the records, for each customer, of the digital content data downloaded or subscribed by the customer and its renewable status.

Figure 25:
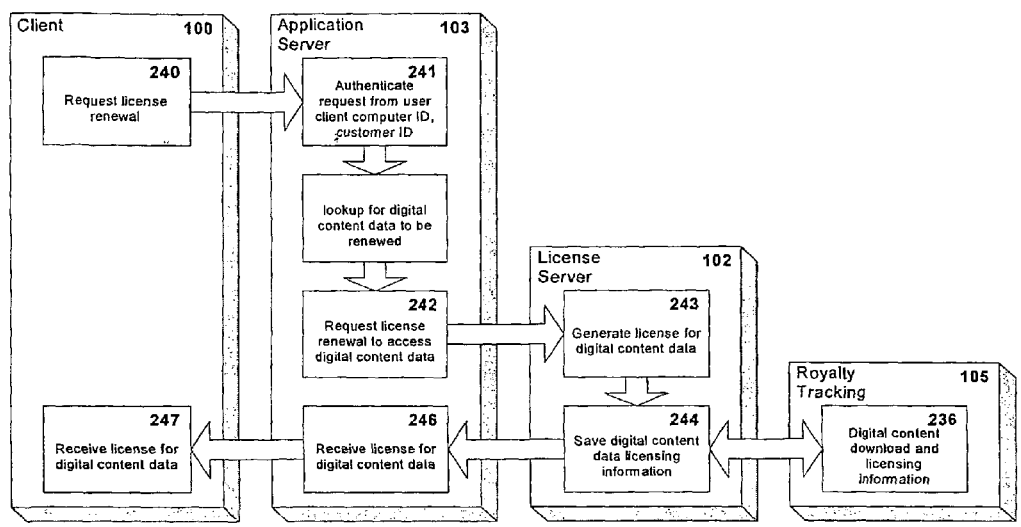
FIG. 25 is a system level software flow diagram for a license renewal request which forms a part of the digital content distribution and subscription system.
Figure 26:
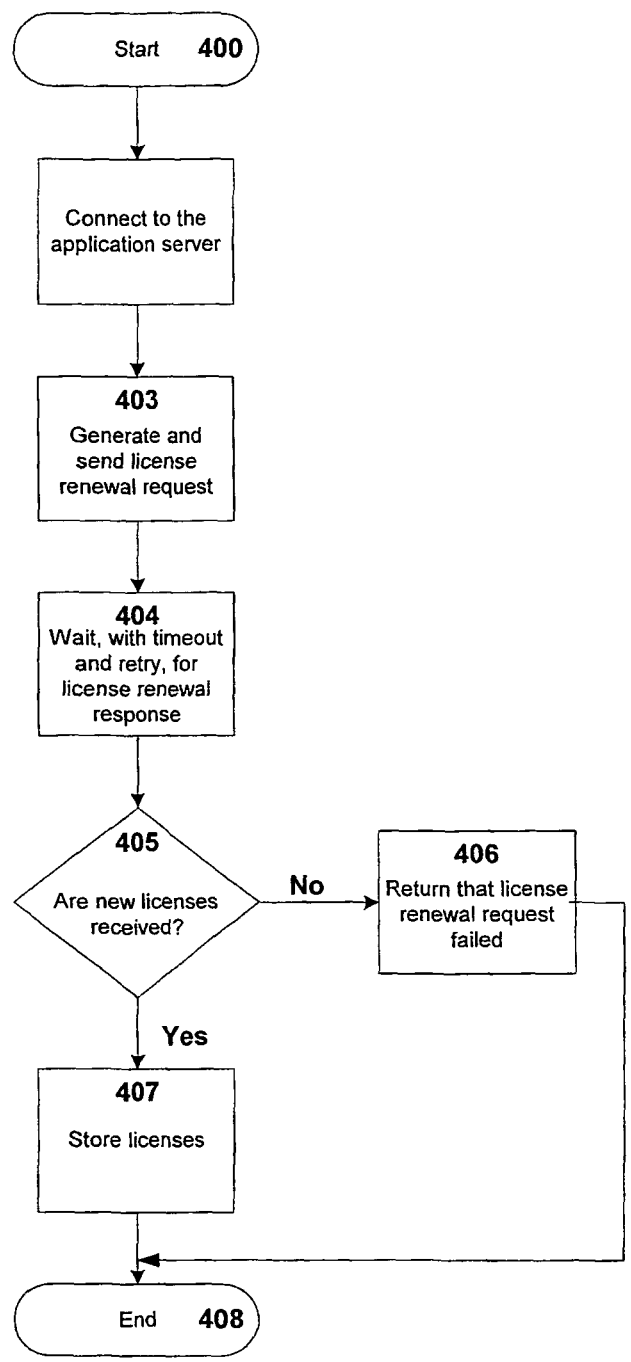
FIG. 26 is a software flow diagram of a transfer manager software component of a client application for a license renewal request which forms a part of the digital content distribution and subscription system.
Figure 27:
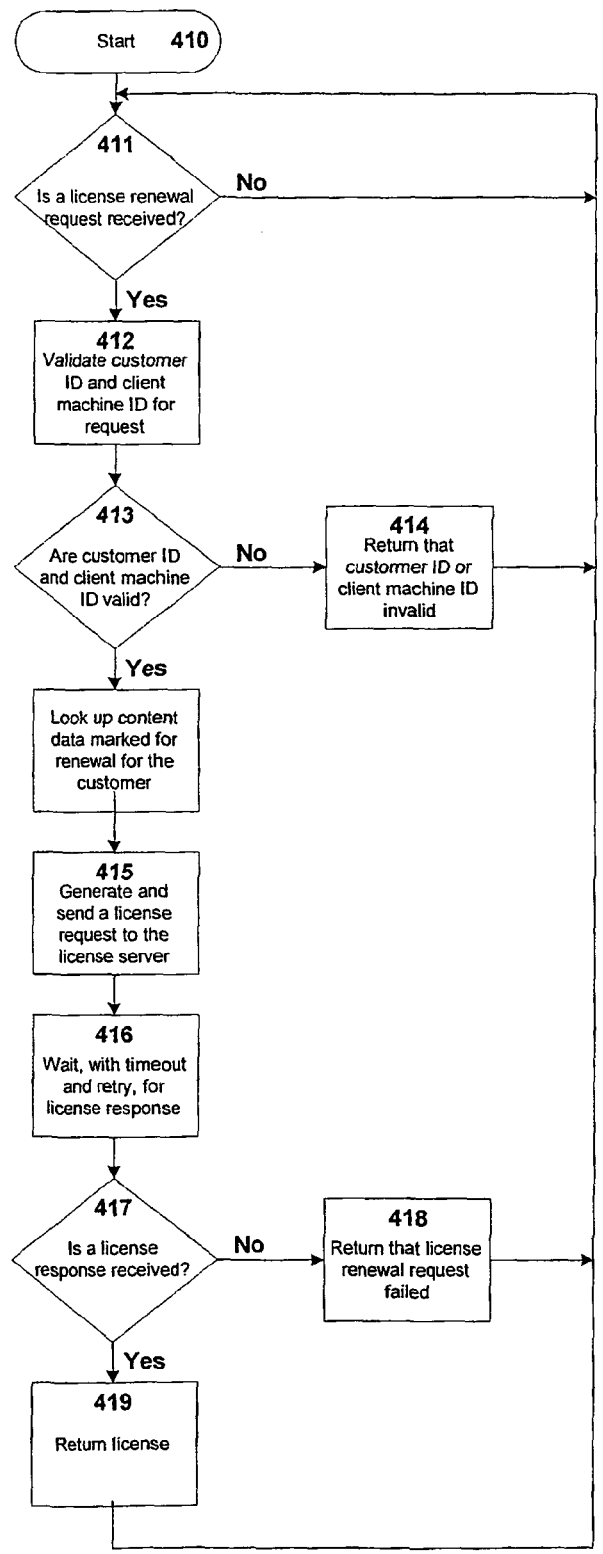
FIG. 27 is a software flow diagram on an application server for a license renewal request which forms a part of the digital content distribution and subscription system.
Figure 28:
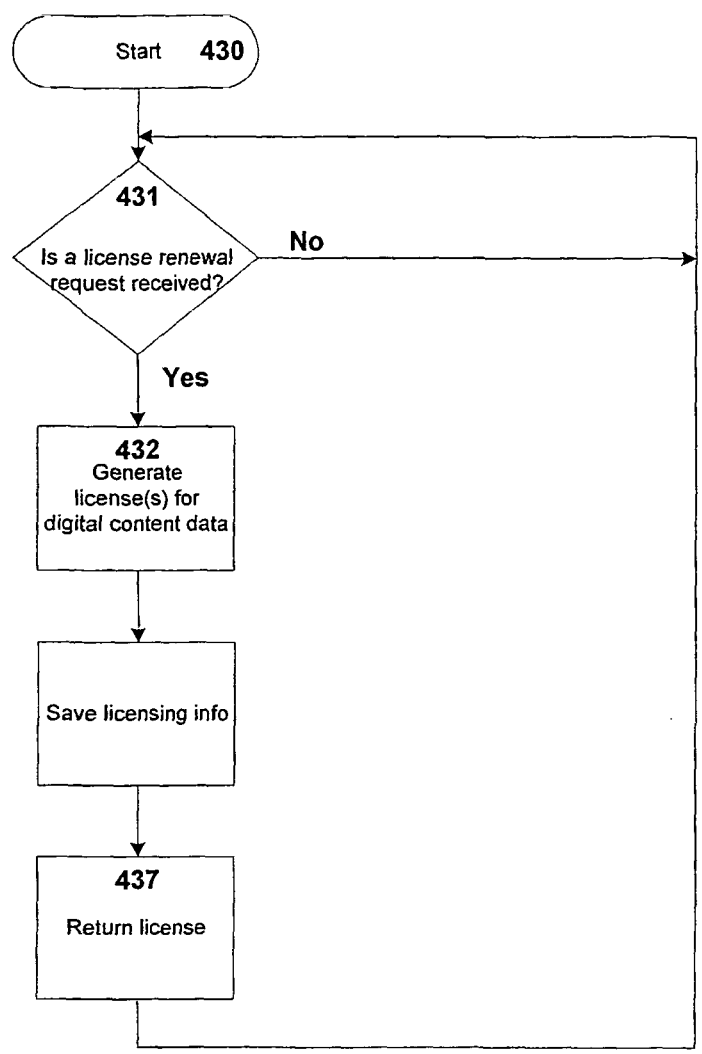
FIG. 28 is a software flow diagram on a license server for a license renewal request which forms a part of the digital content distribution and subscription service.

FIG. 25 is a system level software flow diagram for a license renewal request, while FIG. 26 is a specific software flow diagram for a license renewal request on the client 100. FIG. 27 is a specific software flow diagram for a license renewal request on the application server 103, while FIG. 28 is a specific software flow diagram for a license renewal request on the license server 102.

The system level software flow diagram for a license renewal request, shown in FIG. 25, begins with a license renewal request by the client 100 in step 240. The license renewal request involves the client 100 identifying the specific digital content data 108, such as a digital video, audio, or data file 229, that requires a new license or simply providing the expired license for the specific digital content data 108, depending on the requirements of the digital rights management implementation used, for example, Microsoft Windows Media Rights Manager. The license renewal request also requires the client 100 to provide a valid customer identifier obtained from a previously successful download request, and a unique client machine identifier of which the license of the digital content is going to be stored on. The license request in step 240 is sent to an application server 103, which, in this embodiment, first authenticates the request in step 241 using the customer identifier and the client machine identifier. If the customer identifier and the client machine identifier are valid, the application server 103 sends the license renewal request to a license server 102 in step 242 in order to obtain new licenses for access to or playback of the digital content data 108 that the client 100 specified. The license server 102 generates the licenses for the specific digital content data 108 in step 243 in a manner corresponding to the digital rights management implementation used, for example, Microsoft Windows Media Rights Manager. Next, the license server 102 saves the digital content data licensing information 236 in step 244 for royalty tracking 105, which involves determining royalty payments to rights holders of the digital content data 108 that are assigned licenses. The application server 103 then receives the licenses for the specific digital content data 108 in step 246 from the license server 102. The client 100 then receives the access or playback licenses in step 247 from the application server 103, which the client 100 then saves.

FIG. 26 is a the client specific software flow diagram for a license renewal request, called the license renewal request task. The license renewal request task is called within the Transfer Manager software system 132 (FIG. 8, step 187), a component of the client application 131, described above in connection with FIG. 7. A client 100 can automatically initiate or a user on a client 100 can manually initiate a license renewal request for specific digital content data 108 in order to continue to access or playback the specific digital content data 108, such as video, audio, or data files 229.

"Start" represents the beginning of the license renewal request task on the client. Since the client may not be connected to the application server at the time when the renewal process start, the license renewal request task first makes a connection to the application server through standard Internet connection protocol. Then, the license renewal request task generates and sends a license renewal request to the application server with the customer identifier obtained from previously successful request and a unique client machine identifier. The license renewal request task then waits for a predetermined timeout, for example, 2 seconds, and optionally with multiple retries for a license renewal response in step 404 from the application server 103. If a license renewal response is not received in step 405, then the license renewal request task returns that the license renewal request failed in step 406 to the calling Transfer Manager software system 132 and the task ends in step 408. If a license renewal response, which includes the new access or playback licenses, is received in step 405 from the application server 103, then the license renewal request task returns the new access or playback licenses for the specific digital content data 108 in step 407 to the calling Transfer Manager software system 132 and the license renewal request task ends in step 408.

FIG. 27 is an application server specific software flow diagram for a license renewal request, called the application renewal handler. In this embodiment, the application renewal handler is a continuously running process on the application server 103.

"Start" in step 410 represents the beginning of the application renewal handler. If a license renewal request is received in step 411 from a client 100, then the customer identifier and the client machine identifier, passed as part of the license renewal request, are validated. If either of the identifiers is not valid, the application renewal handler returns that the customer identifier or the client machine identifier is not valid to the calling client. The application renewal handler then checks for any license renewal requests received again. If the identifiers are both valid, then the application renewal handler looks up records of the digital content data downloaded or subscribed by the particular customer that are marked for renewal. The application renewal handler then generates and sends a license request to the license server with those content data identifiers. The application renewal handler then waits for a predetermined timeout, for example, 2 seconds, and optionally with multiple retries for a license renewal response in step 416. If a license renewal response is not received in step 417, then the application renewal handler returns that the license renewal requests failed in step 418 to the calling client 100. The application renewal handler then checks for any license renewal requests received in step 411 again. If a license renewal response, which includes the access or playback licenses for renewed digital content data, is received in step 417, then the application renewal handler returns the access or playback licenses for the specific digital content data 108 in step 419 to the calling client 100 and checks for any license renewal requests received in step 411 again.

FIG. 28 is a license server specific software flow diagram for a license renewal request, called the license renewal handler. In this embodiment, the license renewal handler is a continuously running process on the license server 102.

"Start" in step 430 represents the beginning of the license renewal handler. If a license renewal request is received in step 431 from an application server 103, then the license renewal handler generates one or multiple access or playback licenses based on the information that is passed as part of the license renewal request and what the requirements are of the digital rights management implementation used, for example, Microsoft Windows Media Rights Manager. This passed information may specify the digital content data 108, such as a digital video, audio, or data file 229, which requires the license renewal or may be an expired license for the specific digital content data 108. The license renewal handler then saves information about licensing in step 436 for royalty tracking 105, which may be used for determining royalty payments to rights holders of the digital content data 108. Finally, the license renewal handler returns the new access or playback licenses in step 437 to the calling application server 103 and checks for any license renewal requests received in step 431 again.

Account Update Request

Figure 29:
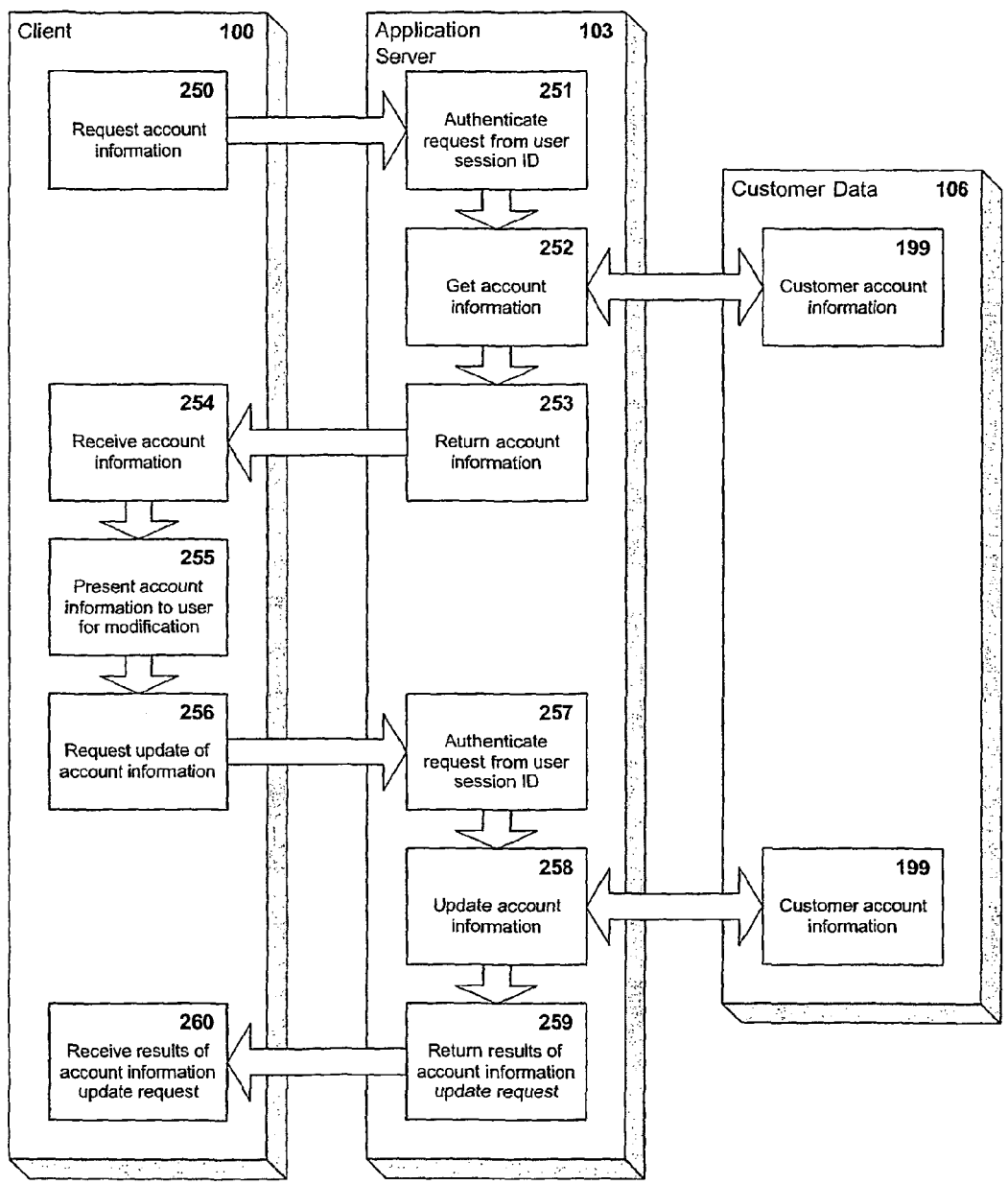
FIG. 29 is a system level software flow diagram for an account update request which forms a part of the digital content distribution and subscription system.
Figure 30:
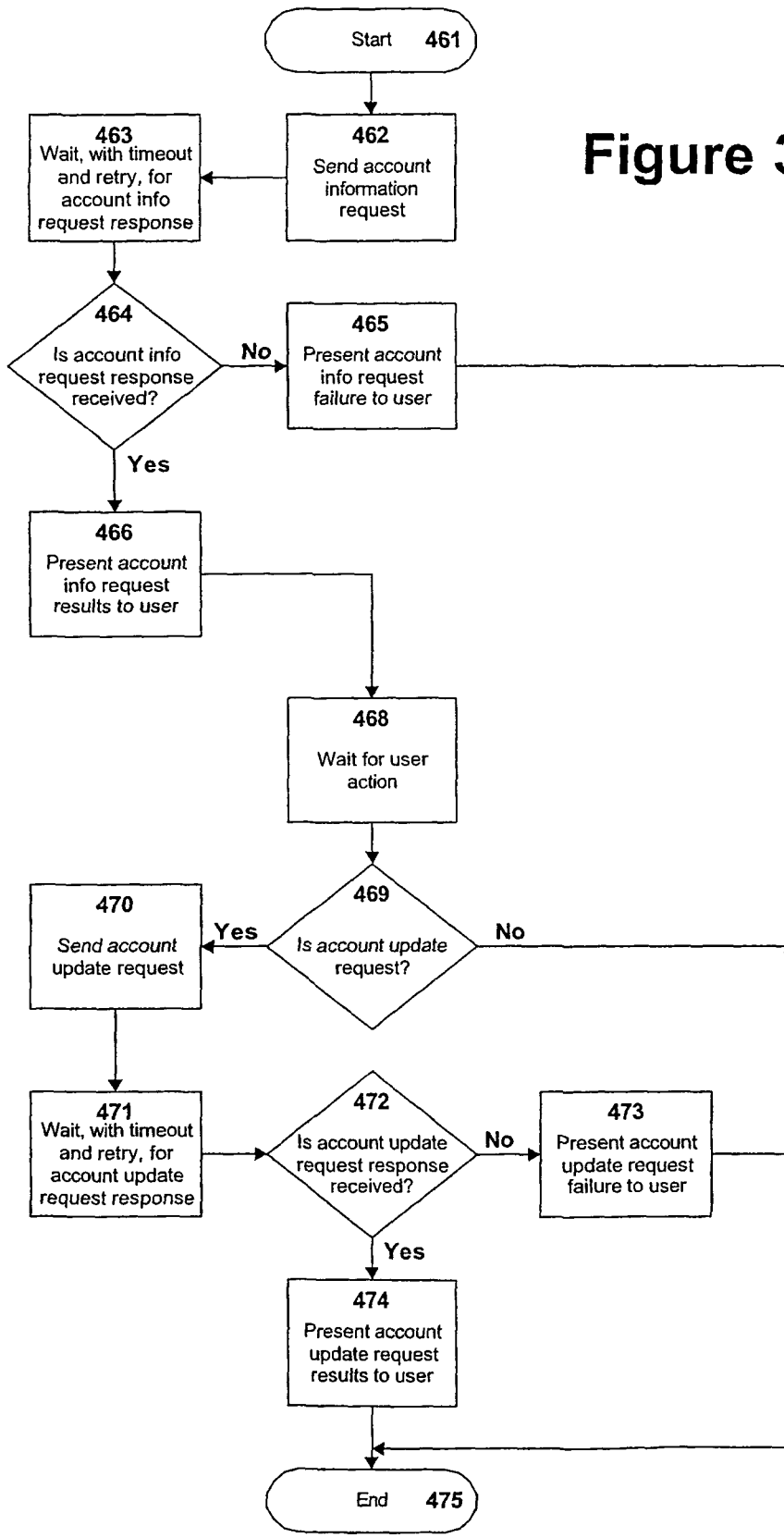
FIG. 30 is a software flow diagram of an interface browser component of a client application for an account update request which forms a part of the digital content distribution and subscription system.
Figure 31:
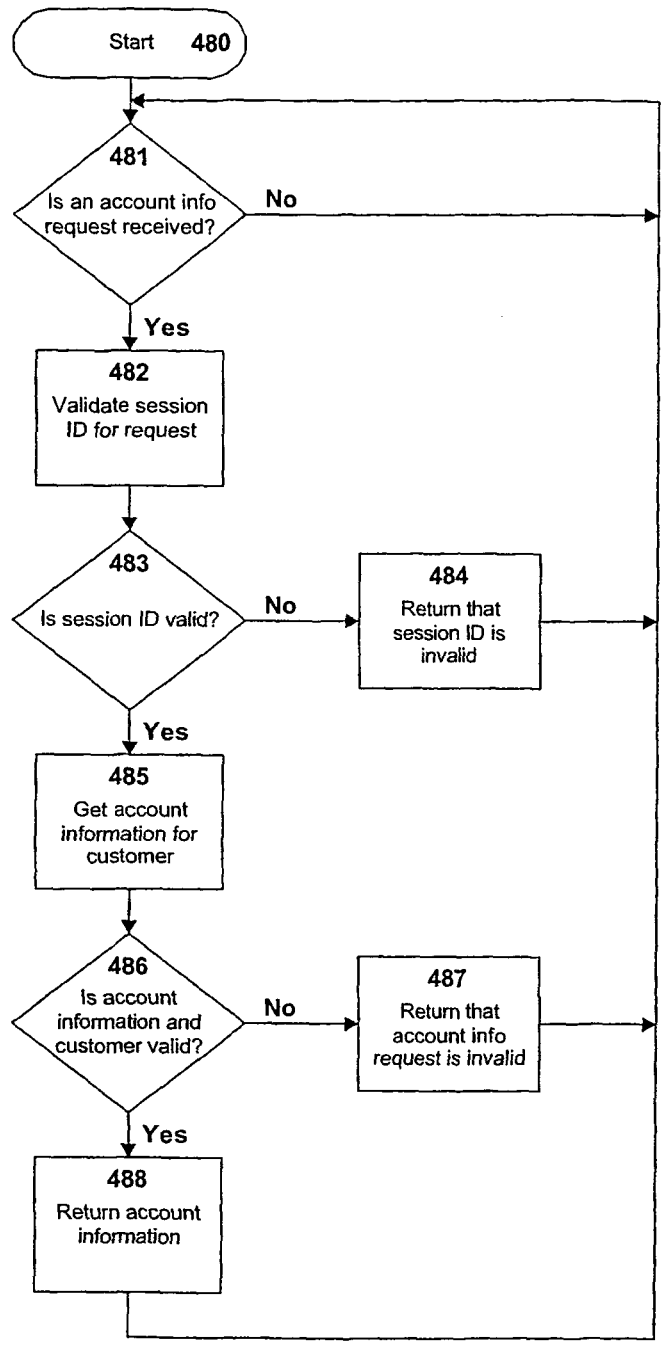
FIG. 31 is a software flow diagram on an application server for an account information request which forms a part of the digital content distribution and subscription system.
Figure 32:
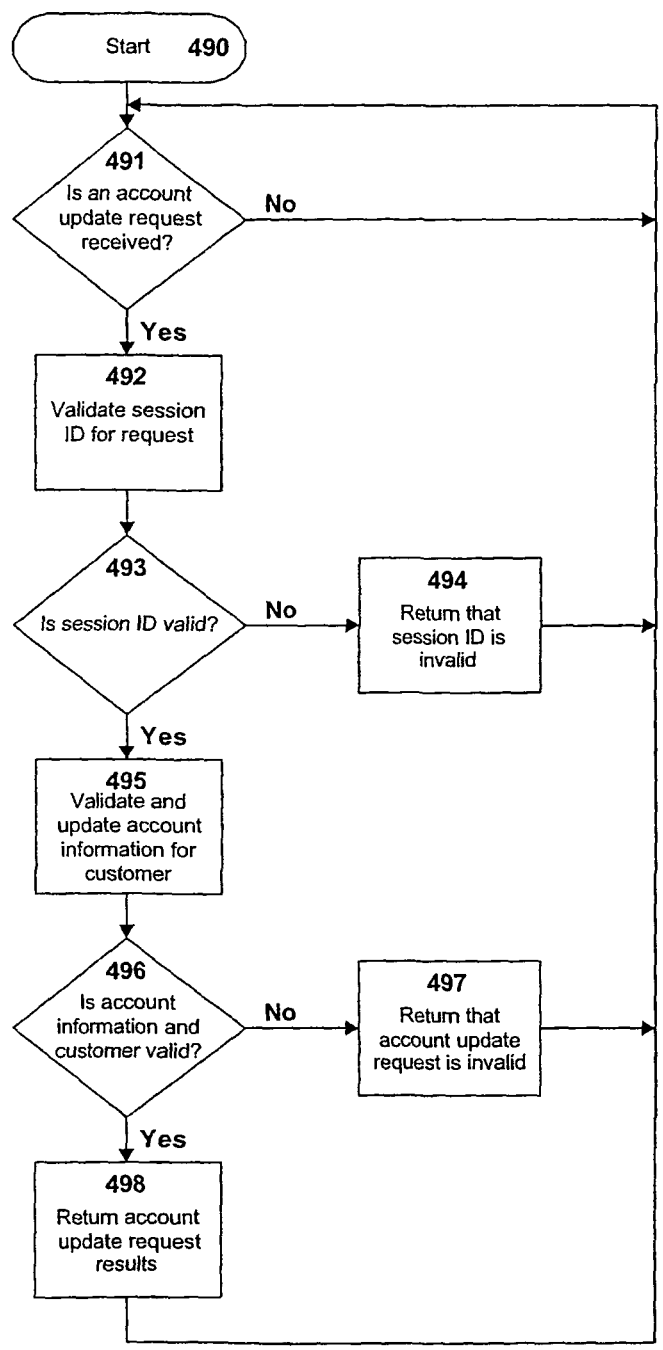
FIG. 32 is a software flow diagram on an application server for an account update request which forms a part of the digital content distribution and subscription system.

Updating account information for a user is important if a user's billing information changes, if a user's geographic location changes, and to a lesser extent, if a user's preferences change. FIG. 29 is a system level software flow diagram for an account update request, while FIGS. 30-32 are device specific software flow diagrams for an account update request. In particular, FIG. 30 is a software flow diagram for an account update request on the client 100. FIG. 31 is a software flow diagram for an account information request on the application server 103. FIG. 32 is a software flow diagram for an account update request on the application server 103.

The system level software flow diagram for an account update request, shown in FIG. 29, begins with an account information request by the client 100 for customer account information 199 in step 250. The account information request requires the client 100 to provide a valid session identifier obtained from a previously successful login request, described above in connection with FIG. 12. The account information request in step 250 is sent to an application server 103, which, first authenticates the request in step 251 using the passed session identifier. If the session identifier is valid, the application server 103 gets the customer account information 199 in step 252 from customer data 106 that the client 100 requested. After the customer account information 199 is fetched in step 252, the application server 103 returns the customer account information 199 in step 253. The client 100 then receives the customer account information 199 in step 254 from the application server 103. The client 100 then presents the customer account information 199 to the user for modification in step 255. The client 100 then takes any changes of customer account information 199 and sends an account update request in step 256 to the application server 103. Since the account information request from the client 100 to the application server 103 in step 250 is separate from the account update request from the client 100 to the application server 103 in step 256, the application server 103 must again authenticate the account update request from the client 100 in step 257 using the passed session identifier. If the session identifier is valid, the application server 103 updates the customer account information 199 in step 258 to customer data 106. The application server 103 then returns the results of the account update request to the client 100 in step 259. The client 100 receives the results of the account update request in step 260 from the application server 103, which the client 100 then can present to the user.

FIG. 30 is a client specific software flow diagram for an account update request, which in the example described henceforth, is called the update request task. In this embodiment, the update request task is handled within the Web Browser interface 134, a component of the client application 131, described above in connection with FIG. 7. A user on a client 100 typically initiates an account update request in order to update account information specific to the user. "Start" in step 461 represents the beginning of the update request task on the client 100. The update request task generates and sends an account information request in step 462 to the application server 103. The update request task then waits with some timeout, for example, 2 seconds, and optionally with multiple retries for an account information request response in step 463 from the application server 103. If an account information request response is not received in step 464, then the update request task presents the account information request failure to the user in step 465 and the task ends in step 475. If an account information request response, which includes the customer account information 199, is received in step 464 from the application server 103, then the update request task presents the customer account information 199 to the user in step 466. Then the update request task waits for action from the user to update the customer account information 199 in step 468. If the user does not request an update of the customer account information 199 in step 469, then the update request task ends in step 475. If the user does request an update of the customer account information 199 in step 469, then the update request task sends an account update request, which includes the updated customer account information 199, in step 470 to the application server 103. The update request task then waits with some timeout, for example, 2 seconds, and possibly with multiple retries for an account update request response in step 471 from the application server 103. If an account update request response is not received in step 472, then the update request task presents the account update request failure to the user in step 473 and the task ends in step 475. If an account update request response is received in step 472 from the application server 103, then the update request task presents the results of the account update request to the user in step 474 and the update request task ends in step 475.

FIG. 31 is an application server specific software flow diagram for an account information request, which in the example described henceforth, is called the application information handler. In this example, the application information handler is a continuously running process on the application server 103. "Start" in step 480 represents the beginning of the application information handler. If an account information request is received in step 481 from a client 100, then the session identifier, passed as part of the account information request, is validated in step 482. If the session identifier is not valid in step 483, then the application information handler returns that the session identifier is not valid in step 484 to the calling client 100. Optionally, the server may direct the user to the login process. The application information handler then checks for any account information requests received in step 481 again. If the session identifier is valid in step 483, then the application information handler gets the requested customer account information 199 in step 485 from customer data 106. If the customer account information 199 is not found in customer data 106 in step 486, then the application information handler returns that the account information request is not valid in step 487 to the calling client 100. The application information handler then checks for any account information requests received in step 481 again. If the customer account information 199 is found in step 486, then the application information handler returns the customer account information 199 in step 488 to the calling client 100 and checks for any account information requests received in step 481 again.

FIG. 32 is an application server specific software flow diagram for an account update request, which in the example described henceforth, is called the application update handler. In this example, the application update handler is a continuously running process on the application server 103. "Start" in step 490 represents the beginning of the application update handler. If an account update request is received in step 491 from a client 100, then the session identifier, passed as part of the account update request, is validated in step 492. If the session identifier is not valid in step 493, then the application update handler returns that the session identifier is not valid in step 494 to the calling client 100. The application update handler then checks for any account update requests received in step 491 again. If the session identifier is valid in step 493, then the application update handler validates and saves the updated customer account information 199 in step 495 to customer data 106. If the updated customer account information 199 is not valid in step 496, then the application update handler returns that the account update request is not valid in step 497 to the calling client 100. The application update handler then checks for any account update requests received in step 491 again. If the updated customer account information 199 is valid in step 496, then the application update handler returns the results of the account update request in step 498 to the calling client 100 and checks for any account update requests received in step 491 again.

Digital Music Subscription Service Screen Shots

An exemplary user interface for a digital content distribution and subscription system, is illustrated in FIGS. 33-39. This user interface is accessible on the client 100 as part of the client application 131, described above in connection with FIGS. 2 and 7.

Figure 33:
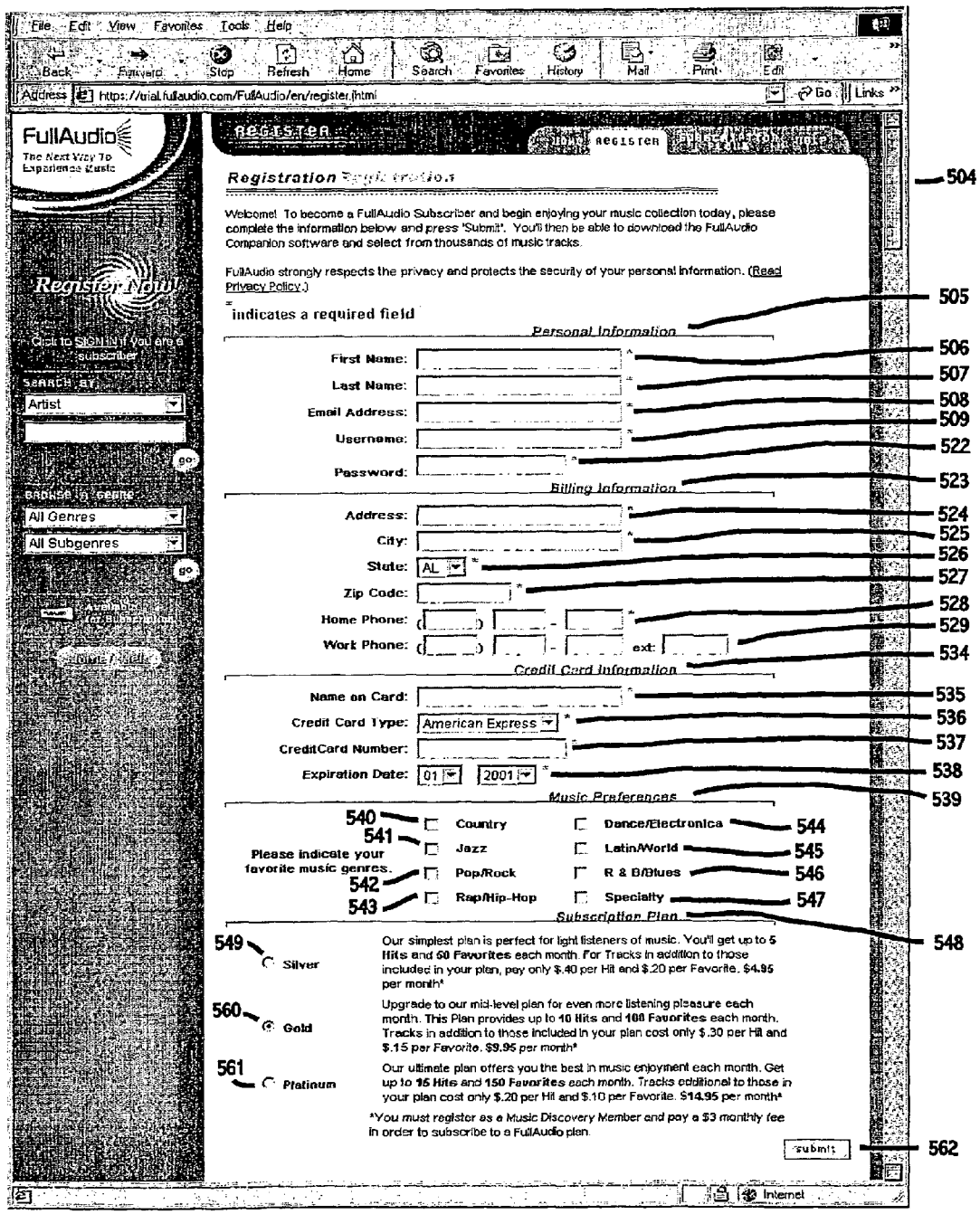
FIGS. 33-39 are exemplary screen shots for implementing a client application on the client computing platform which forms a part of the digital content distribution and subscription system.

The registration user interface 504, shown in FIG. 33, is handled in the Web Browser interface 134 part of the client application 131. The registration user interface 504 receives registration information from the user and passes this on to the application server 103 to store customer account information 199 in customer data 106. The system level software flow diagram for a registration request is described above in connection with FIG. 9. In this embodiment, there are multiple edit fields that the user must enter. The first group of fields is for personal information 505, which may include first name 506, last name 507, e-mail address 508, username 509, and password 522. The username 509 and password 522 fields are used for login and are described below in connection with FIG. 34. Other exemplary groups of fields in the registration interface 504 for the user to enter are billing information 523 and credit card information 534. Billing information 523 may include the user address 524, city 525, state 526, zip code 527, home phone number 528, and work phone number 529. The credit card field 534 may include the name on the credit card 535, credit card type 536, credit card number 537, and credit card expiration date 538. An exemplary group of music preferences 539 check boxes allows a user to specify their favorite musical genres, which may include Country 540, Jazz 541, Pop/Rock 542, Rap/Hip-Hop 543, Dance/Electronica 544, Latin/World 545, R & B/Blues 546, and Specialty 547. The music preferences can be used in a digital music subscription system for simplifying user searches and music recommendations. A subscription plan field 548 may offer various subscription options, such as Silver 549, Gold 560, and Platinum 561, which in this embodiment are used to provide three levels of subscription service at different price levels. Finally, the button 'submit' 562 allows the user to submit their registration.

Figure 34:
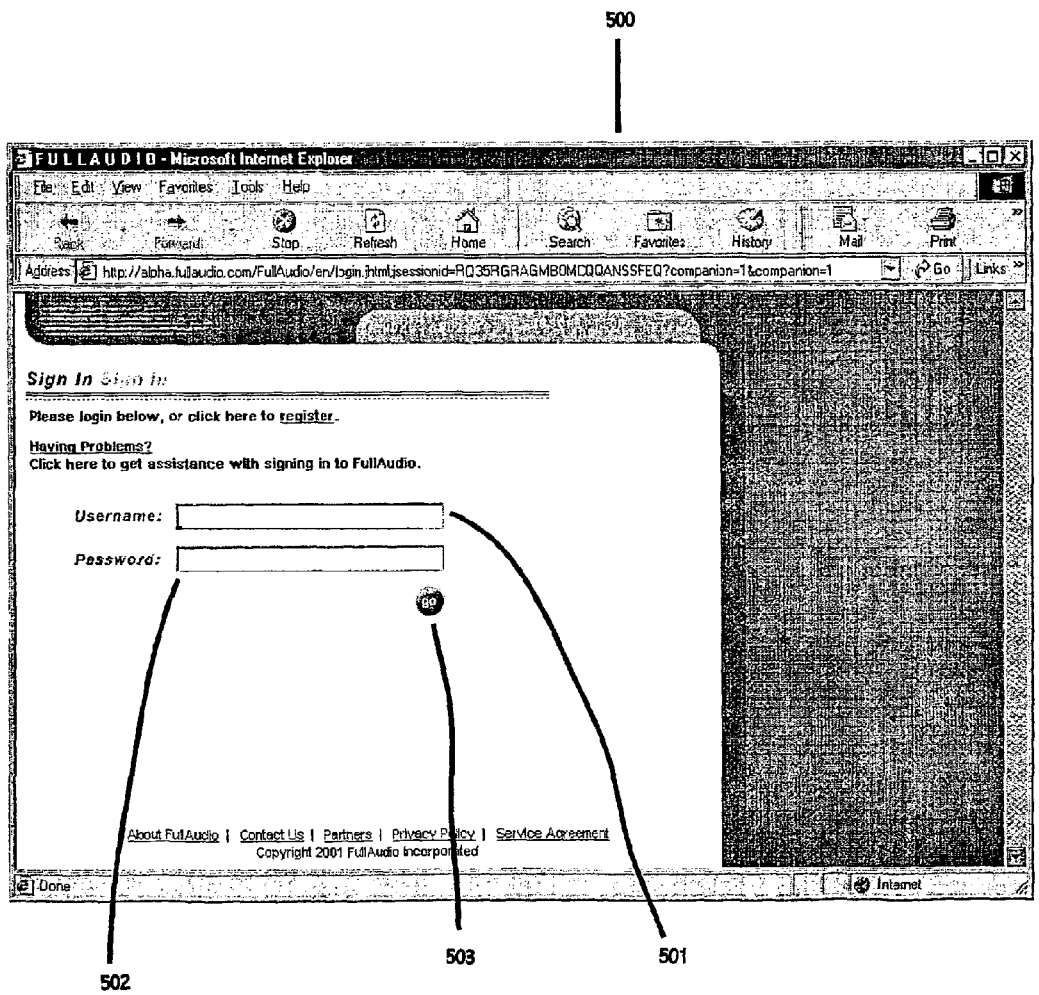

The login or sign in user interface 500, shown in FIG. 34, is handled in the Web Browser interface 134 part of the client application 131. The login user interface 500 receives login information from the user and passes this on to the application server 103 for authentication. The system level software flow diagram for a login request is described above in connection with FIG. 12. In this embodiment, two exemplary edit fields may be provided that the user must enter. In the edit field 501, identified as "Username", the user enters their designated user name, previously created by the user. In the edit field 502, identified as "Password", the user enters the password associated with the user name entered in the edit field Username 501. The password entry was also previously created by the user or generated automatically as part of registration for the digital music subscription service. Once the edit fields Username 501 and Password 502 are entered by the user, the user then selects the "go" button 503 in order to send this login information to the application server for authentication.

Figure 35:
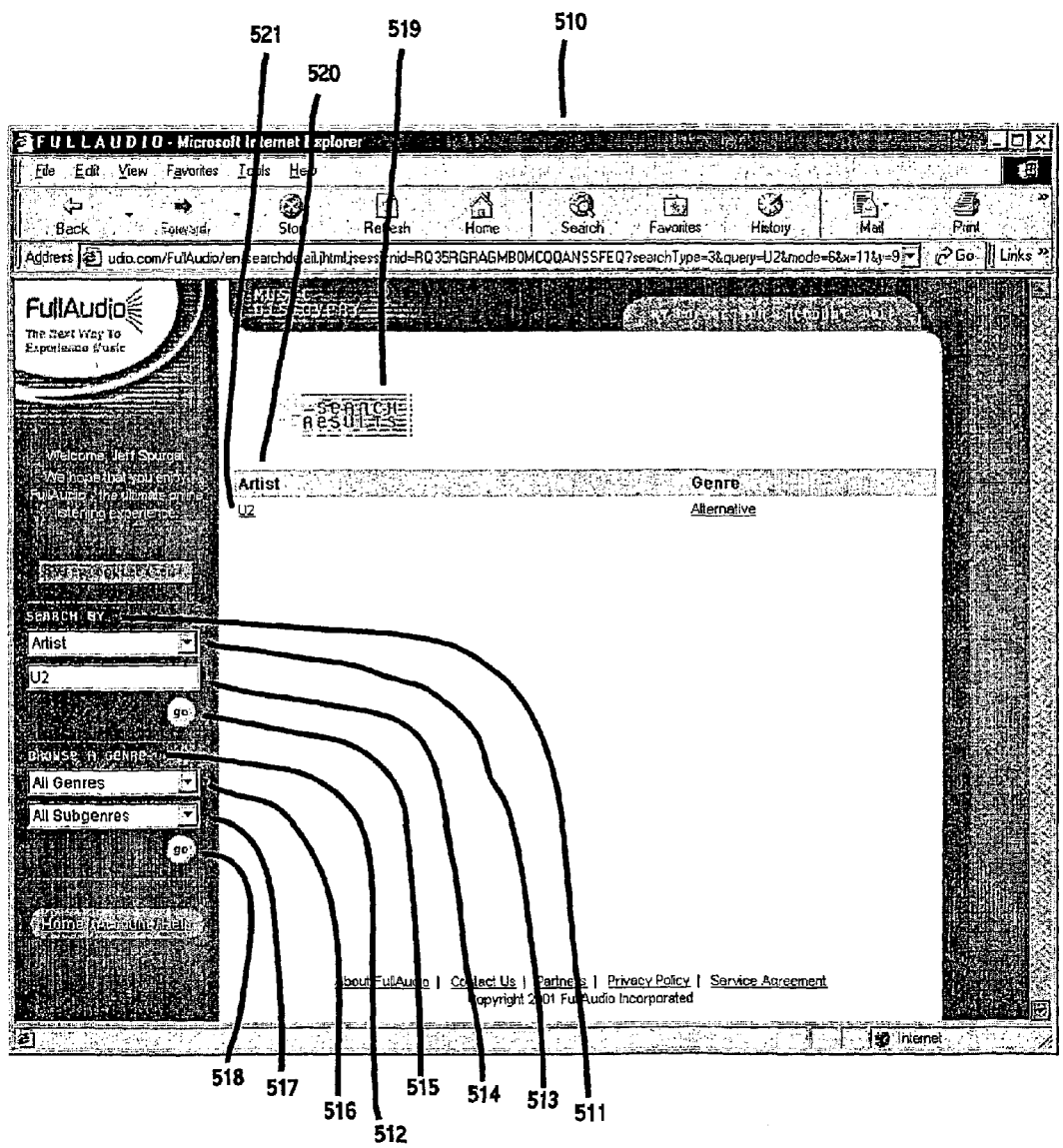

Once authenticated, a search user interface 510, shown in FIG. 35, is displayed under the control of the Web Browser interface 134 part of the client application 131. The search user interface 510 receives search requests from the user and passes this on to the application server 103, which then initiates a search of the digital content catalog 107. The application server 103 then returns the results of the search request to the search user interface 510 where the results are presented to the user. The system level software flow diagram for a search request is described above in connection with FIG. 15.

In this embodiment, there are two types of searches available. The first type of request is a general search 511 by artist, album, or track name. The search by artist, album, or track name is selected from a drop down list box 513. The search parameters are entered into an edit field 514 and the search request is initiated when the user selects the "go" button 515. The other type of search to request is browse a genre 512. When this search is selected, the system searches the digital content catalog 107 by musical genres, for example, pop/rock, country, or jazz. The musical genre is selected from a drop down list box 516. In addition, the search can be further refined by subgenre, for example, alternative, folk, or metal/hard rock, for the genre pop/rock. The subgenre is selected from a drop down list box 517 and the search request is initiated when the user selects the "go" button 518. The search results 519 are presented to the user in the search interface 510. As shown, a general search 511 was requested for the artist U2, with the search results 519 presented specifically in the result list 520. Selecting an artist 521, for example, U2, from the result list 520 expands the results for that specific artist, which is shown as the artist results user interface 530.

Figure 36:
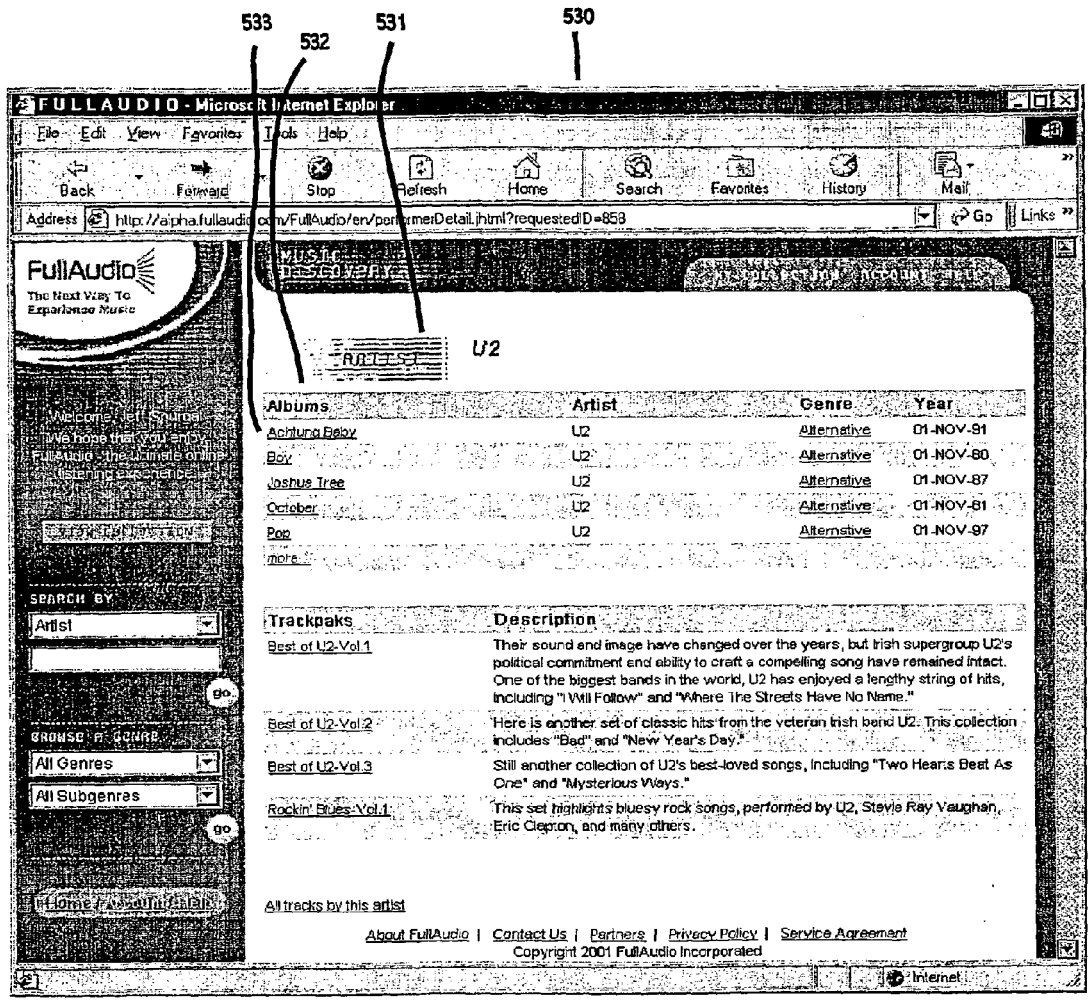

An artist results user interface 530, shown in FIG. 36, is handled in the Web Browser interface 134 part of the client application 131. The artist results user interface 530 presents search results by artist 531, for example, U2, and more specifically by a list of albums 532 from the artist. Selecting an album 533, for example, "Achtung Baby", from the list of albums 532 expands the results for that specific album, which is shown as the album tracks user interface 550.

Figure 37:
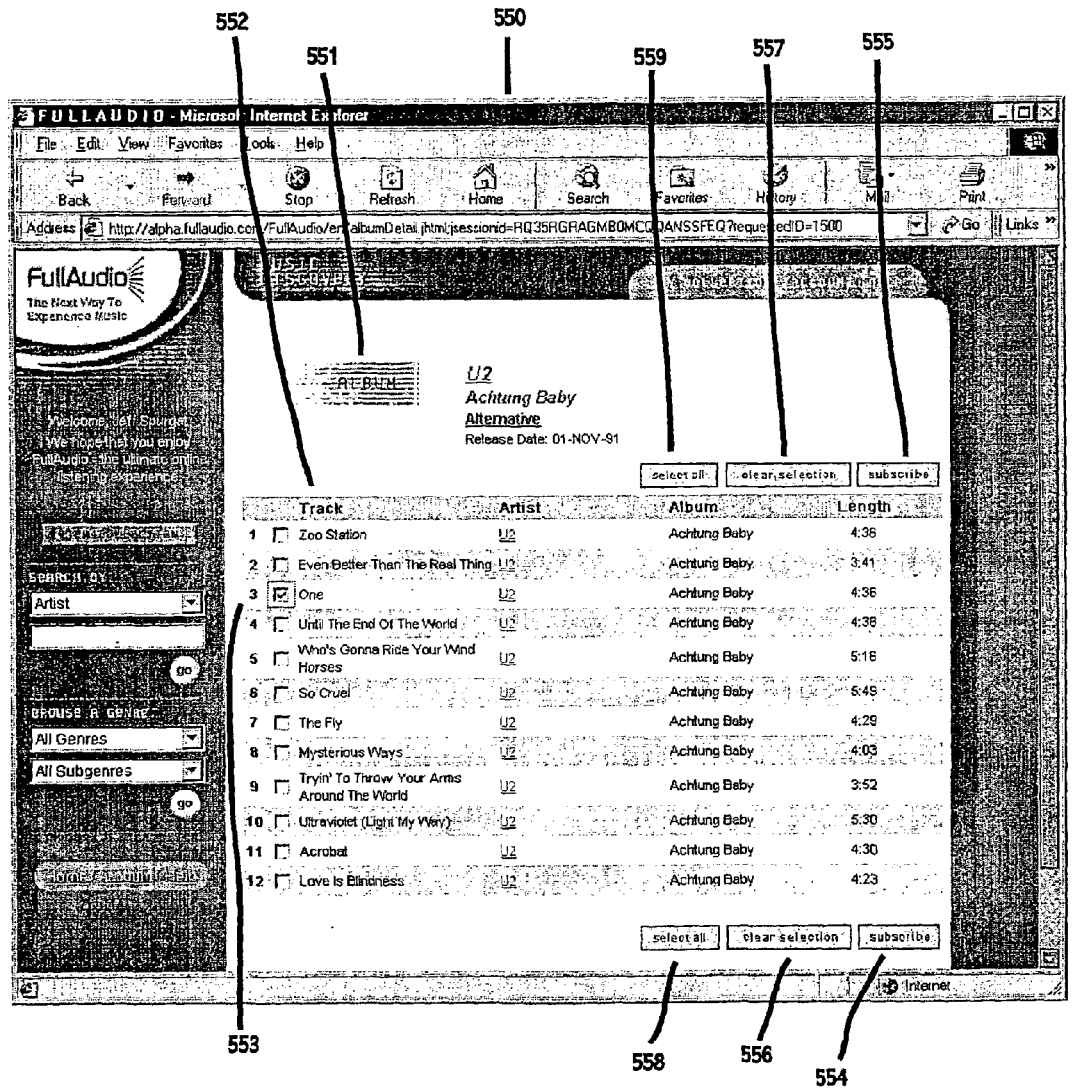

An album tracks user interface 550, shown in FIG. 37, is handled in the Web Browser interface 134 part of the client application 131. The album tracks user interface 550 allows the user to select specific songs or tracks for subscription. The album tracks user interface 550 presents album tracks 551, for example, the album "Achtung Baby", and more specifically by a list of tracks 552 from the album. Selecting the check box for a track 553, for example, the song "One", from the list of tracks 552 makes the selected track 553 available for download. In addition, the "Select All" buttons 558 and 559 make all the tracks in the list of tracks 552 available for download and the "Clear Selection" buttons 556 and 557 deselect all the tracks in the list of tracks 552 available for download. Selecting the "Subscribe" button 554 or 555 initiates the download or subscribe of the selected track 553. The album track user interface 550 passes the download request information to the application server 103, which, among other things, returns a download address for the selected track 533 to download.

Figure 38:
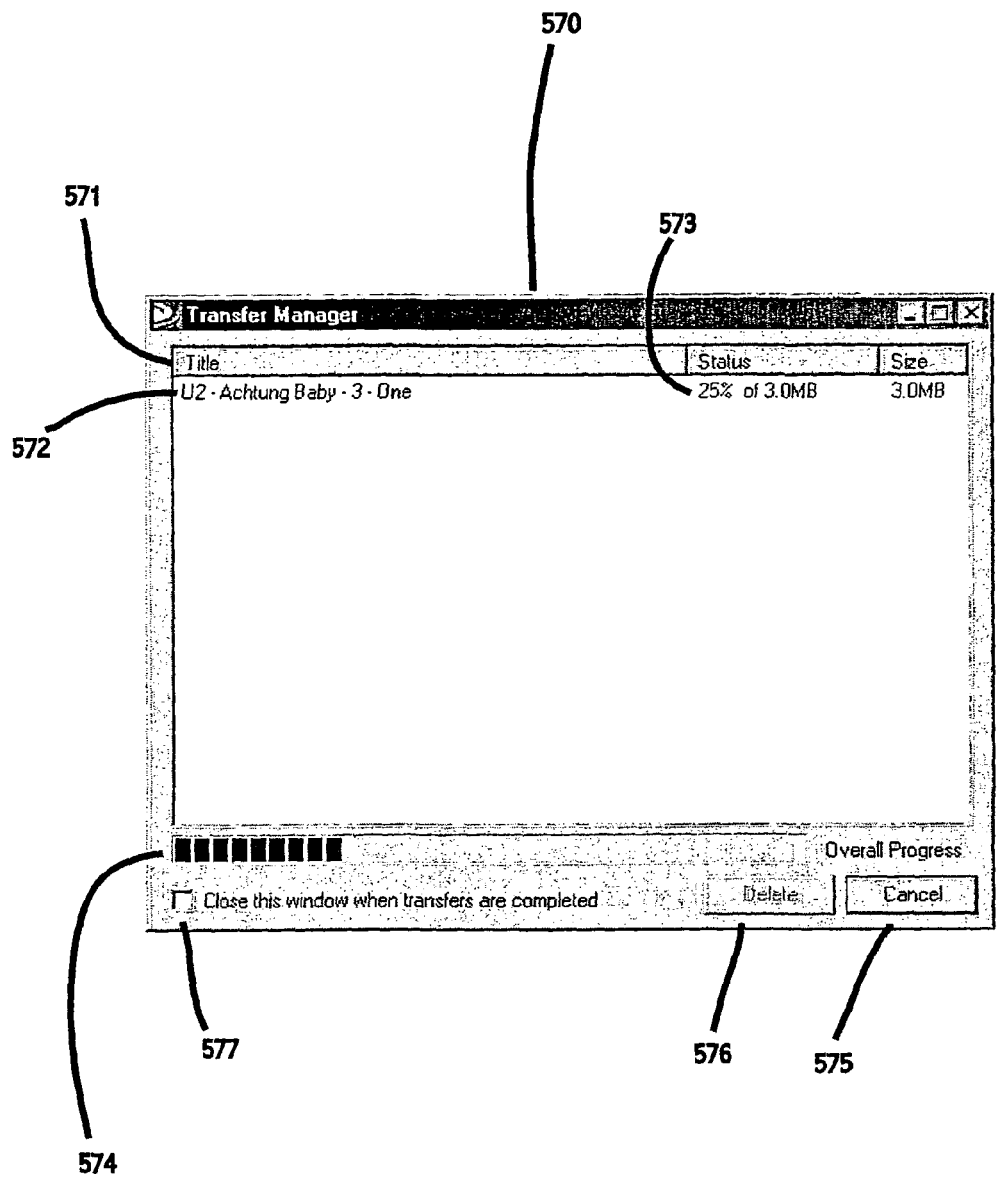

A system level software flow diagram for a download request is described above in connection with FIG. 18. The download interface 570, shown in FIG. 38, is handled in the Transfer Manager software system 132 part of the client application 131 and receives the download address from the application server 103 and initiates the track download from the content server 104 using the download address. The download interface 570 provides a list of tracks 571 that are to be downloaded. The track list 571 specifies the track title 572 and includes, for example, the artist name U2, the album name "Achtung Baby", the track number 3 in the album, and the track title "One". The track list 571 also includes the download status 573 for each track in the list. In addition, the download interface 570 includes an overall progress bar 574, which indicates the overall progress of the track downloads. The download interface 570 has a cancel button 575 that terminates the download when selected and a delete button 576 that removes a track to be downloaded from the track list 571. The check box 577 simply enables automatic closing of the download interface 570 when the track downloads complete.

Figure 39:
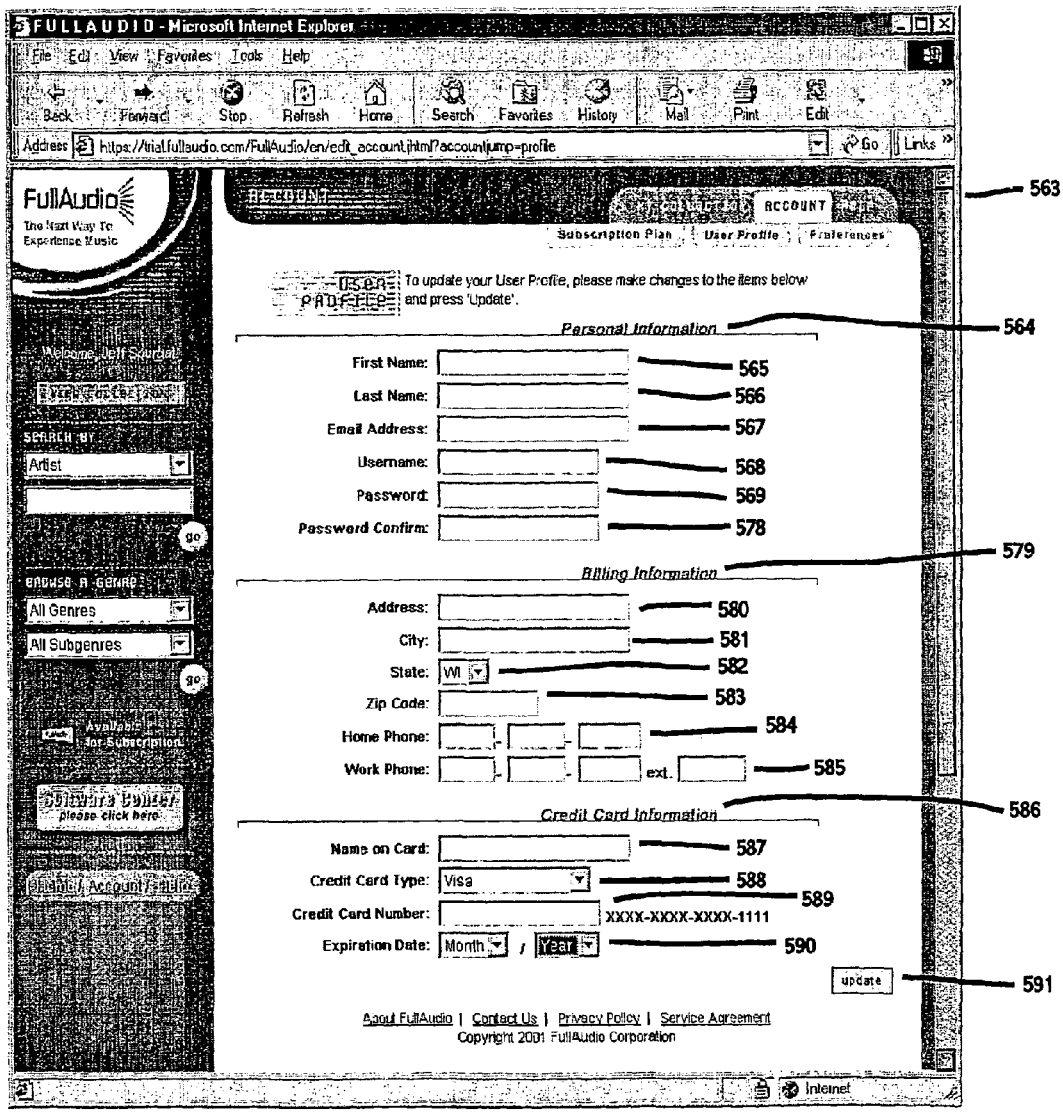

An account update or user profile interface 563, shown in FIG. 39, is handled in the Web Browser interface 134 part of the client application 131. The account update or user profile interface 563 allows the user to edit and make changes to their customer account information 199 in customer data 106. The system level software flow diagram for account update is discussed above in connection with FIG. 29. In this embodiment, various groups of are fields available for editing. The personal information 564 group of fields may include first name 565, last name 566, e-mail address 567, username 568, password 569, and password confirmation 578 for password changes. The billing information 579 group of fields may include a user address 580, city 581, state 582, zip code 583, home phone number 584, and work phone number 585. Finally, a credit card information 586 group of fields may include a name on the credit card 587, credit card type 588, credit card number 589, and credit card expiration date 590. The "update" button 591 sends the updated account information to the application server 103 for updating.

Digital Content Management

As part of a digital content distribution and subscription system, a particular user may be restricted as to the amount of digital content data 108 available over a particular time period. This amount of digital content data 108 allowed over a particular time period may be further restricted such that once this amount is reached, the user is not able to access any additional digital content data 108 until that time period is completed, without incurring any additional fees. For example, in a subscription service for digital music, a user may only be allowed access to a certain number of songs managed as cache slots (FIG. 43) during a certain time period, for example, 100 songs per month. Once the user has filled a slot, the user would then have to wait until their next renewal date before being able to put a different song in one of their slots. The user can get more songs than allocated by their current plan. These songs are charged on an individual basis. Those additional tracks may be swapped or not renewed at the next renewal cycle. The subscriber's of digital content may be distributed over one or more client computers from which the user accesses the subscription system, and it may be possible for a single user to download the same content to multiple client computers. The subscription system may allow this duplication of downloaded content but may restrict such duplication as deemed appropriate for the business by enforcing a limit on the number of client computers to which each user may download content.

Digital content management is implemented in a distributed manner such that access to downloaded digital content at a given point in time is restricted by software licenses operating on the client computer, while the acquisition, renewal, and tracking of these licenses is managed by the application server.

Licenses grant users the ability to access digital content which has already been or will be downloaded onto their client computer(s), and are set to expire at the end of each subscription period. If a license for content exists and is valid for the time period during which access is being attempted, access to the content will be granted. If an attempt is made to access content for which no license exists or for which an expired license exists, an attempt may be made to immediately retrieve a valid license for this content and allow access to the content, or the user may be notified that such content is inaccessible, and that access will be forbidden. In the latter case, the user may be given the opportunity to retrieve a license for the specific content at this time or at a later time.

The Transfer Manager automatically requests and downloads licenses from the application server whenever a user requests and downloads digital content. Which licenses may be granted during a given time period may be limited by any number of policies, such as the category of the content as compared to the user's subscription privileges. Other policies and restrictions not mentioned here may also be enforced by the application server. The application server keeps track of the number of licenses which each user has successfully downloaded for a given time period, and so is responsible for enforcement of all such policies and restrictions.

In order for users to continue to have access to the digital content they have downloaded once a given subscription period has ended, they must replace their licenses (i.e., renew) with subsequent licenses which are valid for the new subscription period. The licenses are provided by the application server response to renewal requests from the Transfer Manager. This process may be initiated automatically by the Transfer Manager as explained elsewhere in this document, or the user may manually start the process. Once the process is initiated, all content which is flagged as needing renewal will be renewed, as long as the user's account status continues to remain valid (reasons for an invalid account would include failure to pay the monthly subscription fee).

At any time over the course of the subscription period, the user, through a web browser interface to the application server, may indicate which content items they wish to have renewed the next time the renewal process takes place. The application server maintains a list of all digital content to which the user is or has been subscribed. Once that process occurs and the renewed licenses are downloaded, those specified items will be available for access by the user for the duration of the next subscription period. Should the user choose not to flag one or more content items for renewal, those items will only continue to be accessible until the end of the current subscription period, at which point they will cease to be accessible when their licenses expire.

Licenses are not readily transferable to other client computers, even if a single user owns both client computers. In order to gain access to the same digital content stored on a separate client computer, a new license must be downloaded from the application server. A user may be permitted to download digital content and its associated licenses to multiple client computers, but a system-wide maximum may limit the number of client computers to which a given user may perform such duplicate downloads. The number of systems to which a given user has downloaded licenses is maintained by the application server, based on unique identifiers which are generated and maintained via communications between the Transfer Manager and the application server.

Digital Content Access

Figure 40:
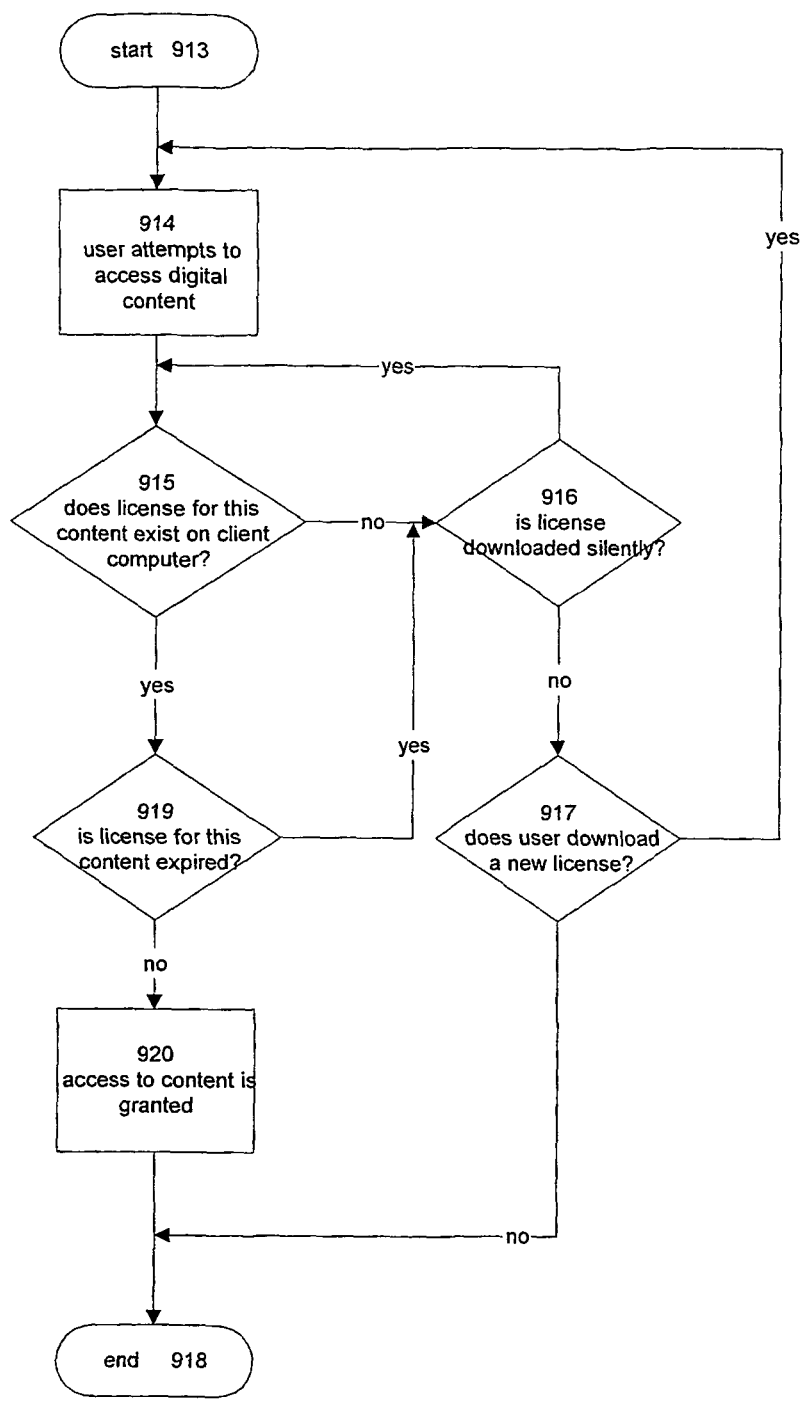
FIGS. 40-42 are software flow diagrams for digital content management which forms a part of the digital content distribution and subscription system.

Referring to FIG. 40, digital content access starts in steps 913 and 914 when the user attempts to access digital content, for example, when the user tries to play a protected music file through a supported media player, such as the Microsoft Windows Media Player. In the next step 915, the digital content management software running on the client computer checks to see if a license exists for this content. If not, the Transfer Manager may attempt to acquire a license for this content automatically as indicated in step 916, without requiring the user to have knowledge of or intervene in this process (i.e., "silently"). If the Transfer Manager successfully downloads a license silently then flow goes back to step 915 to the point at which the system checks to see if the license exists (i.e., was the license which was just downloaded really for the content in question?). If the Transfer Manager fails to download a license silently, then the user may be given the opportunity to choose in step 917 whether to download a new license for this content. If they choose not to download a new license, the process ends in step 918 and the user cannot access the content. If they choose to proceed with the download of a new license, then flow goes back to step 914 to the point at which the system checks to see if the license exists. If the system determines that a license for the content does exist, in step 915 flow moves to the next step 919, at which point the system checks whether the license has expired. If the license has expired, the Transfer Manager may attempt to download a new license (i.e., "renew") for this content silently in step 916. If the Transfer Manager successfully downloads a license silently then flow returns to the point where the system checks to see if the license exists in step 915. If the Transfer Manager fails to download the license silently, then the user may be given the opportunity to renew the license in step 917. If the user chooses not to renew the license in step 917, the process ends and the user cannot access the content. If the user chooses to renew the license in step 917, flow returns to step 915 to the point at which the system checks to see if the license exists. If, at step 919 where it is determined whether the license is expired, it is found not to have expired, then access is granted for the content in step 920. For example, in the case of a protected music file, the file would begin playback through the user's media player.

License Renewal Process

Figure 41:
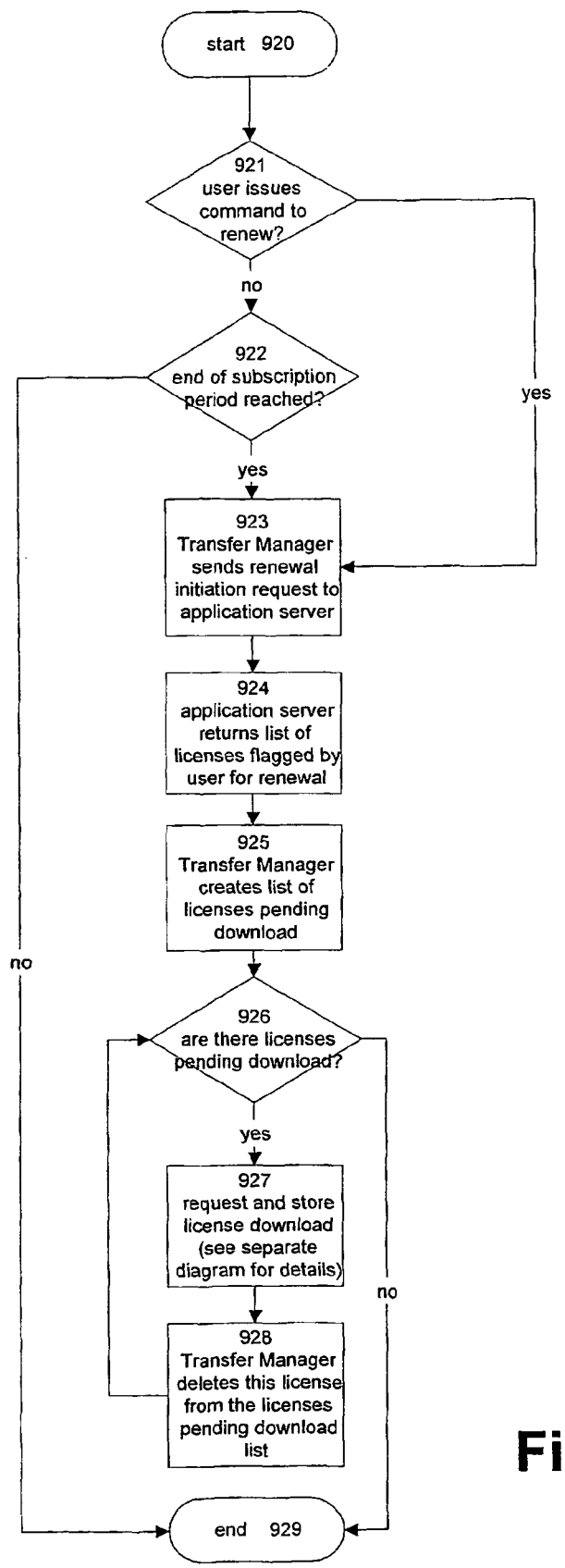

Referring to FIG. 41, a license renewal process is initiated by "Start" in step 920. This process is initiated when the user manually chooses in step 921 to renew their digital content licenses, or automatically by the Transfer Manager at a predetermined renewal date, such as at or near the end of a subscription period (i.e., at or near when existing licenses expire as in step 922). In either case, the Transfer Manager will notify the application server that the renewal process should initiate in step 923. The application server will respond with a list of licenses for digital content in step 924 which should be renewed, based on which items the user has previously flagged for renewal. Starting from this list, the Transfer Manager in step 925 builds an internally maintained list of licenses to request for download. In the next step 926, the Transfer Manager checks to see whether there are any licenses in this list. If there are, the Transfer Manager sends a request to download the license for the specific content item in step 927. The details of the process by which the license is downloaded (or not) and stored to the client computer are specified below, in License Download Request Process. After the request to download is processed (successfully or not), the Transfer Manager deletes from its internally maintained list of licenses to request for download the license which was just requested for download in step 928. Next, flow returns to step 926 where the Transfer Manager checks to see whether there are any more license download request remaining in the list. The process continues until this list is empty in step 929.

License Download Request Process

Figure 42:
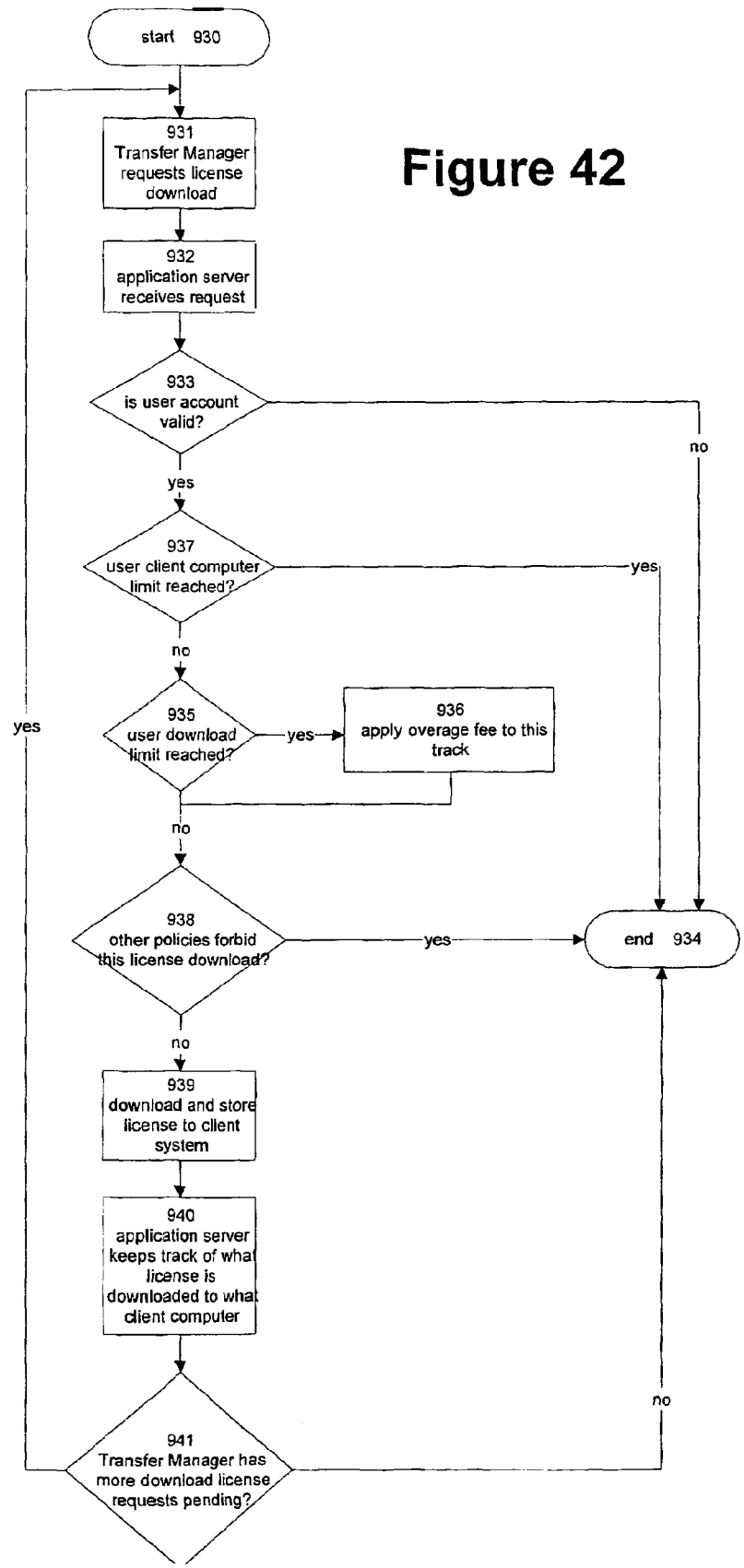
Figure 43:
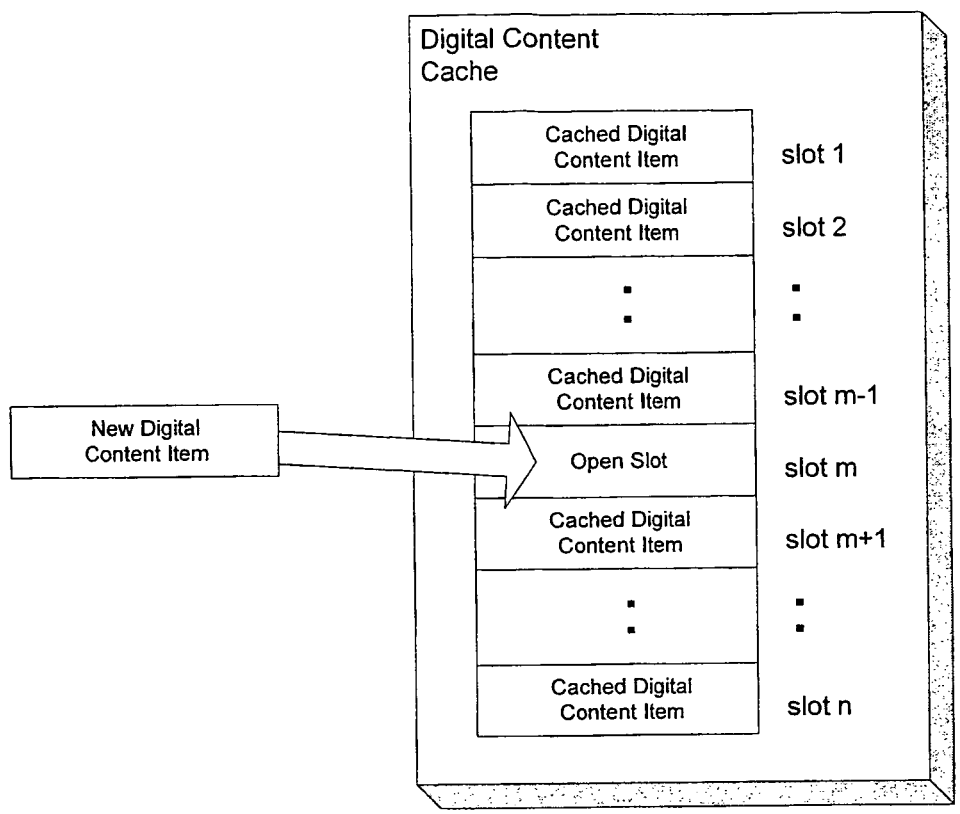
FIG. 43 is a block diagram of a digital content cache slot for digital content management which forms a part of the digital content distribution and subscription system.

Referring to FIG. 42, a license download request is indicated by "Start" in step 930. This process is initiated in step 931 when the Transfer Manager issues a request to the application server to download a license for a specific digital content item. When the application server receives this request in step 932, it determines in step 933 whether the user's account is valid (i.e., the user has paid for the current subscription period). If not, the process ends in step 934. If so, the flow continues to the step 937, where the application server determines whether the client computer to which the licenses are requested to be downloaded has been used for previous license downloads, or whether it is a new client computer. If it is new, then the application server checks to see whether downloading to this new system would exceed the maximum limit on the number of client computers to which any given user (i.e., user account) may download licenses. Next, in step 935, the system checks whether the user download limit has been reached. If so, an overage fee is applied to the requested track in step 936. If this limit has already been reached, then the process ends. Flow continues to step 938, where the application server enforces any additional policies which might restrict the user from downloading the license in question. If such policies would, in fact, prohibit the user from being allowed to download the license, then the process ends. If not, then flow continues to step 939, at which point the application server and Transfer Manager perform the license download and the license is stored on the client computer. After the license has been downloaded, the application server keeps track not only of which content item has been downloaded, but also which user and client computer received this download in step 940, so that future license download requests may be restricted based on aforementioned maximum limits. The step 941 is to determine whether there are any further license download requests which need to be processed. If so, flow returns to step 931. If not, the process ends.

Token-Based Authentication

In order to provide additional protection of the digital content data 108 in a digital content distribution and subscription system, the download address provided to a user for downloading of the digital content data 108 can include a token. This token can be, for example, a randomly generated alphanumeric string of a predetermined or random length, that is used to authenticate the download when the download request is made by a user of the digital content distribution and subscription service. In addition, the token may have a lifetime or expiration time, for example, 5 minutes, for which the token is valid. When the current token has expired, a new token is generated and provided for download requests. The dynamic and frequently changing nature of the token in the download address for digital content data 108 helps prevent unauthorized downloads of the digital content data 108 by making the download address for digital content data 108 dynamic in nature as well as valid for only a short period of time.

Figure 46:
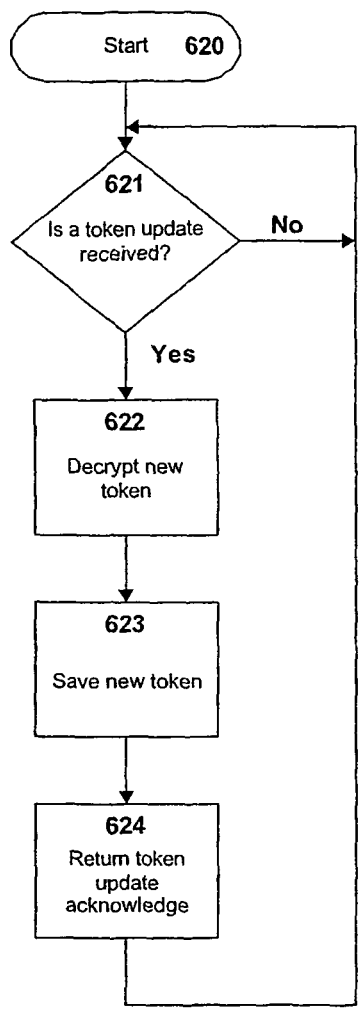
FIG. 46 is a software flow diagram on an application server illustrating token distribution for a token-based authentication system which forms a part of the digital content distribution and subscription system.
Figure 47:
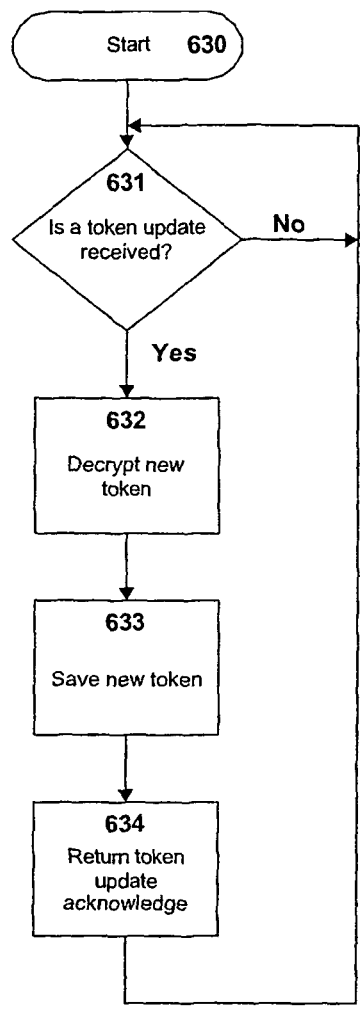
FIG. 47 is a software flow diagram on a content server illustrating token distribution for a token-based authentication system which forms a part of the digital content distribution and subscription system.
Figure 48:
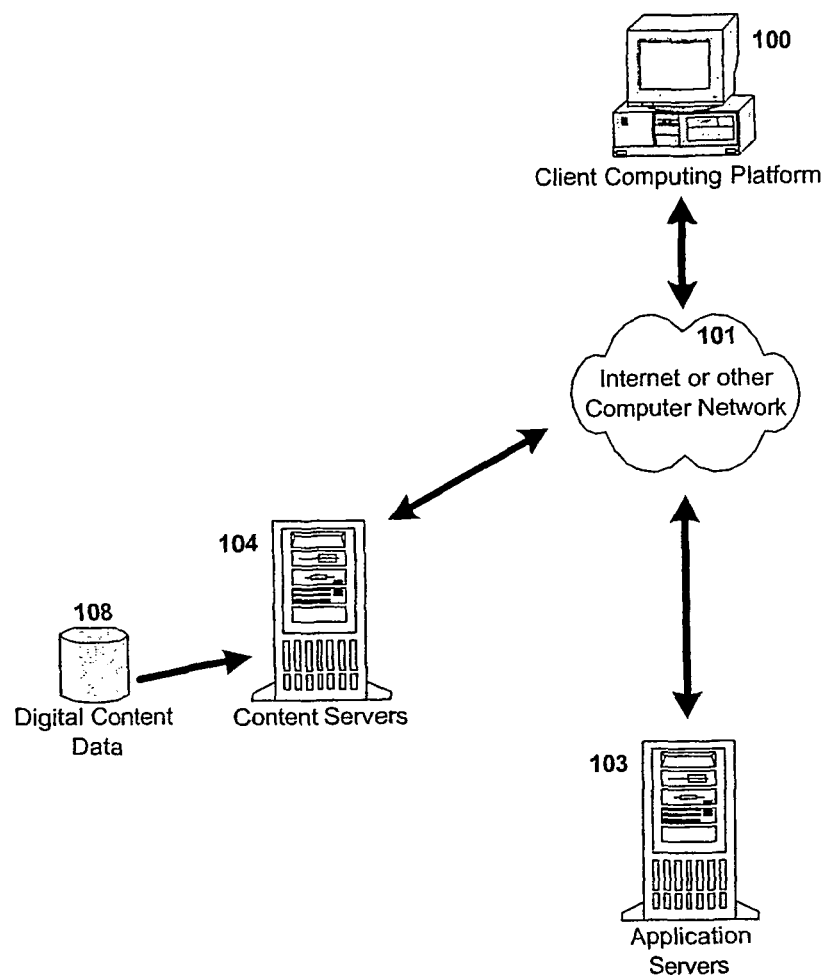
FIG. 48 is a block diagram that illustrates an overview of token authentication for a token-based authentication system which forms a part of the digital content distribution and subscription system.
Figure 49:
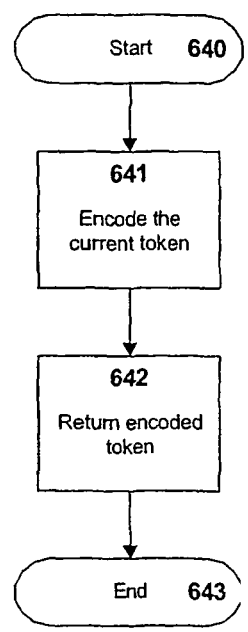
FIG. 49 is a software flow diagram on the application server of token authentication for a token-based authentication system which forms a part of the digital content distribution and subscription system.
Figure 50:
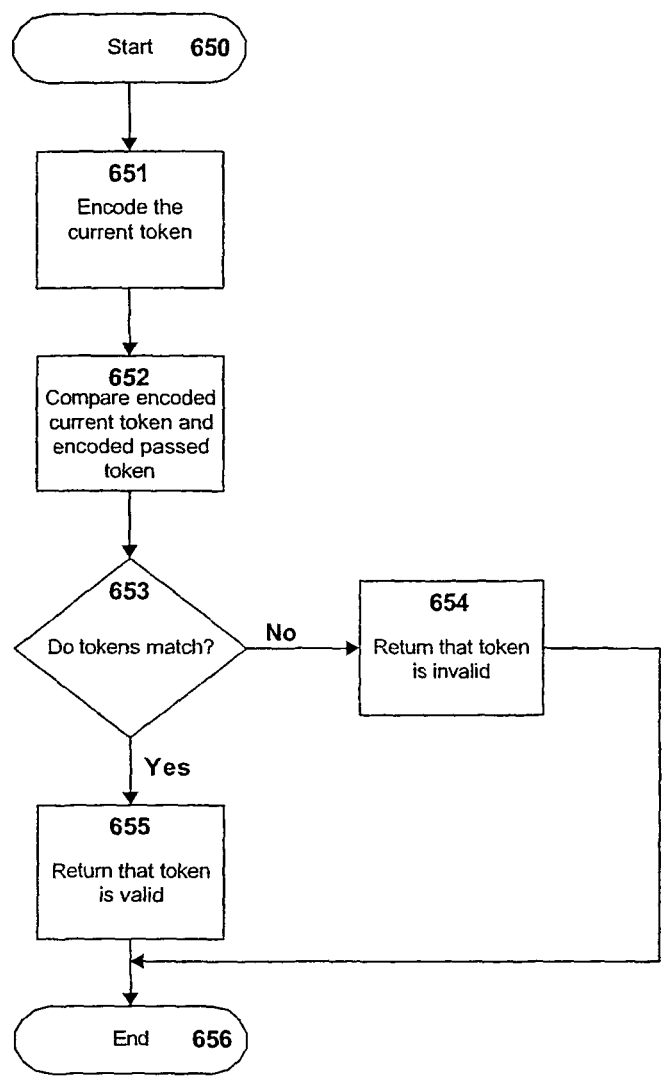
FIG. 50 is a software flow diagram on a content server of token authentication for a token-based authentication system which forms a part of the digital content distribution and subscription system.

FIGS. 44-50 provide an embodiment for token-based authentication of digital content data 108 download requests in a digital content distribution and subscription system. In this particular embodiment, there are two components to the token-based authentication system. One component is token distribution, shown in FIGS. 44-47, and the other component is token authentication, which is shown in FIGS. 48-50.

Figure 44:
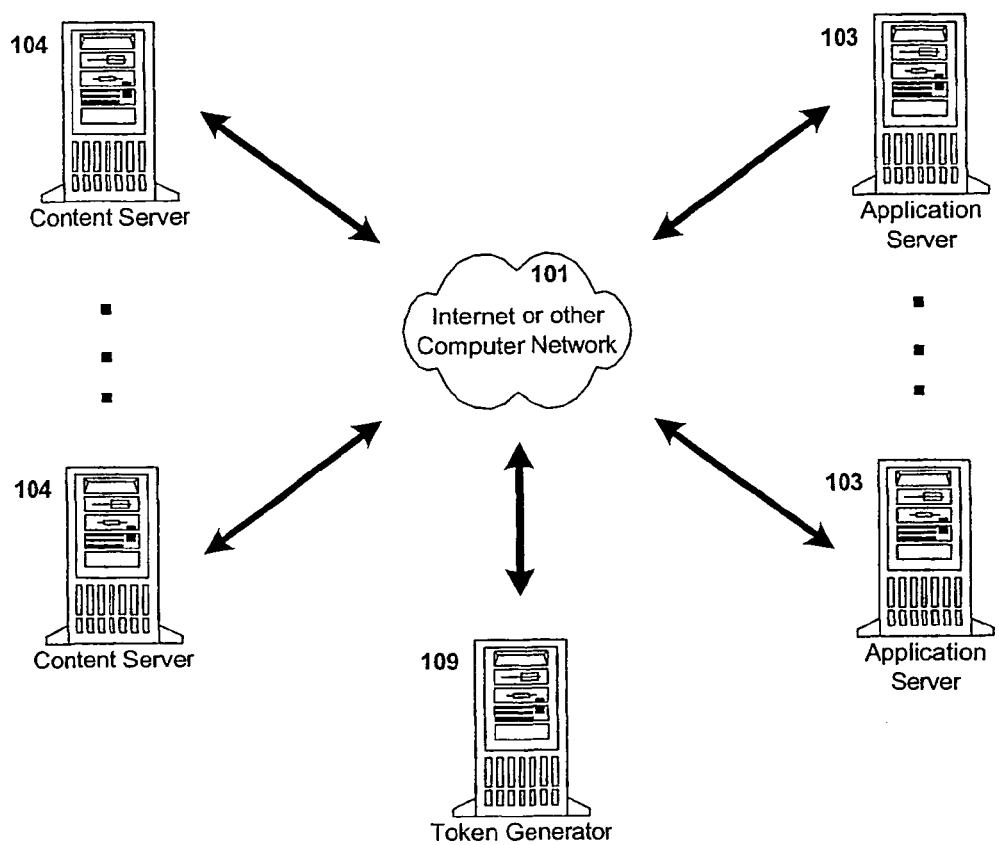
FIG. 44 is a block diagram that illustrates an overview of token distribution on the server side for a token-based authentication system which forms a part of the digital content distribution and subscription system.

The token distribution overview block diagram, illustrated in FIG. 44, shows the relationship and interaction between the token generator 109 and the application servers 103 and content servers 104 with respect to token distribution. The token generator 109 is responsible for generating tokens. Tokens can be, for example, randomly generated alphanumeric strings of predetermined or random length. The token generator 109 is then responsible for distributing the tokens to the application servers 103 and the content servers 104, where the tokens are actually used, described below in connection with FIG. 48. If the tokens are distributed over a public network, such as the Internet, then the tokens may be encrypted using, for example, public key encryption, before being distributed. It should be noted that the token generator 109 may exist as a separate server or may run on an existing server, for example, on one of the application servers 103.

Figure 45:
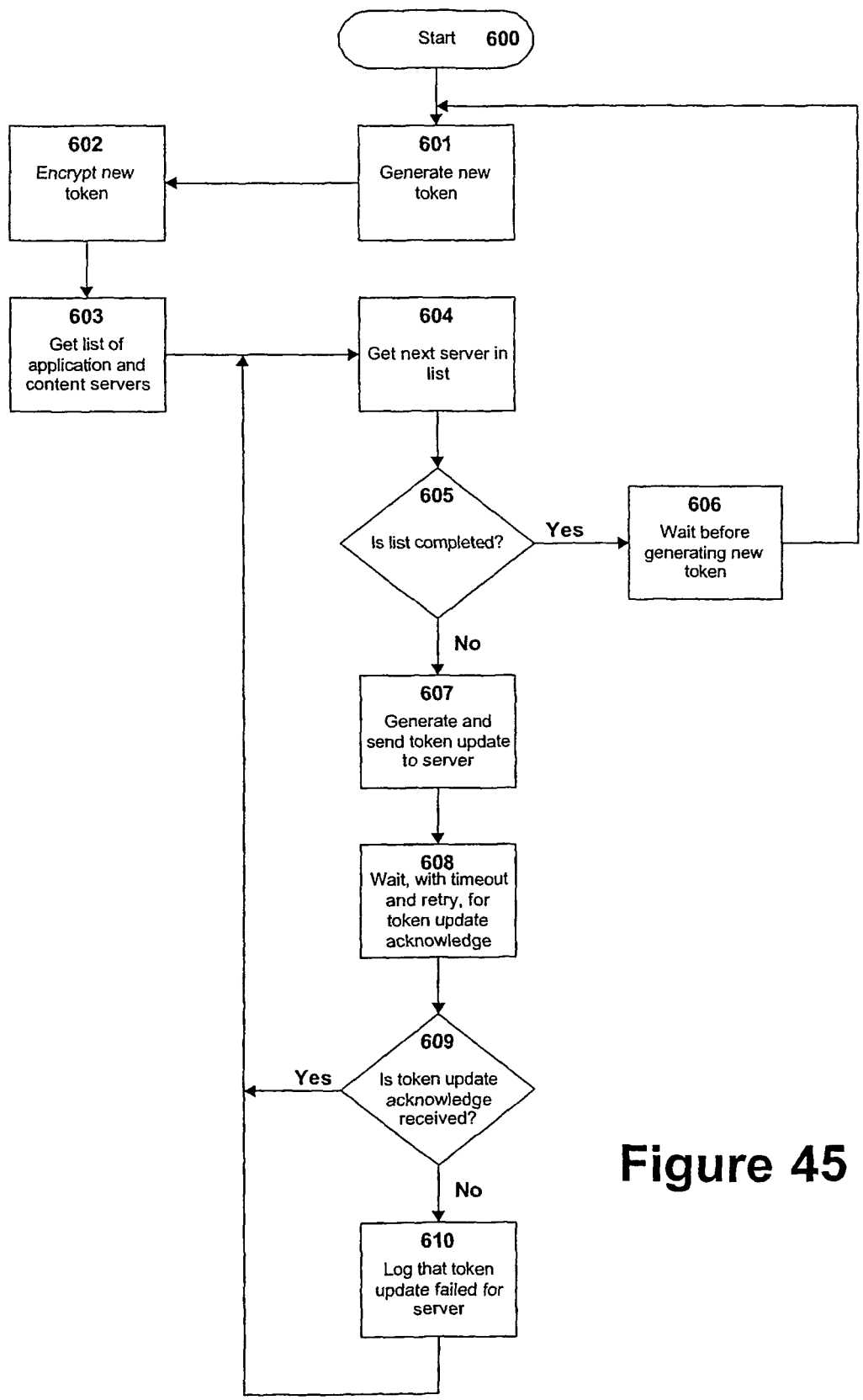
FIG. 45 is a software flow diagram on a token generator of token distribution for a token-based authentiation system which forms a part of the digital content distribution and subscription system.

FIG. 45 is a token generator specific software flow diagram for token distribution is called the token generation handler. In this example, the token generation handler is a continuously running process. "Start" in step 600 represents the beginning of the token generation handler. The token generation handler generates a new token in step 601. Next, the token generation handler encrypts the new token in step 602, using, for example, public key encryption, in order to secure the token if the token is distributed over a public network such as the Internet. Then the token generation handler gets the locally stored list of application servers 103 and content servers 104 that need to receive the new token in step 603. Steps 604 through 610 represent the actual distribution of the token to each server in the list of servers. In step 604, the next server to send the token is retrieved from the list of servers. If the list is completed in step 605 and there are no more servers to send the token, then the token generation handler waits, for example, 5 minutes, in step 606 before generating and distributing a new token in step 601 again. If the list of servers is not completed in step 605 and the next server to distribute the token was retrieved in step 604, then the token generation handler generates and sends a token update to the server in step 607. Next, the token generation handler waits for a predetermined timeout period, for example, 2 seconds, and possibly with multiple retries for a token update acknowledge in step 608 from the server. If a token update acknowledge is not received in step 609, then the token generation handler logs that the token update failed for the particular server in step 610. Logging the failure allows a system administrator to quickly identify possible problems with a server or the computer network. After the token update failure is logged in step 610 or if the token update acknowledge was received in step 609, then the token update handler gets the next server in the list of servers to distribute the token in step 604 again.

FIG. 46 is an application server specific software flow diagram for token distribution, called the application token distribution handler. In this embodiment, the application token distribution handler is a continuously running process on the application server 103.

"Start" in step 620 represents the beginning of the application token distribution handler. If a token update is received in step 621 from the token generator 109, then the token, passed as part of the token update, is decrypted in step 622, in accordance with the encryption process used by the token generator 109. Next, the application token distribution handler saves the decrypted token in step 623 for later use by the application server 103 during download address generation, described below in connection with FIG. 49. Then the application token distribution handler returns a token update acknowledge in step 624 to the calling token generator 109 and checks for a token update received in step 621 again.

FIG. 47 provides the content server specific software flow diagram for token distribution, called the content token distribution handler. In this example, the content token distribution handler is a continuously running process on the content server 104. "Start" in step 630 represents the beginning of the content token distribution handler. If a token update is received in step 631 from the token generator 109, then the token, passed as part of the token update, is decrypted in step 632, in accordance with the encryption process used by the token generator 109. Next, the content token distribution handler saves the decrypted token in step 633 for later use by the content server 104 during download address authentication, described below in connection with FIG. 50. Then the content token distribution handler returns a token update acknowledge in step 634 to the calling token generator 109 and checks for a token update received in step 631 again.

The token authentication overview block diagram, illustrated in FIG. 48, shows the relationship and interaction between the client 100 and the application servers 103 and content servers 104 with respect to token authentication. When a client 100 makes a digital content data 108 download request, described above in connection with FIG. 18, the application server 103 uses the currently saved token from the token generator 109, as well as a content file name or content identifier 213 to generate the download address. The application server 103 passes this download address back to the client 100 and the client 100 then requests the digital content data 108 from the content server 104, passing this download address. The content server 104 authenticates the download request using the token that the content server 104 extracts from the download address and compares this token with the token that the content server 104 received from the token generator 109.

FIG. 49 is an application server specific software flow diagram for token authentication, called the application token authentication handler. In this example, the application token authentication handler is called as part of the digital content download request, and more specifically, when the download address is generated on the application server 103 by the application download handler, described above in connection with FIG. 21, step 368. The application token authentication handler thus provides the token to the application download handler, which uses the token to generate the download address that the application server 103 passes to the client 100, described above in connection with FIG. 18.

"Start" in step 640 represents the beginning of the application token authentication handler on the application server 103. The application token authentication handler encodes the token in step 641 that was saved on the application server 103 by the application token distribution handler, described above (FIG. 46, step 623). The token can be encoded using, for example, the MD5 message-digest algorithm. Then the application token authentication handler returns the encoded token in step 642 to the calling application download handler and the application token authentication handler ends in step 643.

FIG. 50 provides the content server specific software flow diagram for token authentication, called the content token authentication handler. In this example, the content token authentication handler is called as part of the digital content download request, and more specifically, when the download address is authenticated on the content server 104 by the content download handler, described above (FIG. 24, step 392). The content token authentication handler thus authenticates the encoded token for the content download handler as part of download address authentication on the content server 104 before the content server 104 allows downloading of the digital content data 108. The encoded token is included as part of the download address passed by the client 100 to the content server 104, described above in connection with FIG. 18.

"Start" in step 650 represents the beginning of the content token authentication handler on the content server 104. The content token authentication handler encodes the token in step 651 that was saved on the content server 104 by the content token distribution handler, described above (FIG. 47, step 633). This step is necessary, since the encoding process, for example, the MD5 message-digest algorithm, may not be reversible, thus requiring comparison of encoded tokens rather than the actual tokens themselves. Next the content token authentication handler compares in step 652 the encoded token generated in step 651 and the encoded token passed by the calling content download handler, extracted from the download address passed to the content server 104 by the client 100. If the encoded tokens do not match in step 653, then the content token authentication handler returns that the token is invalid in step 654 to the calling content download handler and the content token authentication handler ends in step 656. If the encoded tokens do match in step 653, then the content token authentication handler returns that the token is valid in step 655 to the calling content download handler and the content token authentication handler ends in step 656.

Royalty Administration

Royalty administration for a digital content distribution and subscription system involves tracking licensing of digital content data 108 by users of the digital content distribution and subscription service and periodically calculating royalty payments to rights holders of the digital content data 108. Tracking the licensing of digital content data 108 is handled during a download request when the license server 102 provides the license for the digital content data 108 to the client 100, described above in connection with FIG. 18. The licensing information is used to calculate royalty payments to the rights holders of the digital content data 108. In this way, rights holders of digital content data 108 can be properly compensated for the use of their digital content data 108, thus providing a digital content distribution and subscription system that follows and honors existing copyrights to the digital content data 108. The particular embodiment of a royalty administration system described here is intended specifically for a digital music subscription system.

The royalty administration overview block diagram, illustrated in FIG. 51, shows the relationship and interaction between the royalty administrator 125 and the application servers 103 and the license servers 102 and in particular access to the information in the digital content catalog 107, customer data 106, and royalty tracking 105 by the royalty administrator 125. The royalty administrator 125 uses this information for calculating royalty payments to the rights holders of digital content data 108. As described above in connection with FIG. 18, when the client 100 initiates a download request, the license server 102 provides a license to the client 100 for access to or playback of the digital content data 108. The assignment of this license is saved in royalty tracking 105. The royalty administrator 125 then uses the information in royalty tracking 105, as well as customer data 106 and the digital content catalog 107, to periodically, for example, every quarter, calculate royalty payments to rights holders of the digital content data 108 that was licensed to users of the digital content distribution and subscription service. In this way, rights holders of the digital content data 108, for example, digital music, are properly compensated for access to or playback of their digital works. It should be noted that the royalty administrator 125 might exist as a separate computing platform or server or run on an existing server, for example, on an application server 103.

FIG. 52 is an exemplary block diagram of the royalty tracking and payment calculation data organization for a royalty administration system. In this particular embodiment, the royalty administration system supports royalty administration for a digital music subscription service. Contained in royalty tracking 105 are the license assignment records 700 for the digital content data 108, and in particular for digital music. These license assignment records 700 are generated and stored in royalty tracking 105 during a download request when the license server 102 creates the access or playback license, described above in connection with FIG. 18. The license assignment record 700 contains various fields to support royalty calculations, with only those relevant fields being shown and discussed here. The license assignment ID 701 is a unique identifier assigned to each license assignment record 700. The customer ID 702 identifies the customer record 710 for the customer that received the playback license. The track ID 703 identifies the track record 720 for the music track that was licensed to the customer. The assignment date 704 indicates the date the license was assigned. The expiration date 705 indicates the date the license expires. Using these dates, the time period, during which the track was cached in the given royalty period, can be calculated. Using the customer ID 702, the royalty administrator 125 can access the customer records 710 stored in customer data 106 to access information about the customer that received the license. The customer record 710 contains territory information to support royalty calculations, with only those relevant fields being shown and discussed here. The customer ID 711 is a unique identifier assigned to each customer record 710. The territory ID 712 identifies the territory record 770, which indicates the region or country that the customer lives in since rights assignments for royalty calculations may vary from country to country. Using the track ID 703 and the territory ID 712, the royalty administrator 125 can access the rights assignment records 730 stored in the digital content catalog 107 to search for rights assignments for the track and region or country specified. The rights assignment record 730 contains various fields to support royalty calculations, with only those relevant fields being shown and discussed here. The rights assignment ID 731 is a unique identifier assigned to each rights assignment record 730. The rights holder ID 732 identifies the rights holder record 750 for the rights holder assigned to this particular rights assignment. The track ID 733 identifies the track record 720 for the track assigned to this particular rights assignment. The percentage 734 indicates what percentage of the total rights this rights assignment is given. The flat rate 735 indicates that a flat royalty rate is paid to this rights holder. Either the percentage 734 or the flat rate 735 is used in royalty calculations. The percentages and rates are applied against the revenue pool value residing in the financial system. The territory ID 736 identifies the territory record 770, which indicates the region or country where the right assignment is valid. The assignment date 737 indicates the starting date that the rights assignment is effective. The termination date 738 indicates the date the rights assignment ended, which may be ongoing.

For music, there are two types of rights assignments. One type is publishing rights, which are the rights to the written lyrics and music. The other type is recording rights, which are rights to a particular recording of the music. The publishing rights 739 field indicates that this rights assignment is for publishing rights. The recording rights 740 field indicates that this rights assignment is for recording rights. Only one of the publishing rights 739 or recording rights 740 fields can be set for a particular rights assignment record 730. Using the rights holder ID 732, the royalty administrator 125 can access the rights holder records 750 stored in the digital content catalog 107 to search for the rights holder of a particular rights assignment record 730. The rights holder record 750 contains various fields to support royalty calculations, with only those relevant fields being shown and discussed here. The rights holder ID 751 is a unique identifier assigned to each rights holder record 750. The payment information 752 provides information on how the rights holder should be paid, for example, a bank account to credit or an address to send payment. Track records 720 are contained in the digital content catalog 107 and contain information on the digital music tracks, with only those fields relevant for supporting royalty calculations being shown and discussed here. The track ID 721 is a unique identifier assigned to each track record 720. The title 722 indicates the title of the track. Territory records 770 are contained in one of the data storage locations, such as the digital content catalog 107, customer data 106, or royalty tracking 105, and contain information about a region or country, with only those fields relevant for supporting royalty calculations being shown and discussed here. The territory ID 771 is a unique identifier assigned to each territory record 770. The name 772 corresponds to the name of the region or country specified for the territory record 770. It should be noted that only information in the various records discussed above that is directly relevant to royalty administration has been included and it is understood that other information may exist in these various records for other purposes.

As indicated in the royalty tracking and payment data organization block diagram in FIG. 52, calculation of royalty payments is a complex process. FIG. 53 is a software flow diagram of royalty payment calculation by the royalty administrator 125, called the payment calculation handler. In this example, the payment calculation handler may be initiated automatically on a periodic basis, for example, every quarter, or manually as part of royalty administration or auditing. "Start" in step 800 represent the beginning of the payment calculation handler. The payment calculation handler queries in step 801 the license assignment records 700 for license assignment records 700 which are valid during the desired time period for which royalty calculations are being made. If the license assignment query is not successful in step 802, then the payment calculation handler logs the failure to calculate royalty payments in step 803 and the payment calculation handler ends in step 823. If the license assignment query is successful in step 802, then the payment calculation handler checks if there are license assignment records 700 remaining to calculate in step 804 from the query in step 801. If there are no more license assignment records 700 to calculate in step 804, then the payment calculation handler generates a payment report in step 805 and the payment calculation handler ends in step 823. The payment report generated in step 805 can then be used for issuing the proper payments to the various rights holders. If there are more license assignment records 700 to calculate in step 804, then the payment calculation handler gets the next license assignment record 700 to calculate in step 806. Next, the payment calculation handler queries in step 808 the customer records 710 for the customer record 710 matching the license assignment record 700 customer ID 702 field. From the customer record 710, the payment calculation handler attains the territory ID field and stores it for later use. If the customer query is not successful in step 809, then the payment calculation handler logs the failure to calculate royalty payments in step 810 and the payment calculation handler ends in step 823. If the customer query is successful in step 809, then the payment calculation handler queries in step 811 the track history for track information. If the track history query is not successful in step 812, then the payment calculation handler logs the failure to calculate royalty payments in step 813 and the payment calculation handler ends in step 823. If the track history query is successful in step 812, then the payment calculation handler queries in step 814 the rights assignment records 730 for the rights assignment record or records 730 matching the license assignment record 700 track ID 703 field and the customer record 710 territory ID 712 field stored earlier and which are valid during the desired time period for which royalty calculations are being made. If the rights assignments query is not successful in step 815, then the payment calculation handler logs the failure to calculate royalty payments in step 816 and the payment calculation handler ends in step 823. If the rights assignments query is successful in step 815, then the payment calculation handler checks if there are rights assignment records 730 remaining to calculate in step 817 from the query in step 814. If there are no more rights assignments records 730 to calculate in step 817, then the payment calculation handler checks if there are more license assignment records 700 to calculate in step 804 again. If there are more rights assignments records 730 to calculate in step 817, then the payment calculation handler gets the next rights assignment record 730 to calculate in step 818. Next, the payment calculation handler queries in step 819 the rights holder records 750 for the rights holder record 750 matching the rights assignment record 730 rights holder ID 732 field. If the rights holder query is not successful in step 820, then the payment calculation handler logs the failure to calculate royalty payments in step 821 and the payment calculation handler ends in step 823. If the rights holder query is successful in step 820, then the payment calculation handler calculates the payment to the rights holder for the license assignment in step 822 and checks if there are there are more rights assignment records 730 to calculate in step 817 again.

Royalty payment calculation for a particular license assignment record 700 in step 822 of FIG. 53 to a particular rights holder specified in a rights holder record 750 involves multiple variables and conditions. In particular, the payment calculation example described below assumes that license assignments are valid only during all or part of a given month, that rights assignments are valid for full month time periods only, and that the time period for royalty calculations are made based on multiples of full month time periods only. First, a license assignment time frame is calculated using the time period marked by the license assignment record 700 assignment date 704 and expiration date 705 fields. Since the license assignments are valid during all or part of a given month and royalty calculations are made over multiples of full month time periods, there is no risk in this example of the license assignment time frame extending outside the royalty calculation time period. Next the license assignment proration is calculated by dividing the license assignment time frame by the total number of days in the subscription record 760 billing period 764 field, which is always one month in this example. The number of days in the particular month is determined from the month in which the license assignment time frame falls. If the rights assignment uses a flat rate, as indicated in the rights assignment record 730 flat rate 735 field, then the royalty payment calculation for a particular license assignment record 700 to a particular rights holder, as indicated in the rights holder record 750, is the amount of the flat rate 735 field value times the license assignment pro-ration. If the rights assignment is not based on a flat rate, then the royalty payment calculation for a particular license assignment record 700 to a particular rights holder, as indicated in the rights holder record 750, is the percentage 734 value times the license assignment pro-ration times a royalty payment constant, for example, $0.01 for publishing rights as indicated by the publishing rights 739 field or $0.05 for recording rights as indicated by the recording rights 740 field. The financial system provides the revenue pool from which these funds are disbursed. Since the rights assignments are valid for full month time periods, there is no risk in this example of the license assignment time frame extending outside the rights assignment time frame, as calculated by the rights assignment record 730 assignment date 737 and termination date 738 fields. It should be noted that using the given information in the various records, more complex royalty payment calculation systems with fewer or no assumptions are possible.

Customer Care aid Customer Logs, and History

Customer care 144 and customer logs and history systems 145 are related aspects of the subscription service infrastructure 130, described previously in connection with FIG. 4. The customer care system 144 enables subscription service support personnel to provide technical and system support for subscribers. The customer logs and history system 145 tracks customer or subscriber access to the digital music subscription service and includes subscriber activity such as account management 135 to record subscriber plan and profile changes. The customer logs and history system 145 information can then be used as part of customer care 144 to facilitate support for subscribers. The customer logs and history system 145 also tracks subscriber secure audio downloads 139, which are used for royalty tracking 105.

Figure 54:
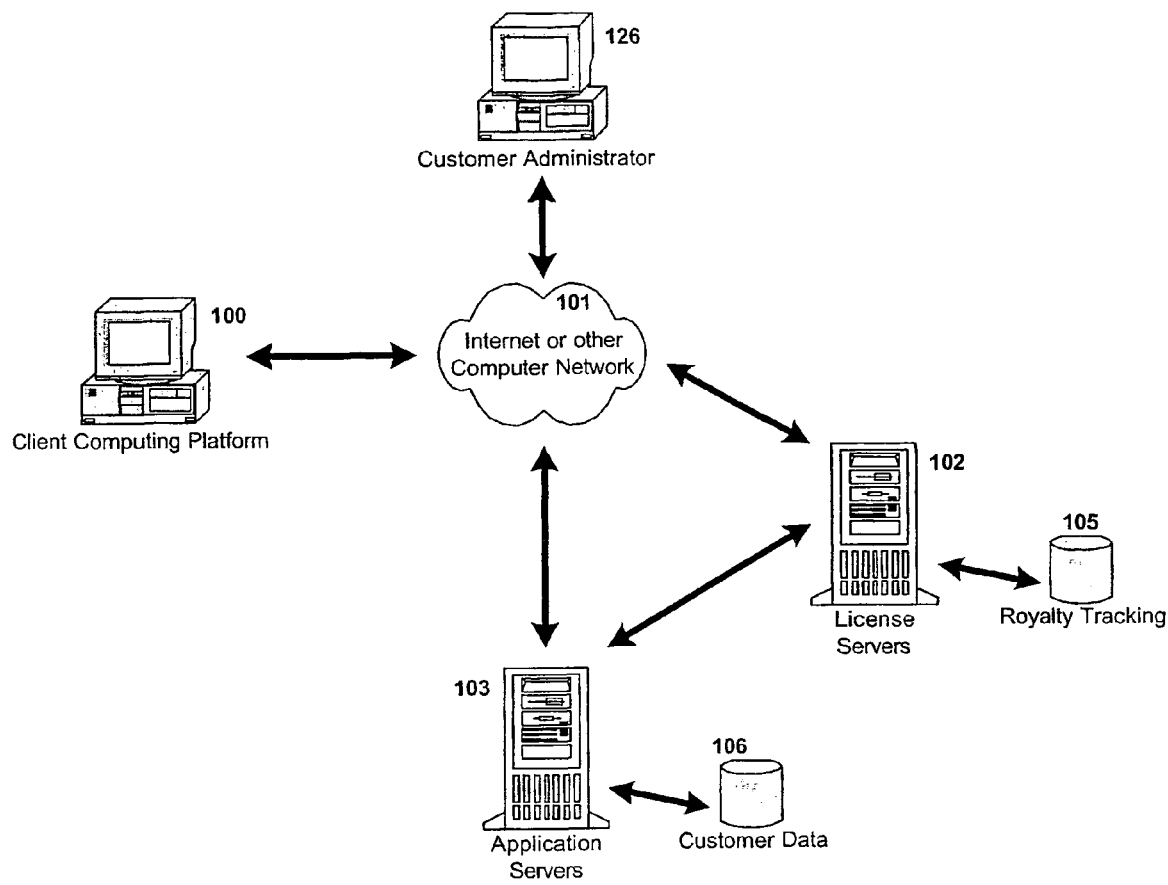
FIG. 54 is a block diagram that provides an overview of a customer care and customer logs and history component which forms a part of the digital content distribution and subscription system.

The customer administration overview block diagram, illustrated in FIG. 54, shows the relationship and interaction between the customer administrator 126 and the application servers 103 and license servers 102 and in particular access to the information in customer data 106, and royalty tracking 105 by the customer administrator 126. When a customer, on a client computing platform 100, of the digital music subscription service requires customer support from the customer administrator 126, the customer administrator 126 is able to access, using, for example, Siebel Systems customer relationship management software, customer data 106 to correct, edit, or update customer account information, for example, to update customer address changes. The customer administrator 126 may also access royalty tracking 105 to correct, edit, or update customer download and licensing information, for example, to update customer billing errors.

FIGS. 55-59 provide software flow diagrams for the customer care system 144 and access to customer logs and history system 145 on the customer administrator 126, application servers 103, and license servers 102.

Figure 55:
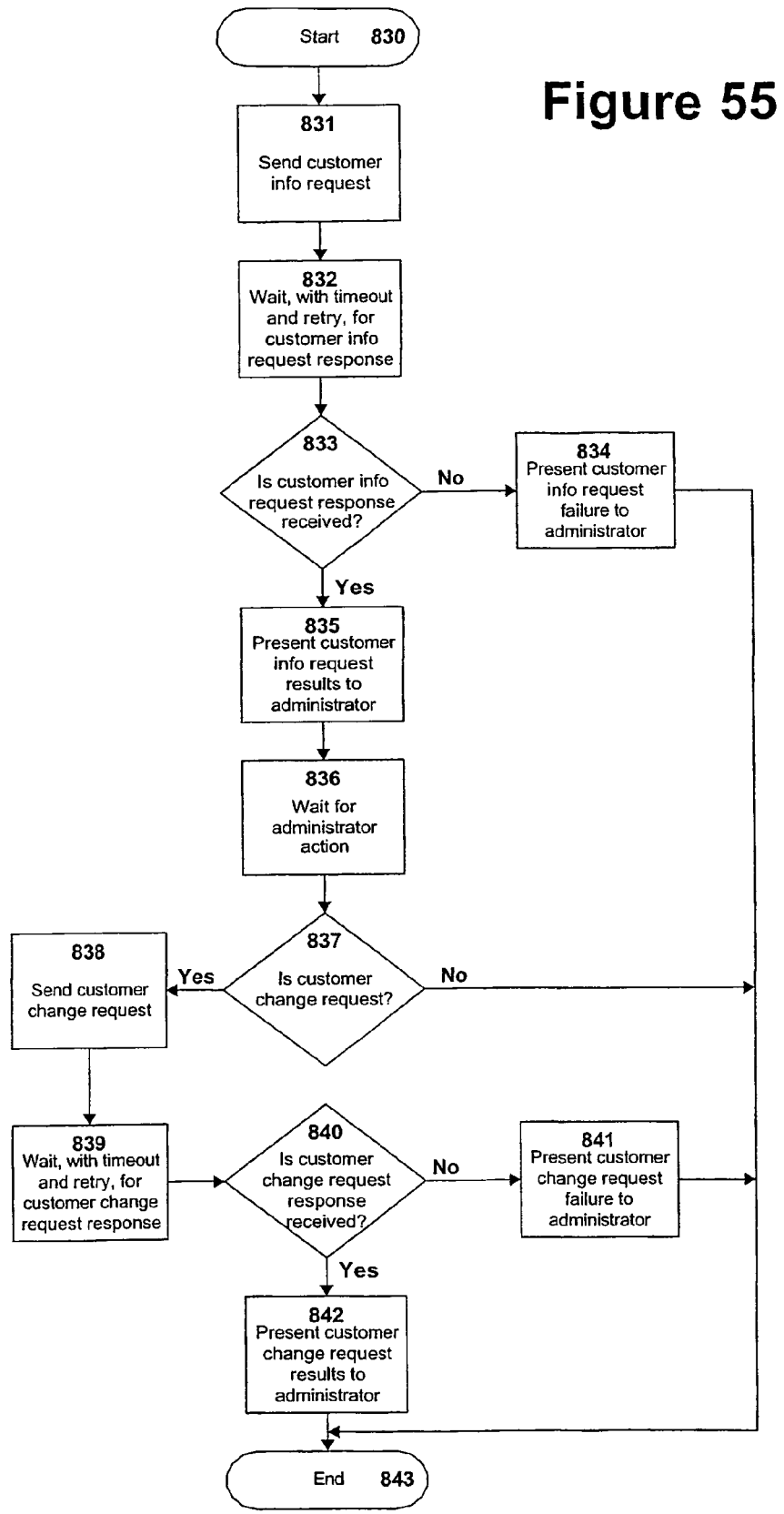
FIG. 55 is a software flow diagram of a customer administrator for customer care and customer logs and history which forms a part of the digital content distribution and subscription system.

FIG. 55 is a customer administrator specific software flow diagram for a customer information request, called the customer information task. In this embodiment, the customer information task is handled within a standard web browser, for example, Microsoft Internet Explorer. The customer administrator 126 typically initiates a customer information request in order to access information on a specific customer as part of customer support. "Start" in step 830 represents the beginning of the customer information task on the customer administrator 126. The customer information task generates and sends a customer information request in step 831 to the application server 103. The customer information task then waits with some timeout, for example, 2 seconds, and possibly with multiple retries for a customer information request response in step 832 from the application server 103. If a customer information request response is not received in step 833, then the customer information task presents the customer information request failure to the customer administrator 126 in step 834 and the task ends in step 843. If a customer information request response, which includes the customer logs and history 145, is received in step 833 from the application server 103, then the customer information task presents the customer information to the customer administrator 126 in step 835. Then the customer information task waits for action from the customer administrator 126 to update or change the customer information in step 836. If the customer administrator 126 does not request to change the customer information in step 837, then the customer information task ends in step 843. If the customer administrator 126 does request to change the customer information in step 837, then the customer information task sends a customer change request, which includes the changed customer information and changed customer logs and history 145, in step 838 to the application server 103. The customer information task then waits with some timeout, for example, 2 seconds, and possibly with multiple retries for a customer change request response in step 839 from the application server 103. If a customer change request response is not received in step 840, then the customer information task presents the customer change request failure to the customer administrator 126 in step 841 and the task ends in step 843. If a customer change request response is received in step 840 from the application server 103, then the customer information task presents the results of the customer change request to the customer administrator 126 in step 842 and the customer information task ends in step 843.

Figure 56:
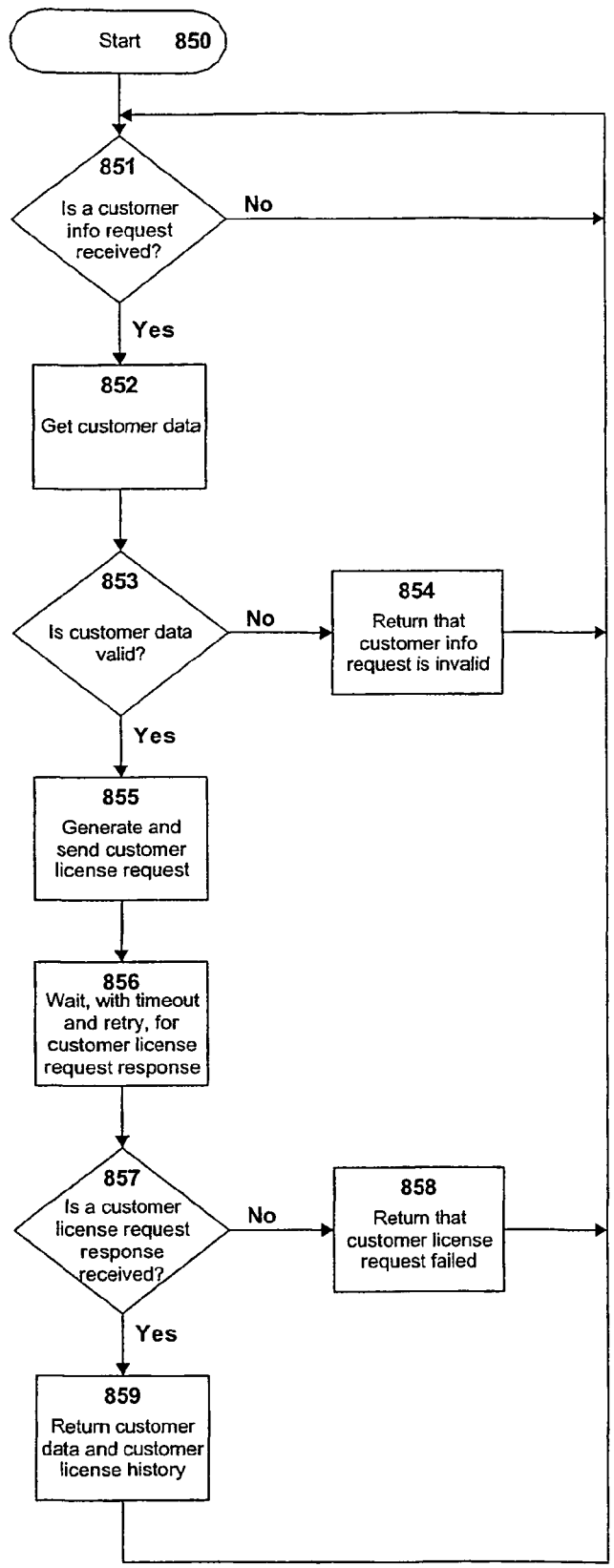
FIG. 56 is a software flow diagram on an application server of a customer information request which forms a part of the digital content distribution and subscription system.

FIG. 56 is an application server specific software flow diagram for a customer information request, which in the example described henceforth, is called the application customer information handler. In this example, the application customer information handler is a continuously running process on the application server 103. "Start" in step 850 represents the beginning of the application customer information handler. If a customer information request is received in step 851 from the customer administrator 126, then the customer data 106 that was requested is retrieved in step 852. If the customer data 106 is not valid in step 853, then the application customer information handler returns that the customer information request is not valid in step 854 to the customer administrator 126. The application customer information handler then checks for any customer information requests received in step 851 again. If the customer data 106 that was retrieved is valid in step 853, then the application customer information handler generates and sends a customer license request in step 855 to the license server 102 in order to obtain license history information for a specific customer. The application customer information handler then waits with some timeout, for example, 2 seconds, and possibly with multiple retries for a customer license request response in step 856. If a customer license request response is not received in step 857, then the application customer information handler returns that the customer license request failed in step 858 to the customer administrator 126. The application customer information handler then checks for any customer information requests received in step 851 again. If a customer license request response is received in step 857, then the application customer information handler returns the customer data 106 and customer license history for the specific customer in step 859 to the customer administrator 126 and checks for any customer information requests received in step 851 again.

Figure 57:
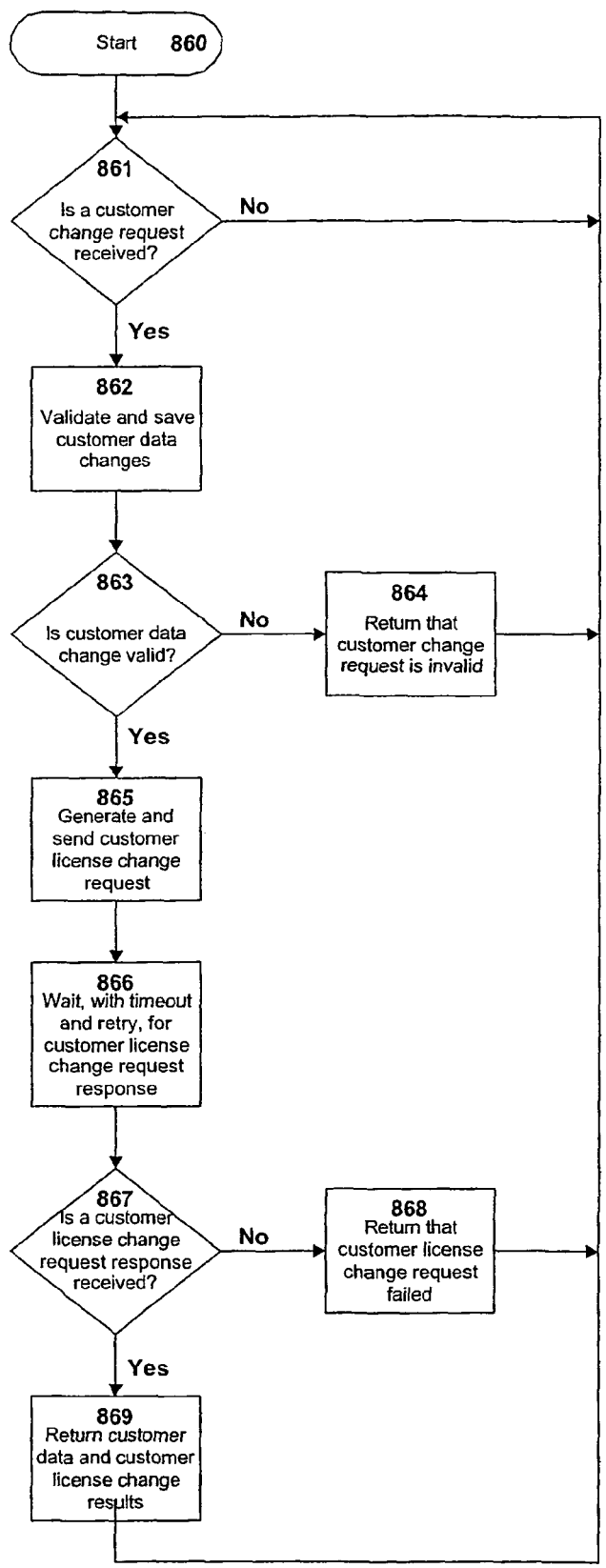
FIG. 57 is a software flow diagram on an application server of a customer update request which forms a part of the digital content distribution and subscription system.

FIG. 57 provides an application server specific software flow diagram for a customer change request, which in the example described henceforth, is called the application customer change handler. In this example, the application customer change handler is a continuously running process on the application server 103. "Start" in step 860 represents the beginning of the application customer change handler. If a customer change request is received in step 861 from the customer administrator 126, then the changed customer data 106 is validated and saved in step 862. If the changed customer data 106 is not valid in step 863, then the application customer change handler returns that the customer change request is not valid in step 864 to the customer administrator 126. The application customer change handler then checks for any customer change requests received in step 861 again. If the changed customer data 106 is valid in step 863, then the application customer change handler generates and sends a customer license change request in step 865 to the license server 102 in order to change license history information for a specific customer. The application customer change handler then waits with a predetermined timeout, for example, 2 seconds, and possibly with multiple retries for a customer license change request response in step 866. If a customer license change request response is not received in step 867, then the application customer change handler returns that the customer license change request failed in step 868 to the customer administrator 126. The application customer change handler then checks for any customer change requests received in step 861 again. If a customer license change request response is received in step 867, then the application customer change handler returns the customer data 106 and customer license history change results for the specific customer in step 869 to the customer administrator 126 and checks for any customer change requests received in step 861 again.

Figure 58:
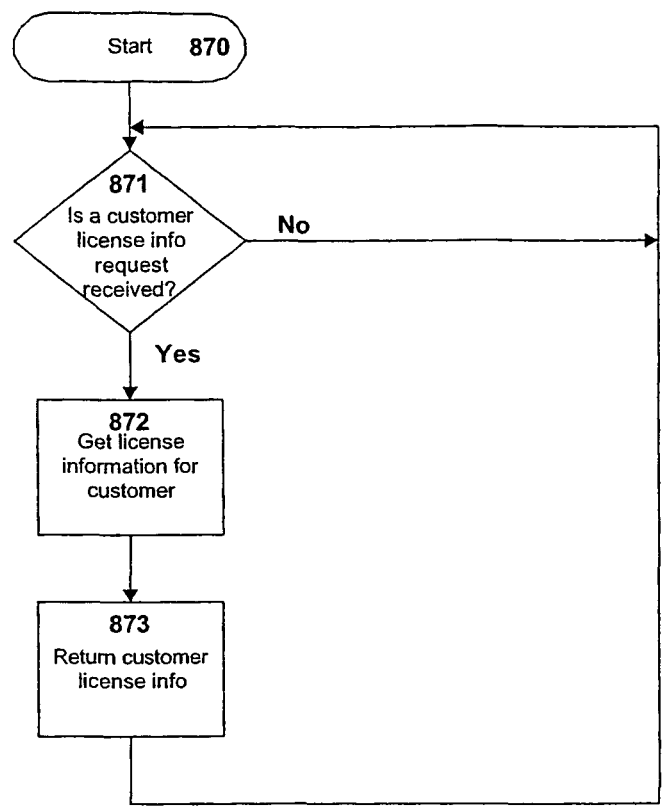
FIG. 58 is a software flow diagram on a license server of a customer license request which forms a part of the digital content distribution and subscription system.

FIG. 58 is a license server specific software flow diagram for a customer license information request, which in the example described henceforth, is called the license customer information handler. In this example, the license customer information handler is a continuously running process on the license server 102. "Start" in step 870 represents the beginning of the license customer information handler. If a customer license information request is received in step 871 from an application server 103, then the license customer information handler gets the license history information for the specific customer in step 872. The license customer information handler then returns the license history information in step 873 to the calling application server 103 and checks for any customer license information requests received in step 871 again.

Figure 59:
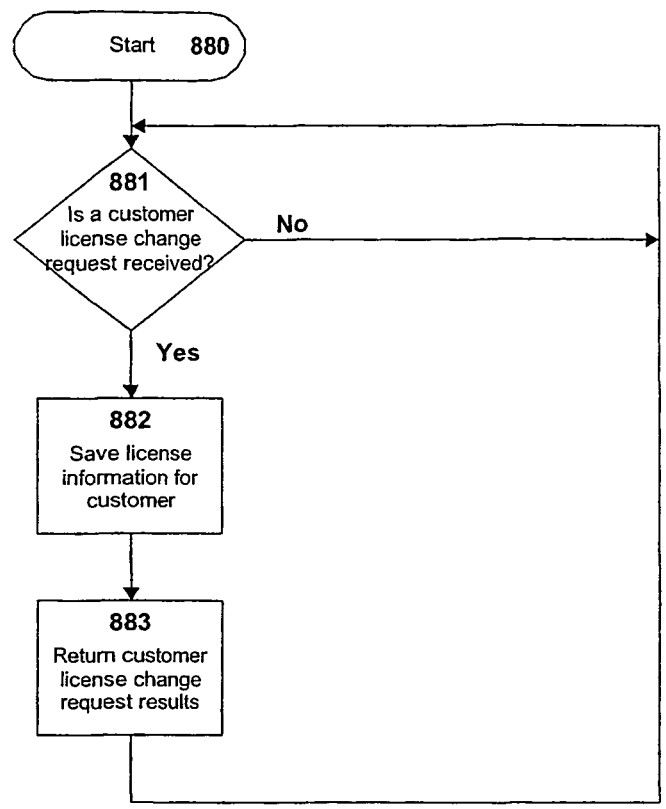
FIG. 59 is a software flow diagram on a license server of a customer license change request which forms a part of the digital content distribution and subscription system.

FIG. 59 provides a license server specific software flow diagram for a customer license change request, which in the example described henceforth, is called the license customer change handler. In this example, the license customer change handler is a continuously running process on the license server 102. "Start" in step 880 represents the beginning of the license customer change handler. If a customer license change request is received in step 881 from an application server 103, then the license customer change handler saves the changed license history information for the specific customer in step 882. The license customer change handler then returns the results of license change request in step 883 to the calling application server 103 and checks for any customer license change requests received in step 881 again.

Obviously, many modifications and variations of the present invention are possible in light of the above teachings. Thus, it is to be understood that, within the scope of the appended claims, the invention may be practiced otherwise than as specifically described above.

We claim:

1. A digital content distribution system for managing digital content provided to a subscriber over a predetermined period, comprising:
at least one processor;
a search and browse module allowing a subscriber to search a digital content catalog;
a secure downloads module authenticating the subscriber and sending an address of digital content selected from the digital content catalog to the subscriber for electronically downloading the selected digital content over a network, wherein the address further comprises information for authenticating the download;
a digital rights management module, executing on the at least one processor, controlling access and playback of the selected digital content based on a license for the selected digital content, the license including an expiration date defining a valid lifetime for the license, wherein the digital rights management module prevents access by the subscriber to the selected digital content when the license is determined to be expired; and
a subscription management module renewing the license for the selected digital content.

2. The digital content distribution system as recited in claim 1, wherein said digital content is audio data.

3. The digital content distribution system as recited in claim 1, wherein said digital content is video data.

4. The digital content distribution system as recited in claim 1, wherein said network is a private network.

5. The digital content distribution system as recited in claim 1, wherein said network is a public network.

6. The digital content distribution system as recited in claim 5, wherein said public network is the Internet.

7. The digital content distribution system as recited in claim 1, further comprising a royalty administration system that is configured to calculate royalties for the downloaded digital content.

8. The digital content distribution system as recited in claim 1, wherein said digital content management system is configured to download selected digital content in an encrypted format defining encrypted digital content.

9. The digital content distribution system as recited in claim 8, wherein said digital content management system is configured to generate a key that is downloaded with said selected digital content for decrypting said digital content.

10. The digital content distribution system as recited in claim 9, wherein said key is only valid for a predetermined time period.

11. The digital content distribution system as recited in claim 9, wherein a separate key is downloaded for each item of digital content selected.

12. The digital content distribution system as recited in claim 1, wherein said digital content distribution system includes a user interface for enabling connection of remote client computing platforms to connect to said digital content distribution system with standard technology to enable the remote computing platforms to communicate with said digital content management system by way of a standard web browser.

13. The digital content distribution system as recited in claim 1, wherein said digital content management system includes a registration and login system for enabling registration and login of the subscriber using a remote client computing platform.

14. The digital content distribution system as recited in claim 1, wherein the subscription management module renews the license when the subscriber requests continued access to or playback of the selected digital content after expiration of the license.

15. The digital content distribution system as recited in claim 1, wherein the subscription management module renews the license upon receipt of an automatic renewal request, from the subscriber, when the license is at or near the expiration date, wherein the automatic renewal request ensures uninterrupted access or playback rights to the selected digital content.

16. The digital content distribution system as recited in claim 1, wherein the digital rights management module downloads the license to the subscriber.

17. The digital content distribution system as recited in claim 16 wherein the digital rights management module causes an overage fee to be charged to the subscriber when a user download limit has been reached.

18. The digital content distribution system as recited in claim 1, wherein the subscription management module further:
  receives a first license renewal request from a subscriber, the license renewal request including a customer identifier and a unique client machine identifier;
  authenticates the customer identifier and the unique client machine identifier;
  sends a second license renewal request to a license module;
  receives at least one renewed license from the license module; and
  sends the renewed license to the subscriber.

19. A process executing on at least one processor for distributing digital content, the process comprising:
  sending, by the at least one processor, a location of encrypted digital content to a remote client for electronically downloading the encrypted digital content over a network; and
  providing a key, stored in a memory device, to the remote client to decrypt the encrypted digital content, the key including an expiration date defining a valid lifetime for the key, wherein the remote client cannot decrypt the encrypted digital content when the key is expired.

20. A process for distributing digital content as recited in claim 19 further including the steps of:
  registering predetermined users at remote clients; and
  downloading said digital content in response to a login request.

21. A process for distributing digital content as recited in claim 19 wherein the downloaded encrypted digital content further includes a predetermined number of units of digital content downloaded in response to a request from a remote client.

22. A process for distributing digital content as recited in claim 21 wherein the downloaded encrypted digital content further includes the predetermined number of units of digital content in a predetermined time period for a predetermined fee downloaded in response to a request from a remote client.

23. The digital content distribution system as recited in claim 1, wherein the license represents payment for use of the selected digital content.

* * * * *